US011007035B2

(12) United States Patent
Fares et al.

(10) Patent No.: US 11,007,035 B2
(45) Date of Patent: May 18, 2021

(54) SYSTEM FOR PREPARING TEETH FOR THE PLACEMENT OF VENEERS

(71) Applicant: Viax Dental Technologies LLC, Hallandale Beach, FL (US)

(72) Inventors: Mohamed Fares, Beveren (BE); Cyrus Tahmasebi, San Diego, CA (US)

(73) Assignee: Viax Dental Technologies LLC, Miami, FL (US)

( * ) Notice: Subject to any disclaimer, the term of this patent is extended or adjusted under 35 U.S.C. 154(b) by 0 days.

(21) Appl. No.: 15/858,253

(22) Filed: Dec. 29, 2017

(65) Prior Publication Data

US 2018/0263726 A1    Sep. 20, 2018

Related U.S. Application Data

(60) Provisional application No. 62/472,372, filed on Mar. 16, 2017.

(51) Int. Cl.
*A61C 1/08*    (2006.01)
*A61C 13/01*    (2006.01)
(Continued)

(52) U.S. Cl.
CPC .............. *A61C 1/084* (2013.01); *A61C 1/082* (2013.01); *A61C 5/20* (2017.02); *A61C 5/70* (2017.02);
(Continued)

(58) Field of Classification Search
CPC . A61C 1/084; A61C 13/0004; A61C 13/0006; A61C 13/01; A61C 13/081;
(Continued)

(56) References Cited

U.S. PATENT DOCUMENTS

| 472,004 A | 3/1892 | Sweet |
| 1,407,840 A | 2/1922 | Cruttenden |

(Continued)

FOREIGN PATENT DOCUMENTS

| AT | 12407 B | 7/1903 |
| AT | 13375 B | 9/1903 |

(Continued)

OTHER PUBLICATIONS

P. Hahn, Fracture strengh of 3-unit inlay bridges after thermo-mechanical fatigue in a chewing simulator, http://www.gapless.de/, Oct. 25, 2001, 2 pages.

(Continued)

*Primary Examiner* — Yogesh P Patel
(74) *Attorney, Agent, or Firm* — Lerner, David, Littenberg, Krumholz & Mentlik, LLP

(57) ABSTRACT

Dental instrumentation for use in guiding a cutting tool to remove tooth structure from a working tooth is prepared. A digital model of cutting guide shell structure for placement around a portion of the tooth to be treated is combined with preset tool movements to be made by the cutting tool by one or more processors to define final cutting guide data corresponding to final cutting guide structure for guiding the cutting tool. A digital model of a fixation instrument configuration for fixing the dental instrumentation to an adjacent tooth to the working tooth is combined with the final cutting guide data by one or more processors to define final instrument configuration data corresponding to a final instrument configuration for releasably fixing the dental instrumentation to the adjacent tooth and for guiding the cutting tool in the removal of the tooth structure from the tooth to be treated.

18 Claims, 42 Drawing Sheets

(51) Int. Cl.
  *A61C 13/00* (2006.01)
  *A61C 13/10* (2006.01)
  *A61C 13/08* (2006.01)
  *A61C 5/20* (2017.01)
  *A61C 5/70* (2017.01)
  *A61C 9/00* (2006.01)

(52) U.S. Cl.
  CPC ...... *A61C 13/0004* (2013.01); *A61C 13/0006* (2013.01); *A61C 13/01* (2013.01); *A61C 13/081* (2013.01); *A61C 13/1003* (2013.01); *A61C 9/0046* (2013.01)

(58) Field of Classification Search
  CPC ..... A61C 13/1003; A61C 9/0046; A61C 1/08; A61C 1/082; A61C 8/0089; A61C 8/009; A61B 17/17; A61B 17/176; A61B 17/1673
  USPC .................. 433/72–76, 172–176; 606/96–98
  See application file for complete search history.

(56) References Cited

U.S. PATENT DOCUMENTS

| | | | |
|---|---|---|---|
| 1,772,027 A | 8/1930 | Baumgarten | |
| 2,303,475 A | 12/1942 | Karlstrom | |
| 2,591,183 A | 4/1952 | Mintz | |
| 2,597,661 A | 5/1952 | McPhee | |
| 2,621,408 A | 12/1952 | Klein | |
| 2,634,501 A | 4/1953 | Linet | |
| 2,644,235 A | 7/1953 | Mintz | |
| 2,675,615 A | 4/1954 | Rosenberg | |
| 2,770,040 A | 11/1956 | Moyer | |
| 2,986,816 A | 6/1961 | Zeman | |
| 3,011,259 A | 12/1961 | Baum | |
| 3,063,149 A | 11/1962 | Suga | |
| 3,254,413 A | 6/1966 | Suga | |
| 3,376,643 A | 4/1968 | Nealon | |
| 3,407,503 A | 10/1968 | Nealon | |
| 3,445,935 A | 5/1969 | Marshall | |
| 3,508,334 A | 4/1970 | Weissman | |
| 3,585,723 A | 6/1971 | Simor | |
| 3,600,810 A | 8/1971 | Marshall et al. | |
| 4,144,645 A | 3/1979 | Marshall | |
| 4,226,593 A | 10/1980 | Cohen et al. | |
| 4,473,354 A | 9/1984 | Rigaud et al. | |
| 4,504,230 A | 3/1985 | Patch | |
| 4,526,542 A | 7/1985 | Kochis | |
| 4,744,757 A | 5/1988 | Adair et al. | |
| 4,778,387 A | 10/1988 | Komatsu | |
| 4,937,928 A | 7/1990 | van der Zel | |
| 4,941,826 A | 7/1990 | Loran et al. | |
| 4,997,369 A | 3/1991 | Shafir | |
| 5,015,183 A | 5/1991 | Fenick | |
| 5,118,294 A | 6/1992 | Kurer | |
| 5,133,660 A | 7/1992 | Fenick | |
| 5,135,393 A | 8/1992 | Eidenbenz et al. | |
| 5,192,207 A | 3/1993 | Rosellini | |
| 5,224,049 A | 6/1993 | Mushabac | |
| 5,257,184 A | 10/1993 | Mushabac | |
| 5,343,391 A | 8/1994 | Mushabac | |
| 5,347,454 A | 9/1994 | Mushabac | |
| 5,359,511 A | 10/1994 | Schroeder et al. | |
| 5,368,478 A | 11/1994 | Andreiko et al. | |
| 5,431,562 A | 7/1995 | Andreiko et al. | |
| 5,447,432 A | 9/1995 | Andreiko et al. | |
| 5,448,472 A | 9/1995 | Mushabac | |
| 5,454,717 A | 10/1995 | Andreiko et al. | |
| 5,545,039 A | 8/1996 | Mushabac | |
| 5,556,278 A | 9/1996 | Meitner | |
| 5,562,448 A | 10/1996 | Mushabac | |
| 5,569,578 A | 10/1996 | Mushabac | |
| 5,575,646 A | 11/1996 | Giannella | |
| 5,575,656 A | 11/1996 | Hajjar | |
| 5,641,287 A | 6/1997 | Gittleman | |
| 5,725,376 A | 3/1998 | Poirier | |
| 5,768,134 A | 6/1998 | Swaelens et al. | |
| 5,800,168 A | 9/1998 | Cascione et al. | |
| 5,813,859 A | 9/1998 | Hajjar et al. | |
| 5,833,693 A * | 11/1998 | Abrahami | A61B 17/176 606/96 |
| 5,888,068 A | 3/1999 | Lans et al. | |
| 5,897,315 A | 4/1999 | Nakayama et al. | |
| 5,975,893 A | 11/1999 | Chishti et al. | |
| 6,030,211 A | 2/2000 | Sandhaus | |
| 6,049,743 A | 4/2000 | Baba | |
| 6,050,820 A | 4/2000 | Lans et al. | |
| 6,183,248 B1 | 2/2001 | Chishti et al. | |
| 6,190,171 B1 | 2/2001 | Hajjar et al. | |
| 6,213,770 B1 | 4/2001 | Kuhn | |
| 6,254,639 B1 | 7/2001 | Peckitt | |
| 6,257,892 B1 | 7/2001 | Worthington | |
| 6,309,215 B1 | 10/2001 | Phan et al. | |
| 6,334,853 B1 | 1/2002 | Kopelman et al. | |
| 6,371,761 B1 | 4/2002 | Cheang et al. | |
| 6,382,975 B1 | 5/2002 | Poirier | |
| 6,390,812 B1 | 5/2002 | Chishti et al. | |
| 6,398,548 B1 | 6/2002 | Muhammad et al. | |
| 6,406,292 B1 | 6/2002 | Chishti et al. | |
| 6,409,504 B1 | 6/2002 | Jones et al. | |
| 6,447,296 B2 | 9/2002 | Worthington | |
| 6,457,972 B1 | 10/2002 | Chishti et al. | |
| 6,468,248 B1 * | 10/2002 | Gibbs | A61B 17/3472 433/80 |
| 6,471,511 B1 | 10/2002 | Chishti et al. | |
| 6,485,298 B2 | 11/2002 | Chishti et al. | |
| 6,511,323 B1 | 1/2003 | Wilkinson | |
| 6,527,550 B1 | 3/2003 | Hajjar et al. | |
| 6,537,067 B1 * | 3/2003 | Wennemann | A61C 1/082 433/76 |
| 6,554,611 B2 | 4/2003 | Chishti et al. | |
| 6,626,672 B1 | 9/2003 | Been | |
| 6,641,340 B1 | 11/2003 | Hajjar et al. | |
| 6,685,469 B2 | 2/2004 | Chishti et al. | |
| 6,705,861 B2 | 3/2004 | Chishti et al. | |
| 6,722,880 B2 | 4/2004 | Chishti et al. | |
| 6,767,208 B2 | 7/2004 | Kaza | |
| 6,786,726 B2 | 9/2004 | Lehmann et al. | |
| 6,814,575 B2 | 11/2004 | Poirier | |
| 6,881,059 B2 | 4/2005 | Wennemann | |
| 6,925,198 B2 | 8/2005 | Scharlack et al. | |
| 6,957,118 B2 | 10/2005 | Kopelman et al. | |
| 7,004,757 B2 | 2/2006 | Wilkinson | |
| 7,059,850 B1 | 6/2006 | Phan et al. | |
| 7,063,532 B1 | 6/2006 | Jones et al. | |
| 7,077,647 B2 | 7/2006 | Choi et al. | |
| 7,097,451 B2 | 8/2006 | Tang | |
| 7,108,511 B1 | 9/2006 | Shatkin | |
| 7,110,594 B2 | 9/2006 | Jones et al. | |
| 7,110,844 B2 | 9/2006 | Kopelman et al. | |
| 7,121,825 B2 | 10/2006 | Chishti et al. | |
| 7,123,767 B2 | 10/2006 | Jones et al. | |
| 7,125,248 B2 | 10/2006 | Phan et al. | |
| 7,134,874 B2 | 11/2006 | Chishti et al. | |
| 7,140,877 B2 | 11/2006 | Kaza | |
| 7,147,465 B2 | 12/2006 | Jung et al. | |
| 7,156,661 B2 | 1/2007 | Choi et al. | |
| 7,172,424 B2 | 2/2007 | Wu | |
| 7,245,977 B1 | 7/2007 | Simkins | |
| 7,287,982 B2 | 10/2007 | Riley et al. | |
| 7,331,786 B2 | 2/2008 | Poirier | |
| 7,346,417 B2 | 3/2008 | Luth et al. | |
| 7,357,634 B2 | 4/2008 | Knopp | |
| 7,357,637 B2 | 4/2008 | Liechtung | |
| 7,367,801 B2 | 5/2008 | Saliger | |
| 7,377,778 B2 | 5/2008 | Chishti et al. | |
| 7,383,094 B2 | 6/2008 | Kopelman et al. | |
| 7,384,266 B2 | 6/2008 | Wen | |
| 7,393,211 B2 | 7/2008 | Wilkinson | |
| 7,442,040 B2 | 10/2008 | Kuo | |
| 7,474,307 B2 | 1/2009 | Chishti et al. | |
| 7,476,100 B2 | 1/2009 | Kuo | |
| 7,536,234 B2 | 5/2009 | Kopelman et al. | |
| 7,555,403 B2 | 6/2009 | Kopelman et al. | |

(56) References Cited

U.S. PATENT DOCUMENTS

| | | |
|---|---|---|
| 7,572,125 B2 | 8/2009 | Brajnovic |
| 7,590,462 B2 | 9/2009 | Rubbert et al. |
| 7,653,455 B2 | 1/2010 | Cinader, Jr. |
| 7,658,610 B2 | 2/2010 | Knopp |
| 7,695,281 B2 | 4/2010 | Burger et al. |
| 7,708,557 B2 | 5/2010 | Rubbert |
| 7,734,368 B2 | 6/2010 | Kopelman et al. |
| 7,774,084 B2 | 8/2010 | Cinader, Jr. |
| 7,801,632 B2 | 9/2010 | Orth et al. |
| 7,802,987 B1 | 9/2010 | Phan |
| 7,837,469 B2 | 11/2010 | Chishti et al. |
| 7,845,942 B2 | 12/2010 | Wilkinson |
| 7,854,611 B2 | 12/2010 | Yau et al. |
| 7,862,336 B2 | 1/2011 | Kopelman et al. |
| 7,866,980 B2 | 1/2011 | Poirier |
| 7,905,726 B2 | 3/2011 | Stumpel |
| 7,996,099 B2 | 8/2011 | Kopelman et al. |
| 8,011,927 B2 | 9/2011 | Berckmans, III et al. |
| 8,021,153 B2 | 9/2011 | Poirier |
| 8,038,440 B2 | 10/2011 | Swaelens et al. |
| 8,041,439 B2 | 10/2011 | Kopelman et al. |
| 8,043,091 B2 | 10/2011 | Schmitt |
| 8,099,268 B2 | 1/2012 | Kitching et al. |
| 8,102,538 B2 | 1/2012 | Babayoff |
| 8,170,327 B2 | 5/2012 | Glor et al. |
| 8,186,999 B2 | 5/2012 | Andersson et al. |
| 8,301,287 B2 | 10/2012 | Kopelman et al. |
| 8,359,114 B2 | 1/2013 | Steingart et al. |
| 8,359,115 B2 | 1/2013 | Kopelman et al. |
| 8,364,301 B2 | 1/2013 | Schmitt |
| 8,398,396 B2 | 3/2013 | Taormina |
| 8,401,686 B2 | 3/2013 | Moss et al. |
| 8,425,973 B2 | 4/2013 | Dunne |
| 8,449,296 B2 | 5/2013 | Liechtung |
| 8,454,362 B2 | 6/2013 | Rubbert |
| 8,454,365 B2 | 6/2013 | Boerjes et al. |
| 8,562,340 B2 | 10/2013 | Chishti et al. |
| 8,602,780 B2 | 12/2013 | Rubbert |
| 8,638,447 B2 | 1/2014 | Babayoff et al. |
| 8,638,448 B2 | 1/2014 | Babayoff et al. |
| 8,640,338 B2 | 2/2014 | Jacquemyns |
| 8,651,859 B2 | 2/2014 | Chishti et al. |
| 8,651,860 B2 * | 2/2014 | Kwon ............... A61C 5/70 433/75 |
| 8,714,975 B2 | 5/2014 | Stumpel |
| 8,721,329 B2 | 5/2014 | Hultgren et al. |
| 8,734,150 B2 | 5/2014 | Chishti et al. |
| 8,753,114 B2 | 6/2014 | Vuillemot |
| 8,753,118 B2 | 6/2014 | Randall |
| D708,330 S | 7/2014 | Jung |
| 8,770,972 B2 | 7/2014 | Swaelens et al. |
| 8,794,964 B2 | 8/2014 | Haber |
| 8,803,958 B2 | 8/2014 | Zhang et al. |
| 8,805,563 B2 | 8/2014 | Kopelman et al. |
| 8,807,999 B2 | 8/2014 | Kuo et al. |
| D713,034 S | 9/2014 | Jung |
| 8,828,287 B2 | 9/2014 | van der Zel |
| 8,897,526 B2 | 11/2014 | MacLeod et al. |
| 8,899,984 B2 * | 12/2014 | Llop ............... A61C 8/0018 433/215 |
| 8,926,327 B2 | 1/2015 | Massad |
| 8,926,328 B2 | 1/2015 | Suttin |
| 8,954,181 B2 | 2/2015 | MacLeod et al. |
| 9,011,147 B2 | 4/2015 | Jacquemyns |
| 9,011,148 B2 | 4/2015 | Dolfi et al. |
| 9,044,296 B2 | 6/2015 | Randall |
| 9,069,914 B2 | 6/2015 | Kopelman et al. |
| 9,089,388 B2 | 7/2015 | Zegarelli |
| 9,107,723 B2 | 8/2015 | Hall et al. |
| 9,125,712 B2 | 9/2015 | Kraemer et al. |
| 9,155,548 B2 * | 10/2015 | Lin ............... A61B 17/1757 |
| 9,161,824 B2 | 10/2015 | Chishti et al. |
| 9,168,114 B2 | 10/2015 | Jung et al. |
| 9,186,228 B2 | 11/2015 | Kopelman et al. |
| 9,208,531 B2 | 12/2015 | Boerjes et al. |
| 9,220,576 B2 | 12/2015 | Heinz et al. |
| 9,259,291 B2 | 2/2016 | Gantes |
| 9,295,534 B2 | 3/2016 | Ruppert et al. |
| 9,299,192 B2 | 3/2016 | Kopelman |
| 9,320,572 B2 | 4/2016 | Deichmann et al. |
| 9,320,575 B2 | 4/2016 | Chishti et al. |
| 9,411,910 B2 | 8/2016 | Methot |
| 9,468,504 B2 | 10/2016 | Jung et al. |
| 9,519,749 B2 | 12/2016 | Stumpel |
| 9,549,785 B2 | 1/2017 | Kim |
| 9,554,872 B2 | 1/2017 | Koubi et al. |
| 9,579,170 B2 | 2/2017 | Van Lierde et al. |
| 9,700,380 B2 | 7/2017 | Kim et al. |
| 9,763,746 B2 | 9/2017 | Deichmann et al. |
| 9,844,420 B2 | 12/2017 | Cheang |
| 9,848,958 B2 | 12/2017 | Matov et al. |
| 9,848,965 B2 | 12/2017 | Kim et al. |
| 9,901,416 B2 | 2/2018 | Gantes |
| 9,901,417 B2 | 2/2018 | Gantes |
| 9,931,177 B2 | 4/2018 | Wouters et al. |
| 9,949,807 B2 | 4/2018 | Orth et al. |
| 9,975,294 B2 | 5/2018 | Taub et al. |
| 10,092,379 B2 | 10/2018 | Suttin |
| 2001/0036617 A1 | 11/2001 | Karmaker et al. |
| 2002/0015934 A1 | 2/2002 | Rubbert et al. |
| 2002/0160337 A1 | 10/2002 | Klein et al. |
| 2003/0008259 A1 | 1/2003 | Kuo et al. |
| 2003/0064346 A1 | 4/2003 | Wennemann |
| 2003/0216742 A1 * | 11/2003 | Wetzler ............... A61B 17/17 606/96 |
| 2004/0043355 A1 | 3/2004 | Jonsson et al. |
| 2004/0091836 A1 | 5/2004 | Lazare |
| 2004/0248065 A1 | 12/2004 | Schneider |
| 2005/0014109 A1 | 1/2005 | Lim |
| 2005/0095554 A1 | 5/2005 | Wilkinson |
| 2005/0244782 A1 | 11/2005 | Chishti et al. |
| 2005/0282106 A1 | 12/2005 | Sussman et al. |
| 2006/0008777 A1 | 1/2006 | Peterson et al. |
| 2006/0127848 A1 | 6/2006 | Sogo et al. |
| 2007/0218423 A1 | 9/2007 | Sapian |
| 2007/0238068 A1 | 10/2007 | Comfortes |
| 2007/0292821 A1 | 12/2007 | De Vreese |
| 2008/0085490 A1 | 4/2008 | Jabri |
| 2008/0153067 A1 | 6/2008 | Berckmans et al. |
| 2008/0176187 A1 | 7/2008 | Stumpel |
| 2008/0227056 A1 | 9/2008 | Bulard |
| 2008/0259411 A1 | 10/2008 | Karlsson |
| 2008/0287953 A1 | 11/2008 | Sers |
| 2008/0312659 A1 | 12/2008 | Metzger et al. |
| 2008/0318187 A1 | 12/2008 | Wilkinson |
| 2009/0004629 A1 | 1/2009 | Fishman et al. |
| 2009/0035720 A1 | 2/2009 | Viscomi |
| 2009/0263764 A1 | 10/2009 | Berckmans, III et al. |
| 2009/0274990 A1 | 11/2009 | Kim |
| 2009/0291417 A1 | 11/2009 | Rubbert et al. |
| 2010/0136500 A1 * | 6/2010 | Suter ............... A61C 1/084 433/75 |
| 2010/0173259 A1 | 7/2010 | Vogel et al. |
| 2010/0185201 A1 | 7/2010 | Kim |
| 2010/0192375 A1 | 8/2010 | Jacquemyns |
| 2010/0196842 A1 | 8/2010 | Jacquemyns |
| 2011/0112544 A1 | 5/2011 | Haber |
| 2011/0159455 A1 | 6/2011 | Stumpel |
| 2011/0217667 A1 * | 9/2011 | Groscurth ............... A61B 90/39 433/68 |
| 2011/0245951 A1 | 10/2011 | Gantes |
| 2011/0269104 A1 | 11/2011 | Berckmans, III et al. |
| 2012/0129126 A1 | 5/2012 | Nouriam et al. |
| 2012/0135373 A1 | 5/2012 | Cheng et al. |
| 2012/0143364 A1 | 6/2012 | Mcleod et al. |
| 2012/0175799 A1 | 7/2012 | Karlsson et al. |
| 2012/0178045 A1 | 7/2012 | Massad |
| 2012/0270176 A1 | 10/2012 | Jacquemyns |
| 2012/0308963 A1 | 12/2012 | Hasselgren et al. |
| 2012/0322025 A1 | 12/2012 | Ozawa et al. |
| 2013/0017507 A1 | 1/2013 | Moffson et al. |
| 2013/0084540 A1 * | 4/2013 | Yoshihara ............ A61C 8/0089 433/75 |
| 2013/0108988 A1 | 5/2013 | Simoncic |

(56) References Cited

U.S. PATENT DOCUMENTS

| | | |
|---|---|---|
| 2013/0108989 A1 | 5/2013 | Kim |
| 2013/0115573 A1 | 5/2013 | Lampl |
| 2013/0172731 A1 | 7/2013 | Gole |
| 2013/0177864 A1 | 7/2013 | Hultgren et al. |
| 2013/0209953 A1 | 8/2013 | Arlinsky et al. |
| 2013/0224691 A1 | 8/2013 | Liechtung |
| 2013/0244208 A1 | 9/2013 | Rubbert |
| 2013/0277874 A1 | 10/2013 | Johnson et al. |
| 2013/0280674 A1* | 10/2013 | Maksim .......... A61C 3/02 433/173 |
| 2013/0337412 A1 | 12/2013 | Kwon |
| 2014/0008826 A1 | 1/2014 | Dierkes et al. |
| 2014/0026419 A1 | 1/2014 | Haber |
| 2014/0080093 A1 | 3/2014 | Rubbert |
| 2014/0113251 A1 | 4/2014 | Schweiger et al. |
| 2014/0120495 A1* | 5/2014 | Zeigler, Jr. ........ A61B 17/1617 433/75 |
| 2014/0193769 A1 | 7/2014 | Mackey |
| 2014/0193770 A1 | 7/2014 | Mackey |
| 2014/0193772 A1 | 7/2014 | Mackey |
| 2014/0205968 A1* | 7/2014 | Jung .................. A61C 1/082 433/75 |
| 2014/0215804 A1 | 8/2014 | Jacquemyns |
| 2014/0234804 A1 | 8/2014 | Huang et al. |
| 2014/0242541 A1 | 8/2014 | Jung et al. |
| 2014/0242547 A1 | 8/2014 | Randall |
| 2014/0248577 A1* | 9/2014 | Tahmasebi .......... A61C 1/082 433/75 |
| 2014/0255873 A1 | 9/2014 | Bullis et al. |
| 2014/0272778 A1* | 9/2014 | Llop .............. A61C 8/0089 433/72 |
| 2014/0276879 A1* | 9/2014 | Lin ................ A61B 17/1757 606/96 |
| 2014/0277665 A1 | 9/2014 | Fisker |
| 2014/0308623 A1 | 10/2014 | Chang |
| 2014/0315154 A1 | 10/2014 | Jung et al. |
| 2014/0316750 A1 | 10/2014 | Jung et al. |
| 2014/0335470 A1 | 11/2014 | Fisker et al. |
| 2014/0358497 A1 | 12/2014 | Kuo et al. |
| 2015/0010881 A1* | 1/2015 | Llop .............. A61C 8/0089 433/75 |
| 2015/0057675 A1 | 2/2015 | Akeel et al. |
| 2015/0111173 A1 | 4/2015 | Jung et al. |
| 2015/0150684 A1 | 6/2015 | De Clerck |
| 2015/0182301 A1 | 7/2015 | Hegland |
| 2015/0202028 A1 | 7/2015 | Randall |
| 2015/0216638 A1 | 8/2015 | Baaske et al. |
| 2015/0230894 A1 | 8/2015 | Juzbasic et al. |
| 2015/0250568 A1 | 9/2015 | Fisker et al. |
| 2015/0251405 A1 | 9/2015 | Kopelman et al. |
| 2015/0257853 A1 | 9/2015 | Jacquemyns |
| 2015/0282913 A1 | 10/2015 | Zegarelli |
| 2015/0289954 A1 | 10/2015 | Chang |
| 2015/0302170 A1 | 10/2015 | Berckmans, III et al. |
| 2015/0327967 A1 | 11/2015 | Baaske et al. |
| 2016/0000522 A1 | 1/2016 | Ripoche et al. |
| 2016/0008093 A1 | 1/2016 | Lampl |
| 2016/0030141 A1 | 2/2016 | Kopelman et al. |
| 2016/0074141 A1 | 3/2016 | Lozada |
| 2016/0143716 A1 | 5/2016 | Beyer et al. |
| 2016/0143717 A1 | 5/2016 | Samrano |
| 2016/0157970 A1 | 6/2016 | Gantes |
| 2016/0193019 A1 | 7/2016 | Heinz et al. |
| 2017/0035536 A1 | 2/2017 | Alvarez Garcia et al. |
| 2017/0165030 A1* | 6/2017 | Liu .................. A61C 1/084 |
| 2017/0252126 A1* | 9/2017 | Llop ................ A61C 8/0027 |
| 2018/0140392 A1 | 5/2018 | Wismeijer |
| 2018/0177567 A1 | 6/2018 | Klein et al. |
| 2018/0235726 A1 | 8/2018 | Zastrow |
| 2018/0243057 A1 | 8/2018 | Fisker et al. |
| 2018/0263726 A1 | 9/2018 | Fares et al. |
| 2019/0105130 A1 | 4/2019 | Grove et al. |

FOREIGN PATENT DOCUMENTS

| | | |
|---|---|---|
| AU | 2017204455 A1 | 7/2017 |
| CN | 1678254 A | 10/2005 |
| CN | 102940517 A | 2/2013 |
| CN | 103561675 A | 2/2014 |
| CN | 104699865 A | 6/2015 |
| DE | 3730055 A1 | 3/1989 |
| DE | 4012327 A1 | 10/1991 |
| DE | 4013828 A1 | 1/1992 |
| DE | 19947844 A1 | 4/2001 |
| DE | 102010031018 A1 | 1/2012 |
| DE | 102012003811 A1 | 8/2013 |
| EP | 1547544 A1 | 6/2005 |
| EP | 1629793 A1 | 3/2006 |
| EP | 1796577 A1 | 6/2007 |
| EP | 2272462 A1 | 1/2011 |
| EP | 2366358 A1 | 9/2011 |
| EP | 2742906 A1 | 6/2014 |
| JP | S63275335 A | 11/1988 |
| JP | H01059113 U | 4/1989 |
| JP | H0810268 A | 1/1996 |
| JP | 3114270 U | 10/2005 |
| JP | 2006341067 A | 12/2006 |
| JP | 2007511275 A | 5/2007 |
| JP | 2009285358 A | 12/2009 |
| JP | 2018086276 A | 6/2018 |
| KR | 20030064772 A | 8/2003 |
| KR | 20120053455 A | 5/2012 |
| KR | 20160018156 A | 2/2016 |
| KR | 20160018158 A | 2/2016 |
| KR | 20160056855 A | 5/2016 |
| KR | 20180034872 A | 4/2018 |
| SI | 23494 A | 4/2012 |
| SU | 1438757 A1 | 11/1988 |
| SU | 1674828 A1 | 9/1991 |
| WO | 9115163 A1 | 10/1991 |
| WO | 9627343 A1 | 9/1996 |
| WO | 0032131 A1 | 6/2000 |
| WO | 0234154 A2 | 5/2002 |
| WO | 2004098435 A2 | 11/2004 |
| WO | 2005055852 A2 | 6/2005 |
| WO | 2007104842 A1 | 9/2007 |
| WO | 2007129955 A1 | 11/2007 |
| WO | 2008038471 A1 | 4/2008 |
| WO | 2008045965 A2 | 4/2008 |
| WO | 2008149822 A1 | 12/2008 |
| WO | 2009000505 A1 | 12/2008 |
| WO | 2009048475 A1 | 4/2009 |
| WO | 2009073498 A1 | 6/2009 |
| WO | 2009089129 A1 | 7/2009 |
| WO | 2009094576 A1 | 7/2009 |
| WO | 2009105684 A1 | 8/2009 |
| WO | 2010086459 A1 | 8/2010 |
| WO | 2011003612 A1 | 1/2011 |
| WO | 2011091382 A1 | 7/2011 |
| WO | 2012006717 A1 | 1/2012 |
| WO | 2012076574 A2 | 6/2012 |
| WO | 2012085285 A2 | 6/2012 |
| WO | 2012110850 A2 | 8/2012 |
| WO | 2012162605 A2 | 11/2012 |
| WO | 2012163466 A1 | 12/2012 |
| WO | 2013026600 A1 | 2/2013 |
| WO | 2013181721 A2 | 12/2013 |
| WO | 2014113761 A1 | 7/2014 |
| WO | 2014135178 A1 | 9/2014 |
| WO | 2014138643 A2 | 9/2014 |
| WO | 2014198873 A1 | 12/2014 |
| WO | 2016073053 A1 | 5/2016 |
| WO | 2016094272 A1 | 6/2016 |
| WO | 2016142943 A1 | 9/2016 |
| WO | 2016187493 A1 | 11/2016 |
| WO | 2018012735 A1 | 1/2018 |

OTHER PUBLICATIONS

International Search Report and Written Opinion for Application No. PCT/US18/22655, dated Aug. 13, 2018.

(56) References Cited

OTHER PUBLICATIONS

Australian Search Report for Application No. 2019201385, dated May 14, 2020, 1 page.
International Search Report including the Written Opinion from Application No. PCT/US2020/012357 dated May 7, 2020, 21 pages.
Russian Search Report for Application No. 2019132692, dated Apr. 7, 2020, pp. 1-2.
Russian Search Report for Application No. 2017109831 dated Sep. 18, 2020; 2 pages.
Supplementary European Search Report for EP18767819 dated Oct. 8, 2020; 2 pages.
Search Report from First Office Action in Indian Application No. 201917039652 dated Feb. 19, 2021; 1 page.

* cited by examiner

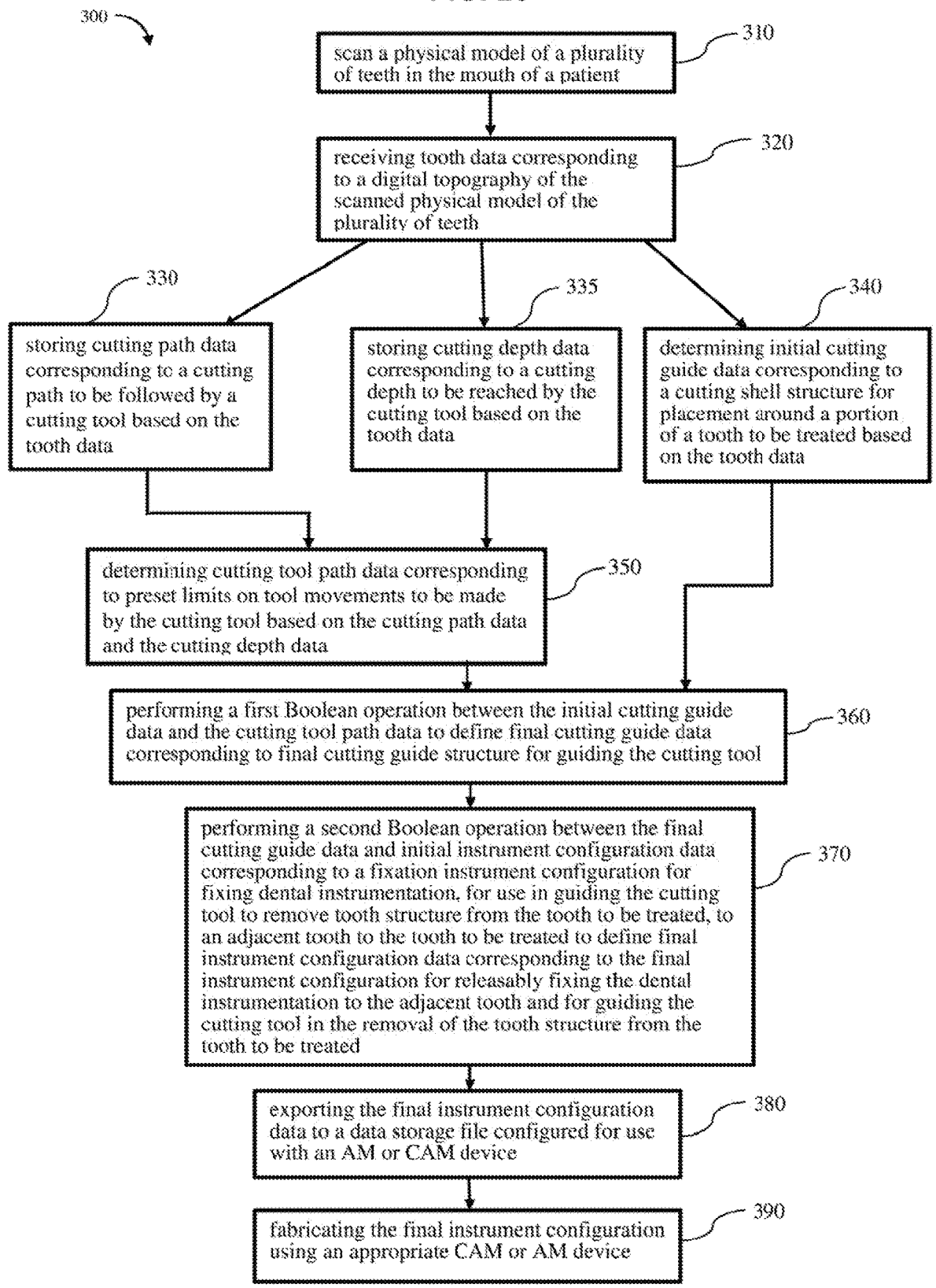

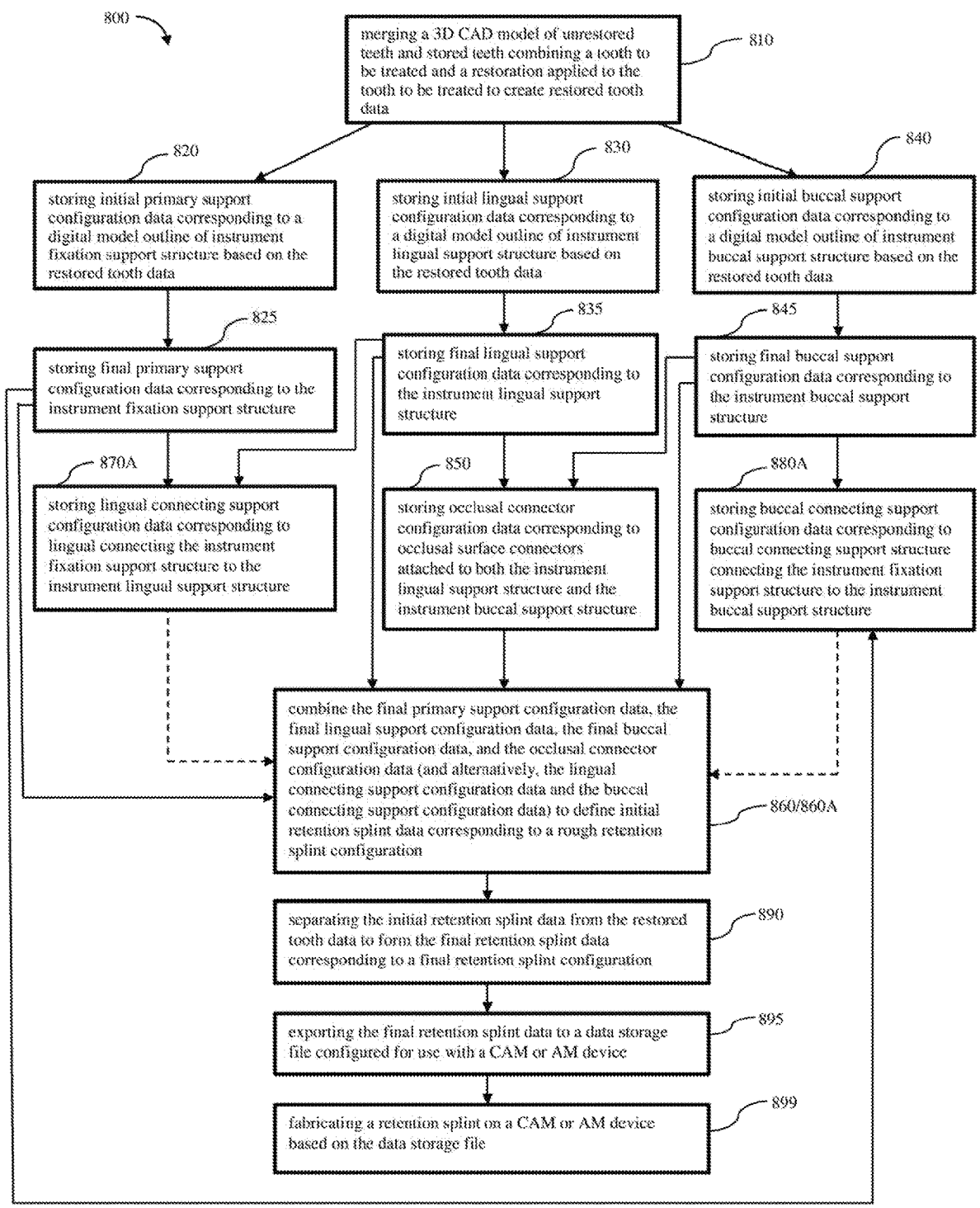

SYSTEM FOR PREPARING TEETH FOR THE PLACEMENT OF VENEERS

CROSS-REFERENCE TO RELATED APPLICATION

The present application claims the benefit of the filing date of U.S. Provisional Patent Application No. 62/472,372, filed Mar. 16, 2017, the disclosure of which is hereby incorporated herein by reference.

FIELD OF THE TECHNOLOGY

The present invention relates to devices, systems, and processes for preparing a tooth for a tooth restoration, and in particular to systems and processes for preparing instrumentation, as well as to such instrumentation, for use in preparing a tooth to receive a tooth restoration.

BACKGROUND OF THE TECHNOLOGY

Complete, intact teeth that are cosmetically desirable, wear evenly, and provide a balanced bite are the objectives of patients. Over time, however, problems arise in teeth due to accidents, deterioration from wear and tear, decay due to any of poor oral hygiene, insufficient oral care practices, consumption of certain foods such as sweets, use of tobacco, disease, medications, certain congenital conditions, and environmental effects, tooth movement, etc. In some instances, teeth simply never achieve a cosmetic appearance desired by a patient. To this end, dental practitioners and their patients have relied on a variety of methods to repair these deformities and weaknesses of the teeth.

The repair of teeth often requires preparation and modification of the exterior shape and size of a tooth to be able to receive various prostheses or restorations such as crowns, inlays, onlays, bridges, and veneers. Also, to prepare the appropriate prosthesis or restoration, either impressions or 3-dimensional scanning must be conducted of the original unmodified tooth and often the modified tooth at a later time. Dental practitioners often place a temporary prosthesis over the modified or prepared tooth while a permanent prosthesis is manufactured, but the use of such a temporary device and the removal of any cement used to place the temporary device over the prepared tooth may create a discrepancy between the prepared tooth and the internal configuration of the prosthesis.

Recently, systems and methods have been developed by Viax Dental Technologies, LLC to form a guiding device for use in preparing a working tooth requiring treatment to receive a restoration along with the placement of a previously prepared restoration corresponding to the configuration of the guiding device during the same visit, thus obviating the need for a temporary prosthesis. Such systems, methods, and devices are disclosed in U.S. Patent Application Publication No. US20100192375 A1, now abandoned; U.S. Patent Application Publication No. US20100196842 A1, now U.S. Pat. No. 8,640,338; and U.S. Patent Application Publication No. 2014/0248577 A1 ("the '577 Publication"), the disclosures of each of which are hereby incorporated by reference herein. Still, further improvements are needed to more efficiently and reliably treat the teeth of patients for receiving restorations and other prostheses.

SUMMARY OF THE TECHNOLOGY

In accordance with the present technology, a system, methods, and products have been discovered which provide a simpler, more reliable and more convenient technique for treating a tooth in need of a restoration part to correct either or both of a deformity and a weakness of a tooth or either or both of deformities and weaknesses of a plurality of teeth. There is provided a system of dental devices that may be used to modify a tooth to be treated by limiting the removal of tooth material to produce a shape or configuration that mates with or corresponds to an interior configuration of a restoration part. This system makes it possible to prepare a restoration part in advance of the preparation of the tooth to be treated. Also, the tooth can be accurately prepared with the configuration that corresponds to and mates with the internal configuration of the restoration part. By following this technique, the restoration part is available to be installed immediately after the preparation of the tooth to be treated. Therefore, in a single office visit, it is possible for the dentist to prepare the tooth to be treated and mount the restoration part onto the prepared tooth. As used herein, it is to be understood that a reference to a tooth to be treated means a single tooth to be treated or a plurality of teeth to be treated.

As with conventional methods of treatment, in accordance with the present technology, there first may be a diagnosis indicating the need to treat a tooth with a restoration part. The diagnosis may be based on initial x-rays or other diagnostic techniques, such as but not limited to magnetic resonance imaging (MRI), handheld or other intraoral three-dimensional (3D or 3-D) scanners, that identify the location and extent of decay, cracks, weaknesses, dislocations, deformities, impediments to bite, or other maladies or undesirable aspects of the tooth to be treated. A first physical 3D model which may be any one or a combination of a mold, a cast, an impression, other physical model, and a computer-generated model, may be created based on the obtained diagnostic information of the original tooth to be treated. At this point the present technology may diverge from conventional techniques in practice. Conventional techniques require the tooth to be revised and reshaped to remove the decay, cracks, and other maladies to leave a prepared tooth with sufficient strength and wear characteristics for the receipt and permanent attachment to a restoration part. After tooth structure has been removed during preparation of the tooth to be treated, the revised configuration of the prepared tooth is generally determined from a second 3D model which may also be any one or combination of a mold, a cast, an impression, other physical model, and a computer-generated model. The prepared, revised tooth is normally fitted with a temporary crown, to protect the prepared tooth and provide some comfort for the patient until the restoration part is manufactured, which can take days to weeks. Both the first and the second physical 3D models are then used, usually at an off-site laboratory, to prepare the restoration. The original tooth configuration provided by the first physical 3D model provides the basis for determining and preparing the exterior surface of the restoration part while the prepared, revised tooth configuration provided by the second physical 3D model provides the reverse or negative of the interior surface of the restoration part to be prepared. The thickness of the restoration part is provided by the difference between the determined exterior and interior surfaces of the restoration part to be prepared. The first and second physical 3D models also serve to provide the configuration of adjacent teeth to the tooth or teeth to receive a restoration such that the eventual restoration properly aligns and interfaces with the adjacent teeth. These models further serve to provide the configuration of antagonist teeth which is used to preparing the occlusal surface of the restoration such that there will be appropriate occlusion contact between the restoration and the antagonist teeth.

The procedure of the present technology reduces inconveniences to patients such as eliminating one or more office visits and eliminating the need for wearing a temporary crown. With this technology, there is no need to prepare the tooth to be treated prior to producing the restoration part. There is also no need to produce a physical 3D model for the prepared tooth prior to installing the restoration part. There is no need for a temporary crown to be installed over the prepared tooth, and thus there is no need to remove the temporary crown and associated cement which can interfere with the fit of the restoration part. Complications due to such interference may require the prepared tooth to be further revised to fit the restoration or require further modification of the restoration part. Also eliminated is discomfort to the patient in wearing a temporary device and the greater risk of infection due to the exposure of the prepared tooth, whether or not a temporary crown is used.

In accordance with another aspect of the technology, a system for use by a dentist in precisely preparing, revising, or modifying a working tooth to be treated for receipt of a restoration, which preferably may be preformed prior to use of the system and which may be but is not limited to being an inlay, onlay, crown, bridge, or veneer, is provided. Such a system may include two main components: (i) at least one dental instrument configured for contacting one or more surfaces of a suitable guiding configuration of an overlay device and for contacting tooth structure to remove such tooth structure and (ii) at least one overlay device, which may be a dental overlay, that is configured for attachment to either or both of a working tooth to be treated and an adjacent or neighboring tooth (or adjacent teeth or neighboring teeth) of the tooth to be treated and that further includes one or more guiding surfaces to contact the dental instrument to limit 3D movement of such instrument to a predetermined 3D region of the tooth to be treated from which tooth structure is to be removed. In operation, the overlay device may coordinate with the dental instrument to limit the 3D movement of the dental instrument with respect to a tooth being treated, when the dental instrument appropriately contacts the guiding surface or surfaces of the overlay device, such that the dental instrument removes tooth structure from a predetermined 3D region of the tooth being treated to form a prepared tooth. In this manner, the prepared tooth may be prepared to conform to the configuration of the preformed restoration. The preformed restoration may then be placed permanently or substantially permanently on the prepared tooth.

In some arrangements, the dental instrument may include a cutting tool, which may be but is not limited to being a dental burr, configured for the removal of the tooth structure to be removed from the working tooth to be treated. In a modified version, the system may further include a dental placement device, which may be in the form of another overlay device, configured for the placement of a restoration. The dental placement device may be configured for maintaining the position of the restoration against the tooth (or a corresponding set of teeth) being treated during affixation of the restoration to the tooth (or the corresponding set of teeth). A method of use of such system and the modified system is further provided in accordance with the present technology.

In accordance with another aspect of the technology, dental instrumentation for use in guiding a cutting tool to remove tooth structure from a tooth to be treated in the mouth of a patient may be prepared by a process. In this process, a first Boolean operation may be performed by one or processors between initial cutting guide data corresponding to a cutting guide shell structure for placement around a portion of the tooth to be treated and cutting tool path data corresponding to preset limits on tool movements to be made by the cutting tool. The first Boolean operation may define final cutting guide data corresponding to final cutting guide structure for guiding the cutting tool. In this process, a second Boolean operation may be performed by the one or more processors between initial instrument configuration data corresponding to a fixation instrument configuration for fixing the dental instrumentation to an adjacent tooth to the tooth to be treated in the mouth of the patient and the final cutting guide data. The second Boolean operation may define final instrument configuration data corresponding to a final instrument configuration for releasably fixing the dental instrumentation to the adjacent tooth and for guiding the cutting tool in the removal of the tooth structure from the tooth to be treated.

In some arrangements, a physical model of a plurality of teeth in the mouth of the patient may be scanned and original tooth data corresponding to a digital topography of the scanned physical model of the plurality of teeth may be received by the one or more processors. The plurality of teeth may include the tooth to be treated. In some such arrangements, tooth addition data corresponding to digital void fillers for filling the digital topography of the scanned physical model of the set of teeth may be stored by the one or more processors and the original tooth data and the tooth addition data may be meshed by the one or more processors to define new tooth data. In some such arrangements, first cutting path data corresponding to a first cutting path to be followed by the cutting tool based on the original tooth data or the new tooth data may be stored by the one or more processors, and first cutting depth data corresponding to a cutting depth to be reached by the cutting tool based on the original tooth data or the new tooth data may be stored by the one or more processors. The cutting tool path data may be based on the first cutting depth data and the first cutting path data.

In some arrangements, the first cutting depth data may be included in the first cutting path data. In some arrangements, the first cutting path may be curved. In some arrangements, the first cutting path may be planar.

In some arrangements, first cutting path data corresponding to a first cutting path to be followed by the cutting tool based on the original tooth data or the new tooth data may be stored by the one or more processors. In such arrangements, first cutting depth data corresponding to a cutting depth to be reached by the cutting tool based on the original tooth data or the new tooth data may be stored by the one or more processors. The first cutting path data may be adjusted by the one or more processors to create second cutting path data corresponding to a second cutting path adjusted from the first cutting path. In such arrangements, the second cutting path data may be stored by the one or more processors in which the cutting tool path data may be based on the first cutting depth data and either the first cutting path data or the second cutting path data. In some arrangements, the cutting tool path data may be determined by the one or more processors based on the first cutting depth data and the first cutting path data or the second cutting path data. In some arrangements, the initial cutting guide data may be determining by the one or more processors based on the original tooth data or the new tooth data.

In some arrangements, the initial instrument configuration data may be stored by the one or more processors in which the original tooth data may define an original tooth digital model, the tooth addition data may define a void fill digital model, the new tooth data may define a new tooth digital model, the first cutting path data may define a first cutting path digital model, the first cutting depth data may define a first cutting depth digital model, the second cutting path data may define a second cutting path digital model, the initial cutting guide data may define an initial cutting guide digital model, the final cutting guide data may define a final cutting guide digital model, the initial instrument configuration data may define an initial instrument configuration digital model, and the final instrument configuration data may define a final instrument configuration digital model.

In some arrangements, the cutting guide shell structure may be a guide body outer shell corresponding to a digital guide body outer shell.

In some arrangements, the cutting tool path data may be determined by the one or more processors based on cutting path data corresponding to movements of the cutting tool predefined for the removal of the tooth structure from the tooth to be treated.

In some arrangements, the cutting tool may be a dental bur. In some such arrangements, the final cutting guide structure may correspond to a cutting guide of a dental overlay. In some such arrangements, the fixation instrument configuration may correspond to a tooth wrap of the dental overlay.

In some arrangements, the final instrument configuration data may be exported by the one or more processors to a data storage file configured for use with a computer-aided manufacturing (CAM) or additive manufacturing (AM) device.

In some arrangements, the dental instrumentation may be fabricated on the AM device, based on the data storage file, using an additive manufacturing process. In some such arrangements, the dental instrumentation may be a dental cutting guide.

In accordance with another aspect of the technology, dental instrumentation for use in applying a restoration to a tooth to be treated in the mouth of a patient may be prepared by a process. In this process, initial primary support configuration data corresponding to a digital model outline of instrument fixation support structure based on restored tooth data may be stored by one or more processors. Final primary support configuration data corresponding to the instrument fixation support structure may be stored by the one or more processors. Initial lingual support configuration data corresponding to a digital model outline of instrument lingual support structure based on the restored tooth data may be stored by the one or more processors. Final lingual support configuration data corresponding to the instrument lingual support structure may be stored by the one or more processors in which the instrument lingual support structure may be attached to the instrument fixation support structure. Initial buccal support configuration data corresponding to a digital model outline of instrument buccal support structure based on the restored tooth data may be stored by the one or more processors. Final buccal support configuration data corresponding to the instrument buccal support structure may be stored by the one or more processors in which the instrument buccal support structure may be attached to the instrument fixation support structure. Occlusal connector configuration data corresponding to occlusal surface connectors attached to both the instrument lingual support structure and the instrument buccal support structure may be stored by the one or more processors. The final primary support configuration data, the final lingual support configuration data, the final buccal support configuration data, and the occlusal connector configuration data may define initial retention splint data corresponding to a rough retention splint configuration.

In some arrangements, the restored tooth data may correspond to a 3D model of a plurality of existing and restored teeth in the mouth of the patient including the tooth to be treated and a restoration applied to the tooth to be treated.

In some arrangements, the initial retention splint data may be separated by the one or more processors from the restored tooth data to form final retention splint data corresponding to a final retention splint configuration. In some such arrangements, the initial primary support configuration data may define an initial primary support design digital model, the final primary support configuration data may define a final primary support design digital model, the initial lingual support configuration data may define an initial lingual support configuration digital model, the final lingual support configuration data may define a final lingual support configuration digital model, the initial buccal support configuration data may define an initial buccal support configuration digital model, the final buccal support design data may define a final buccal support configuration digital model, the occlusal connector configuration data may define an occlusal connector configuration digital model, the initial retention splint data may define a rough retention splint digital model, the restored tooth data may define a restored tooth digital model, and the final retention splint data may define a final retention splint digital model.

In some arrangements, the final retention splint data may be exported by the one or more processors to a data storage file configured for use with a CAM or AM device. In some such arrangements, the final retention splint configuration may be a tray for placing veneers. In such arrangements, the tray for placing veneers may be fabricated on the AM device, based on the data storage file, using an additive manufacturing process.

In some arrangements, lingual connecting support configuration data corresponding to lingual connecting support structure connecting the instrument fixation support structure to the instrument lingual support structure may be stored by the one or more processors. Buccal connecting support configuration data corresponding to buccal connecting support structure connecting the instrument fixation support structure to the instrument buccal support structure may be stored by the one or more processors. In some such arrangements, the lingual connecting support configuration data may be manipulated by the one or more processors in which the manipulation of the lingual connecting support configuration data may correspond to a smoothening of a digital model of the lingual connecting support structure. The buccal connecting support configuration data may be manipulated by the one or more processors in which the manipulation of the buccal connecting support configuration data may correspond to a smoothening of a digital model of the buccal connecting support structure. In some such arrangements, the initial retention splint data may be further defined by the lingual connecting support configuration data and the buccal connecting support configuration data. In some arrangements, the lingual connecting support configuration data may define a lingual connecting support configuration digital model, and the buccal connecting support configuration data may define a buccal connecting support configuration digital model.

In some arrangements, the initial primary support configuration data may be manipulated to define the final primary support configuration data in which the manipulation of the initial primary support configuration data may correspond to embossing the outline of the digital model outline of the instrument fixation support structure. In such arrangements, the initial lingual support configuration data may be manipulated to define the final lingual support configuration data in which the manipulation of the initial lingual support configuration data may correspond to embossing the outline of the digital model outline of the instrument lingual support structure. In such arrangements, the initial buccal support configuration data may be manipulated to define the final buccal support configuration data in which the manipulation of the initial buccal support configuration data may correspond to embossing the outline of the digital model outline of the instrument buccal support structure.

In accordance with another aspect of the technology, a working tooth to be treated in the mouth of a patient may be treated by a process. In this process, a first surface of a guide device may be secured onto one or more teeth of the patient. A drive shaft of a cutting device may be inserted into an opening of the guide device. A flange of the cutting device may be inserted in a direction perpendicular or otherwise transverse to a longitudinal axis of the drive shaft into a slot of the guide device in which the slot may be in communication with the opening of the guide device. The slot may have a first dimension within a first plane perpendicular or otherwise transverse to the longitudinal axis of the drive shaft in which the first dimension is taken in or along a direction the flange extends when the flange is inserted into the slot that is greater than a corresponding second dimension of the opening within a second plane parallel to the first plane in which the second dimension is taken in or along the direction the flange extends when the flange is inserted into the slot. The cutting device may be moved, such as by being slid, to remove portions of the working tooth in preparing a working surface of the working tooth in which movement of the cutting device may be limited by the guide device to directions within the first plane and to a thickness of the slot extending in a direction perpendicular to the first plane. In this manner, the flange of the cutting device may be prevented from being received in the opening due to its dimensions being larger than otherwise corresponding dimensions of the opening. The flange of the cutting device may be removed from the slot. The guide device may be removed from the mouth of the patient. A restoration then may be secured by an adhesive to the working surface of the working tooth.

In some arrangements, a retention splint retaining the restoration may be secured onto opposing distal teeth of the patient's teeth such that the restoration is retained against the working surface of the working tooth when the first surface of the guide device is secured onto one or more teeth of the patient. In some such arrangements, the restoration may be any one or any combination of a dental crown, a dental bridge, and a dental veneer. In some arrangements, the dental cutting device may include a dental bur.

In some arrangements, a drive head of the cutting device may be exterior to the guide device when the flange of the cutting device is fully inserted into the slot of the guide device.

In another aspect of the technology, a dental instrument may include a hand grip, a drive head, a drive shaft, a cutting tool, and a flange. The drive head may be attached to the hand grip. The drive shaft may extend from the drive head. The cutting tool may be attached to the drive shaft and may extend along a longitudinal axis of the drive shaft. The flange may extend around the drive shaft and may be spaced from the drive head. The flange may have length and width dimensions along axes perpendicular to the longitudinal axis of the drive shaft and may have a thickness dimension along an axis parallel to the longitudinal axis of the draft shaft in which either or both of the length and the width dimensions of the flange may be greater than the thickness dimension of the flange.

In another aspect of the technology, a dental overlay device for limiting the operation of a dental instrument to a removal of a predetermined portion of the structure of a tooth to be treated in the mouth of a patient may include a body having a length, a width, and a thickness. The body may include a first surface, a second surface opposite the first surface, a first opening, a second opening, and a slot. One or more distances between the first surface and the second surface may define the thickness of the body. The first surface may be complementary to and configured for contacting portions of one or more teeth in the mouth of the patient to secure the body in a suitable position with respect to the tooth to be treated. The first opening may extend through the first surface and may be configured for exposing portions of the tooth structure to be removed from the tooth to be treated. The second opening may be opposite the first opening and may extend through the second surface in which the second opening may be configured for receiving a shaft of a dental instrument through the opening. The slot may be in communication with the second opening and may be configured for receiving a flange extending from the shaft in a direction perpendicular or otherwise transverse to a longitudinal axis of the shaft. The slot may have a first dimension taken in or along a first direction, in which the first dimension is within a first plane generally parallel to the length and the width of the body, that is greater than a corresponding second dimension of the second opening taken in or along the first direction, in which the second dimension is within a second plane parallel to the first plane. In this manner, when the shaft of the dental instrument is received through the second opening and the flange is received in the slot, movement of the flange may be limited by the slot. The second opening may define a first side opening through the thickness on an end of the slot for receiving the shaft of the dental instrument within and in a direction along a plane parallel to the first plane. The slot may define a second side opening through the thickness on an end of the slot for receiving the flange within and in a direction along the first plane.

In accordance with another aspect of the technology, a dental system for removing a predetermined portion of the structure of a tooth to be treated in the mouth of a patient may include a dental instrument and a dental overlay device for limiting the operation of a dental instrument to a removal of the predetermined portion of the structure of the tooth to be treated. The dental overlay device may include a body having a length, a width, and a thickness. The body may include a first surface, a second surface opposite the first surface, a first opening, a second opening, and a slot. One or more distances between the first surface and the second surface may define the thickness of the body. The first surface may be complementary to and configured for contacting portions of one or more teeth in the mouth of the patient to secure the body in a suitable position with respect to the tooth to be treated. The first opening may extend through the first surface and may be configured for exposing portions of the tooth structure to be removed from the tooth to be treated. The second opening may be opposite the first opening and may extend through the second surface in which the second opening may be configured for receiving a shaft of a dental instrument through the opening. The slot may be in communication with the second opening and may be configured for receiving a flange extending from the shaft in a direction perpendicular or otherwise transverse to a longitudinal axis of the shaft. The slot may have a first dimension taken in or along a first direction, in which the first dimension is within a first plane generally parallel to the length and the width of the body, that is greater than a corresponding second dimension of the second opening taken in or along the first direction, in which the second dimension is within a second plane parallel to the first plane. In this manner, when the shaft of the dental instrument is received through the second opening and the flange is received in the slot, movement of the flange may be limited by the slot. The second opening may define a first side opening through the thickness on an end of the slot for receiving the shaft of the dental instrument within and in a direction along a plane parallel to the first plane. The slot may define a second side opening through the thickness on an end of the slot for receiving the flange within and in a direction along the first plane. The dental instrument may include a hand grip, a drive head, a drive shaft, a cutting tool, and a flange. The drive head may be attached to the hand grip. The drive shaft may extend from the drive head. The cutting tool may be attached to the drive shaft and may extend along a longitudinal axis of the drive shaft. The flange may extend around the drive shaft and may be spaced from the drive head. The flange may have length and width dimensions along axes perpendicular to the longitudinal axis of the drive shaft and a thickness dimension along an axis parallel to the longitudinal axis of the draft shaft in which either or both of the length and the width dimensions of the flange are greater than the thickness dimension of the flange. The drive shaft may be receivable through the first side opening of the second opening, and the flange may be receivable through the second side opening. When the flange of the dental instrument is received within the slot, movement of the flange in directions within the first plane and in a direction perpendicular to the first plane may be limited by the slot.

In accordance with an aspect of the technology, a dental overlay system for the placement of one or more veneers into the mouth of a patient may include one or more veneers and a dental overlay device. The dental overlay device may include a curved body. A body surface on the curved body may be complementary to and configured for contacting portions of one or more teeth in the mouth of a patient, including distal teeth on opposite sides of the patient's mouth, to secure the body in a suitable position on the patient's teeth. The one or more veneers may be temporarily attached to the body surface. A plurality of holes may extend through the curved body and may correspond to locations on a plurality of teeth.

In some arrangements, the body surface may include first and second portions that may be configured for contacting molars on opposite sides of the patient's mouth. The first and second portions of the body surface may be solid such that no holes extend through these portions.

In some arrangements, the curved body may define individual tooth forms each having an outline of a portion of a tooth of the teeth in the patient's mouth and through which the holes of the plurality of holes extend. In such arrangements, a maximum of two holes may extend through each individual tooth form of the curved body. In some such arrangements, one or more of the individual tooth forms of the curved body do not have any holes that extend through such tooth forms.

In some arrangements, the dental overlay device may include a minimum of 16 holes through the curved body for use with the placement of ten (10) veneers corresponding to a full dental arch. In some arrangements, the dental overlay device may include a maximum of 20 holes through the curved body for use with the placement of ten (10) veneers corresponding to a full dental arch. In some such arrangements, the dental overlay device may include a minimum of 16 holes through the curved body.

In some arrangements, the curved body may define individual tooth forms each having an outline of a portion of a tooth of the teeth in the patient's mouth and through which the holes of the plurality of holes extend. In such arrangements, a minimum of three holes may extend through each individual tooth form of the curved body for each tooth form through which a hole of the plurality of holes extend. In some such arrangements, a maximum of six holes may extend through each individual tooth form of the curved body.

In some arrangements, the dental overlay device may include a minimum of 30 holes through the curved body for use with the placement of ten (10) veneers corresponding to a full dental arch. In some arrangements, the dental overlay device may include a maximum of 60 holes through the curved body for use with the placement of ten (10) veneers corresponding to a full dental arch. In some such arrangements, the dental overlay device may include a minimum of 30 holes through the curved body.

In some arrangements, at least some of the plurality of holes may have a diameter in the range of approximately 1.5 mm to approximately 4 mm.

BRIEF DESCRIPTION OF THE DRAWINGS

A more complete appreciation of the subject matter of the present technology and the various advantages thereof may be realized by reference to the following detailed description which refers to the accompanying drawings, in which:

FIG. 20 is a process flow diagram of a process for preparing the teeth of a patient to receive a restoration in accordance with an embodiment;

FIG. 44 is a process flow diagram of a process for preparing a placement and retention device for applying a restoration to the teeth of a patient in accordance with an embodiment.

DETAILED DESCRIPTION

Figure 1:
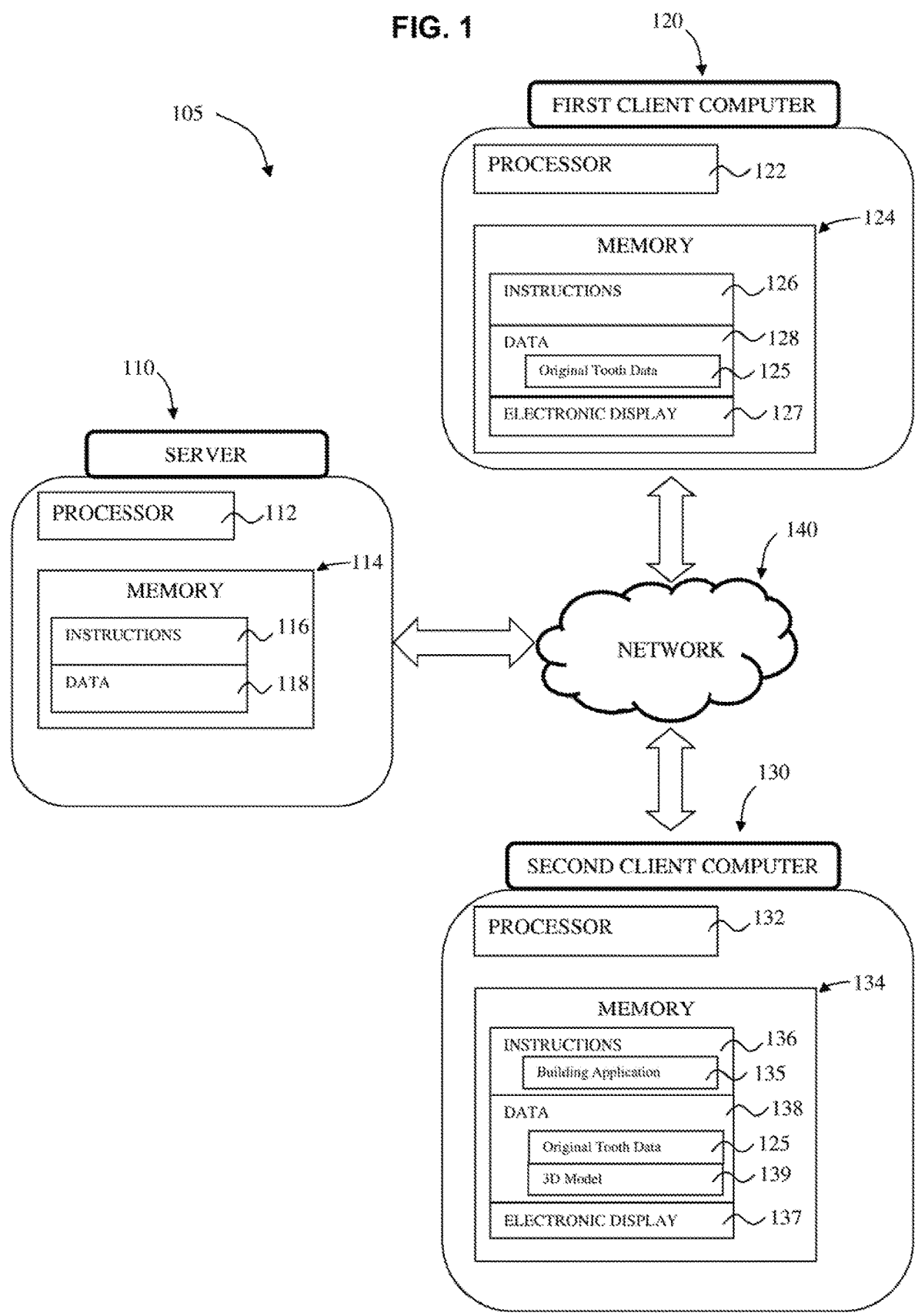
FIG. 1 is a functional diagram in accordance with an embodiment.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The terms "lower," "upper," "top," "bottom," and variations of such terms as well as derived directional terms such as "horizontal," "vertical," "upward," and "downward" are based on a normal configuration of an overlay as shown in the drawings, in which the overlay is fitted onto the lower teeth of a patient with the roots of the teeth extending vertically downward. The term "dentist" in this text is not to be interpreted restrictively and can also be read as dental practitioner, dental technician, dental assistant, dental hygienist, dental auxiliary, dental therapist, dental designer, etc.

According to conventional techniques, a diagnostic evaluation of a tooth reveals an existing condition requiring a tooth to be treated by the installation of a restoration or prosthesis. Under these conventional approaches, the tooth to be treated is revised and prepared first, and then its revised configuration is used to fabricate the internal configuration of the restoration. Therefore, the restoration is fabricated to fit the already prepared tooth.

In accordance with an embodiment of the present technology, as with such conventional approaches, a dentist may identify by either or both of x-ray and other diagnostic techniques portions of an existing working tooth of a patient that should be removed, due to e.g., decay, cracks, weaknesses, dislocations, deformities, impediments to bite, or other maladies or undesirable aspects of the tooth. In some arrangements, the dentist may then prepare a physical 3D model, which preferably may be any one or a combination of a cast, a mold, and an impression, of the entire lower or entire upper set of teeth in the patient's mouth that include the working tooth and a neighboring tooth or neighboring teeth of the working tooth, although in some instances the physical 3D model may only include a portion of the lower or the upper set of teeth as the case may be.

Referring now to the drawings, the prepared physical 3D model then may be digitally scanned with a scanning device by the dentist, such as with but not limited to being with a handheld 3D scanner or other scanning devices such as those by Imetric 3D providing photogrammetry and structured light scanning, to create original tooth data 125 to be stored in memory 124 of first client computer 120, as referenced in FIG. 1, corresponding to a scanned topography of the physical 3D model including a model of the working tooth to be treated. In some other arrangements, the dentist may directly scan, e.g., with a handheld 3D scanner, all or a portion of the lower or upper set of teeth including the working tooth in the patient's mouth to create original tooth data 125. Alternatively, the dentist may send the physical 3D model to a third party, which preferably may be, or may work in conjunction with, a second user of second client computer 130 described further herein and further referenced in FIG. 1, who or which may digitally scan the physical 3D model prepared by the dentist to create original tooth data 125.

A system for preparing instrumentation to assist in the preparation of one or more working teeth to receive a restoration, for the actual preparation of the one or more working teeth to receive the restoration, for preparing the restoration, and for placing the restoration is provided.

As further shown in FIG. 1, system 105 may be used, among other functions, to generate, store and share data corresponding to three-dimensional models of structures, such as but not limited to teeth. System 105 may include at least one server computer 110, first client computer 120, and at least second client computer 130 which may be located remotely from the first client computer. Each of these computers may send and receive information via network 140.

Network 140, and intervening communication points, may include various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Communications among these configurations and applying these protocols may be facilitated by any device configured for transmitting data to and from other computers, such as modems (e.g., dial-up, cable, or fiber optic) and wireless interfaces. Although FIG. 1 illustrates only a few devices, system 105 may include a large number of connected computers, with each different computer being at a different communication point of the network.

Computers 110, 120, 130 each may include a processor and memory. For example, server 110 may include memory 114 which stores information accessible by processor 112, first client computer 120 may include memory 124 which stores information accessible by processor 122, and second client computer 130 may include memory 134 which stores information accessible by processor 132. Each of processors 112, 122, 132 may be any conventional processor, such as commercially available central processing units (CPUs). Alternatively, any of processors 112, 122, 132 may be dedicated controllers such as an ASIC, FPGA, or another hardware-based processor. Although shown in FIG. 1 as being within the same block, each processor and its corresponding memory may actually comprise multiple processors and memories that may or may not be stored within the same physical housing. For example, memories may be a hard drive or other storage media located in a server farm of a network data center. Accordingly, references to a processor, memory, or computer will be understood to include references to a collection of processors, memories, or computers that may or may not operate in parallel.

Each of memories 114, 124, 134 may include first part storing applications or instructions 116, 126, 136 that may be executed by the respective processor. Instructions 116, 126, 136 may be any set of instructions to be executed directly (such as machine code) or indirectly (such as scripts) by the processor. In that regard, the terms "applications," "instructions," and "programs" may be used interchangeably herein. The memories may also include second part storing data 118, 128, 138 that may be retrieved, stored or modified in accordance with the respective instructions. The memory may include any type configured for storing information accessible by the processor, such as a hard-drive, memory card, ROM, RAM, DVD, CD-ROM, write-capable, and read-only memories or various combinations of the foregoing, where instructions or applications 116, 126, 136 and corresponding data 118, 128, 138 are stored on the same or different types of media.

For example, the dentist or the referenced third party may store original tooth data 125 of data 128, once generated, within memory 124 of first client computer 120. Generated original tooth data 125 may then be uploaded to server 110 and distributed via network 140 to second client computer 130. Alternatively, when the third party is or works in conjunction with the second user of second client computer 130, original tooth data 125 may be received by second client computer 130 directly from the scanning device used to scan the topography of the lower or upper set of teeth of the patient or of the physical 3D model of such teeth (hereinafter referred to as the "scanned tooth topography"), as the case may be.

In addition to a processor, memory and instructions, client computers 120, 130 may have all of the components used in connection with a personal computer. For example, the client computers may include electronic display 127, 137 (e.g., a monitor having a screen, a touch-screen, a projector, a television, a computer printer or any other electrical device that is operable to display information including but not limited to a smartphone or other similar handheld device), one or more user inputs (e.g., a mouse, keyboard, touch screen and/or microphone), one or more sound outputs such as speakers, and all of the components used for connecting these elements to one another.

As further shown in FIG. 1, at least instructions 136 of second client computer 130 may include building application 135, or alternatively solid model building application 135A. The building application may be computer-aided design (CAD) 3-D modeling software or equivalent as known in the art, which preferably may be but is not limited to being GEOMAGIC FREEFORM by 3D Systems, Inc. or SOLIDWORKS® by SolidWorks Corporation but may also be other similar software programs such as but not limited to Autodesk® AutoCAD®, Creo® by Parametric Technology Corporation (formerly Pro/Engineer), Siemens PLM Software NX™ (formerly Unigraphics NX), and CATIA® by Dassault Systèmes. After receiving original tooth data 125, building application 135 may execute instructions, among other instructions it may execute, to convert the original tooth data into digital 3D model 139 which may be a wireframe structure in the form of the scanned topography of either or both of a lower and an upper set of teeth of the patient (which may be a scanned topography of the physical 3D model) including the working tooth to be treated. In this manner, 3D model 139 may be viewable on electronic display 137, such as within a graphical user interface (GUI) of building application 135, and modifiable with a user input by a second user, who or which may be the first user or a different user from the first user, using building application 135.

In some arrangements, instructions 126 of first client computer 120 may also include a building application, and in some such arrangements, this building application may be the same as building application 135. In this manner, in such arrangements, first client computer 120 may convert original tooth data 125 into digital 3D model 139 for viewing or possible modification of the model before uploading the original tooth data or a modified version of the original tooth data to server 110. Either or both of building application 135 of second client computer 130 and any building application stored in memory 124 of first client computer 120 further may be associated with a GUI for displaying digital 3D model 139 on a client device in order to allow the user to utilize the functions of the building applications.

Data 118, 128, 138 need not be limited by any particular data structure. For example, the data may be stored in computer registers, in a relational database as a table having a plurality of different fields and records, or XML documents. The data also may be formatted into any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data. For example, data 138 of second client computer 130 may include information used by building application 135 to create 3D model 139.

In addition to the operations described above and illustrated in the figures, various other operations will now be described. It should be understood that the following operations do not have to be performed in the precise order described below. Rather, various steps may be handled in a different order or simultaneously. Steps also may be omitted or added unless otherwise stated herein.

Part 1: Digital Preparation of Preparation Guide Devices for Preparing a Working Tooth to be Treated Referring now to FIGS. 2-16, building application 135 is retrofitted with a specialty tool package that allows digital preparation of computer-generated models of tooth structure and corresponding preparation guide devices, which may be configured to fit and cooperate with a custom handpiece. In the example shown, building application 135 is GEOMAGIC FREEFORM by 3D Systems, Inc.

Figure 2:
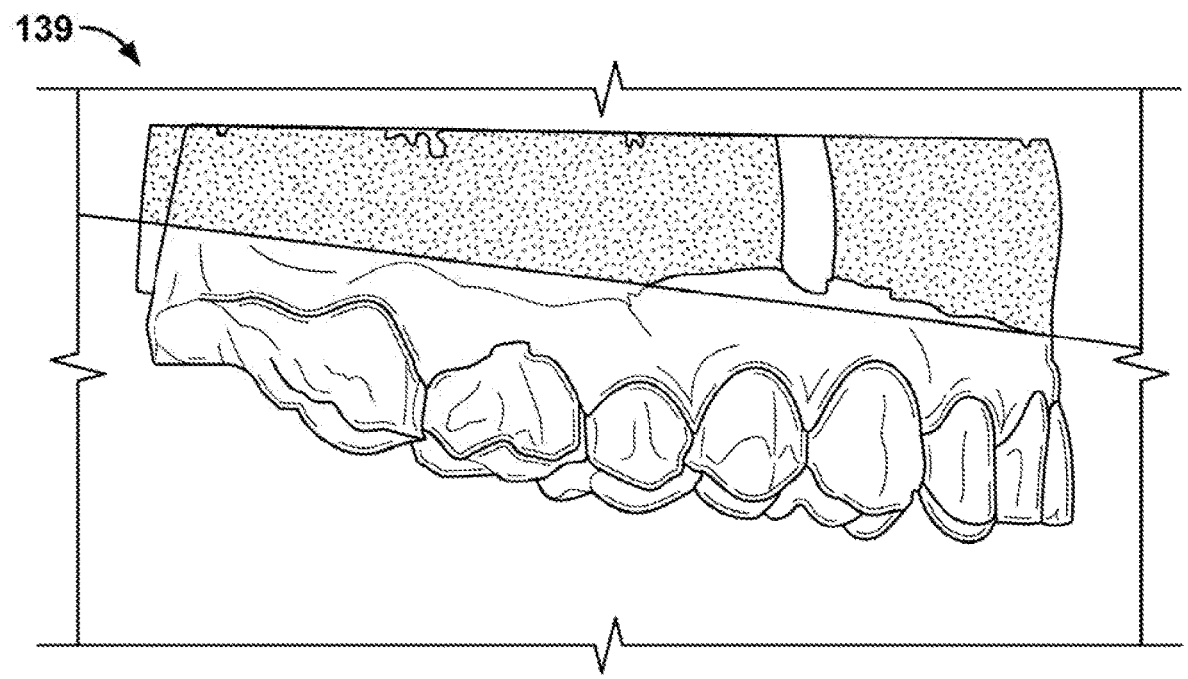
FIG. 2 is an elevation view of a computer-aided drawing (CAD) model of a scanned physical 3D model of teeth.

As shown in FIG. 2, original digital 3D model 139 is imported by processor 132 into the specialty tool package. Excess regions of the digital 3D model that are unneeded for preparing the preparation guide devices may then be trimmed from the 3D model, as in the example shown, eliminating excessive data that may slow down the CAD software.

Figure 3:
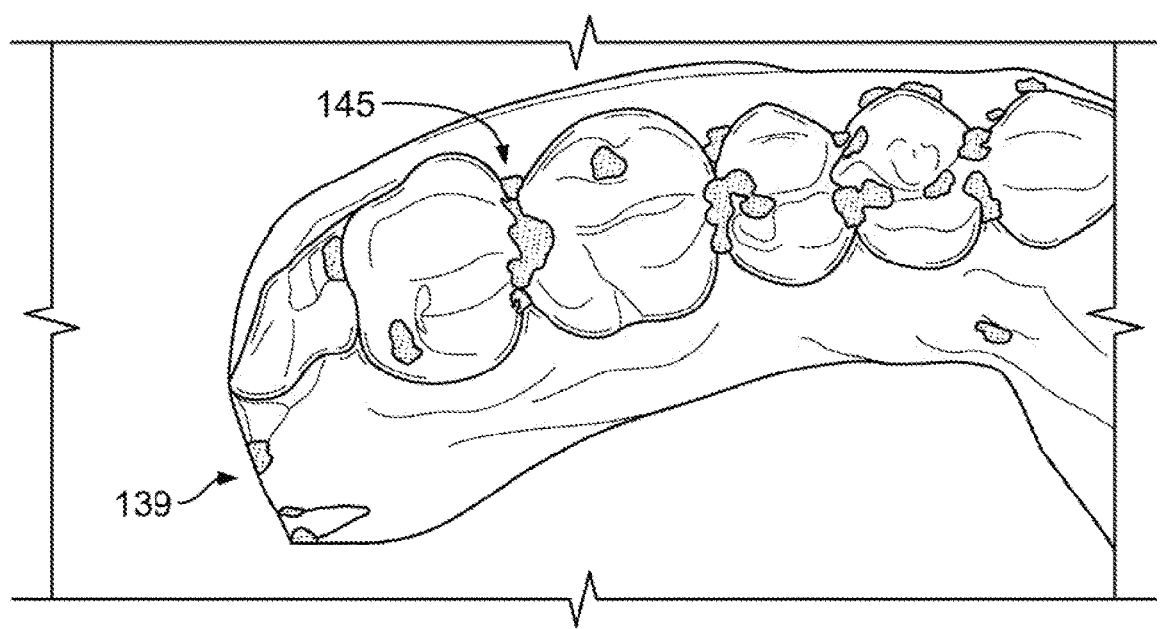
FIG. 3 is a plan view of the CAD model of FIG. 2 following the correction of errors in the model in accordance with an embodiment.
Figure 4A:
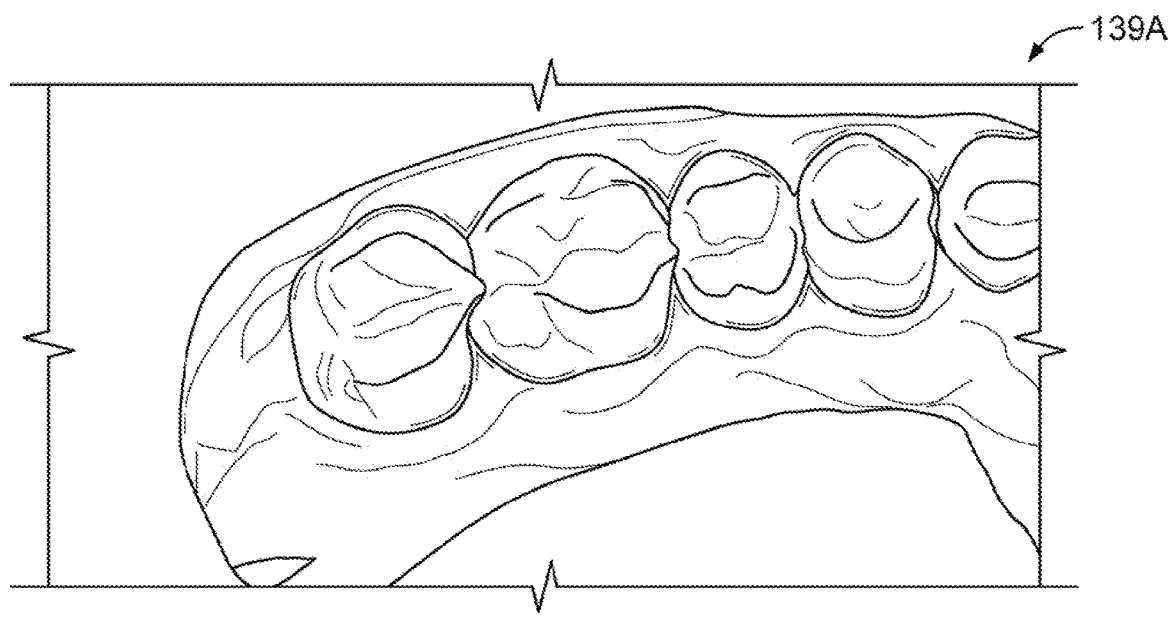
FIG. 4A is a plan view of the CAD model of FIG. 3 following remeshing of the CAD model.
Figure 4B:
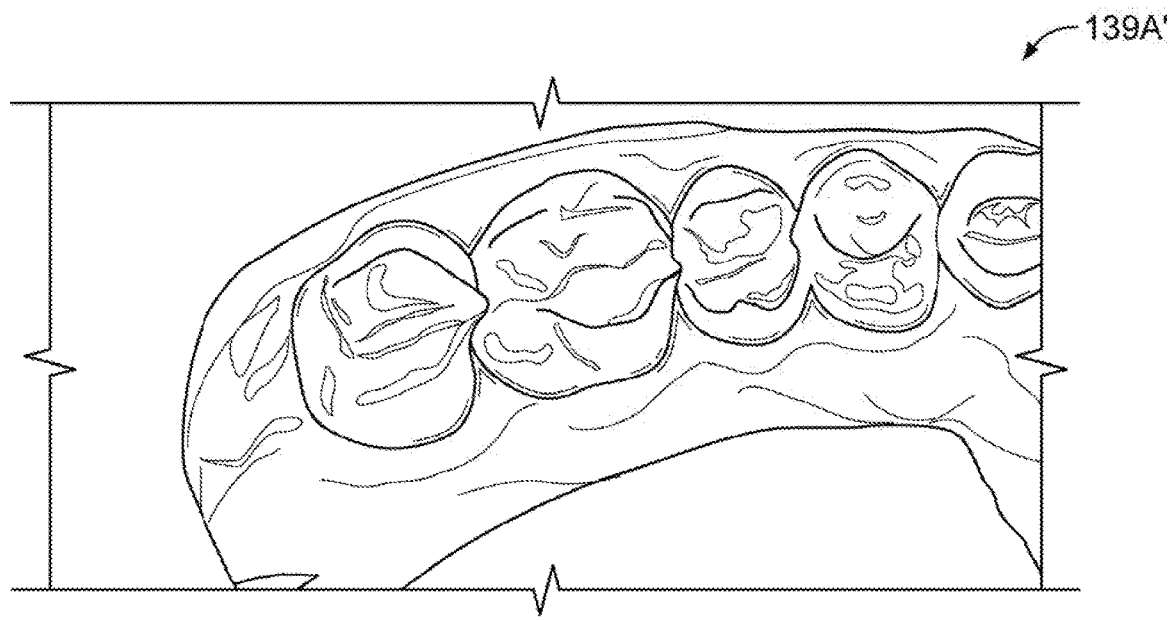
FIG. 4B is a plan view of the CAD model of FIG. 4A after refreshing of the CAD model.
Figure 5:
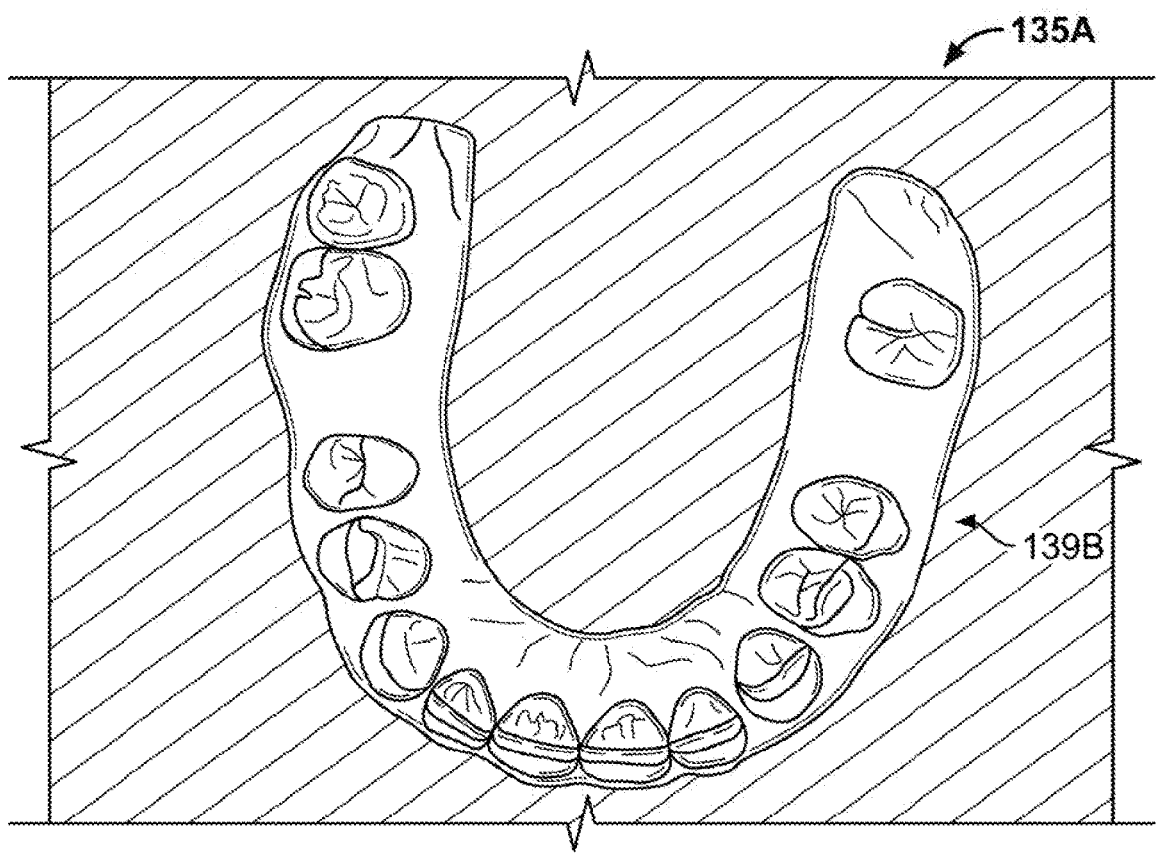
FIG. 5 is a plan view of the CAD model of FIG. 4B after importation into a solid model building application in accordance with an embodiment.

As shown in FIG. 3, the user, e.g., the second user, of building application 135 may then use the specialty tool package to check digital 3D model 139, or such model after trimming, for suspected errors in the 3D model that may be but are not limited to being caused by any one or any combination of a poor resolution of the scanned tooth topography whether directly from the patient's mouth or from a 3D physical model, a poor resolution of the 3D physical model of the tooth to be treated, and voids or extraneous projections in the physical model. As shown, 3D model additional structure 145 corresponding to tooth addition data may be identified for addition to any undesired voids identified in original digital 3D model 139, and any undesired projections identified in the digital 3D model are selected for removal from the original digital 3D model. The audit check and identification of needed error corrections may be performed by the processor using building application 135. The user of building application 135 may then provide an input, such as by clicking an icon on a GUI of the building application to accept the additional structure 145 and as well as the removal of undesired projections. As shown in FIGS. 4A and 4B, original 3D model 139 may be remeshed into a single mesh, including meshing with 3D model additional structure 145, and refreshed to form new remeshed digital 3D model 139A' and new (refreshed) digital 3D model 139A corresponding to new tooth data 125A. In preferred alternative arrangements, errors in original digital 3D model 139 may be automatically repaired upon importing the original digital 3D model into the specialty tool package of building application 135, as well as after subsequent trimming of the original digital 3D model to form new digital 3D model 139A. As shown in FIG. 5, new digital 3D model 139A is imported into a specialty tool package of a solid model building application 135A.

Figure 6:
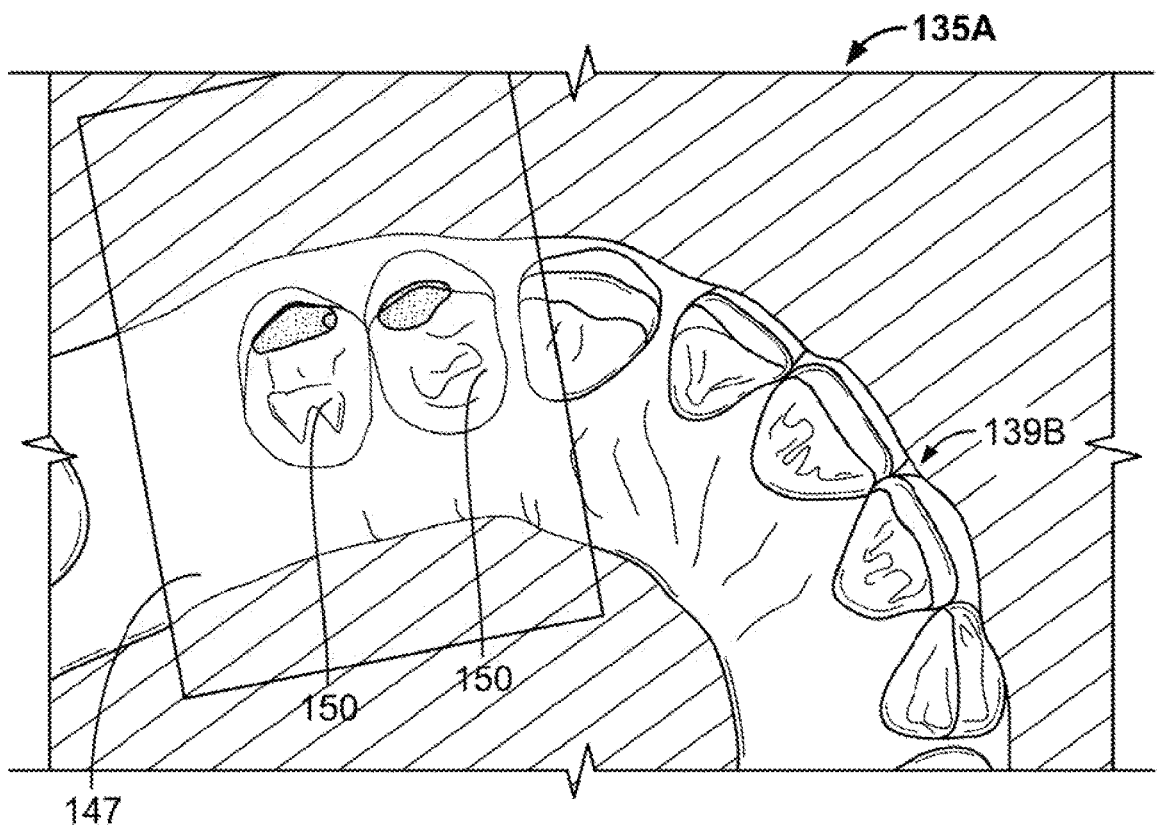
FIG. 6 is a partial plan view of the CAD model of FIG. 5 with the addition of a working plane marker to the model.

As shown in FIG. 6, working plane 147 is set at an appropriate position and orientation relative to the digital model of the working tooth to be treated, i.e., digital working tooth 150. As in this example, working plane 147 preferably may be positioned generally parallel to a section of digital working tooth 150 (in the example shown, working teeth 150 to be treated) that will become the prepared surface of the working tooth after preparation of the working tooth. In this example, working plane 147 is perpendicular to an axis defining apical-coronal directions, while in other arrangements, the working plane may be set at other orientations such as but not limited to along a mesial-distal axis. The orientation of working plane 147 sets the orientation of other settings described further herein.

Figure 7:
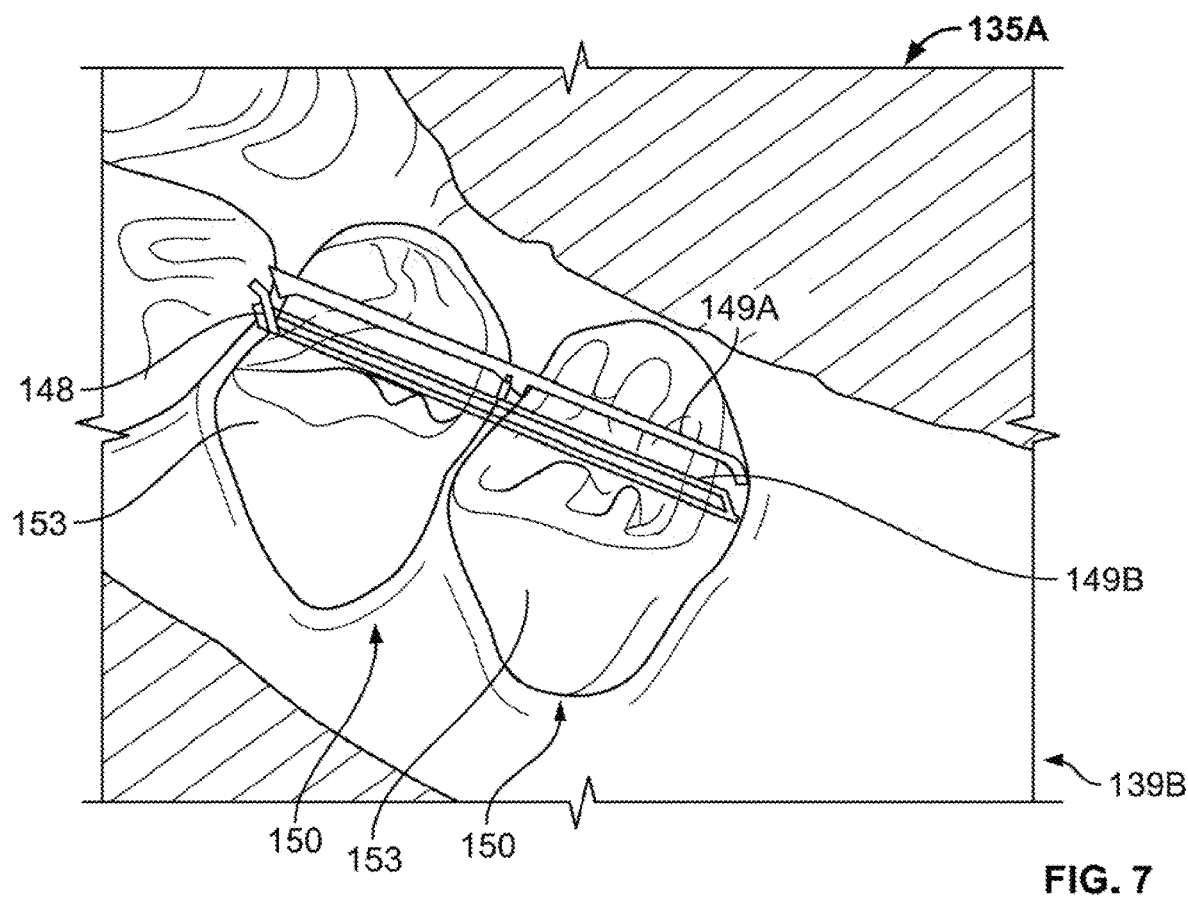
FIG. 7 is a partial perspective view of the CAD model of FIG. 5 with the addition of tool markers to the model.

As shown in FIG. 7, a depth for what will become the prepared surface of the working tooth to be treated is set by depth markers 149A, 149B within solid digital 3D model 139B. When the existing original surface of the working tooth to be treated is prepared by a cutting tool, e.g., a dental bur, a saw, a high pressure fluid jet cutter, etc., as described further herein, the depth set by depth marker 149A corresponds to a current setting for the depth that a tip or edge of the cutting tool will reach during preparation of the working tooth, and the depth set by depth marker 149B corresponds to a desired depth that the tip or the edge of the cutting tool reaches during preparation of the working tooth. Tool surrogate 148 extends in a direction of the tip of the cutting tool, e.g., a bur, intended for the preparation of the working tooth.

Figure 8:
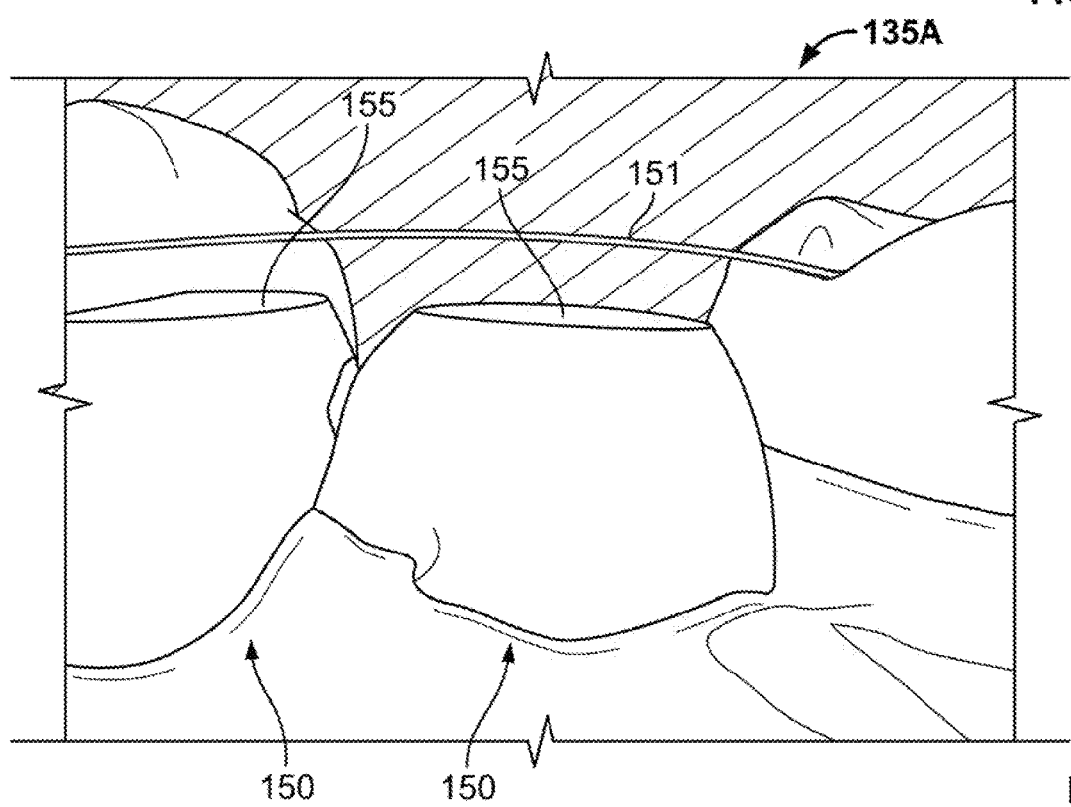
FIG. 8 is a partial perspective view of a modified version of the CAD model of FIG. 5 modeling prepared working teeth and the addition of a tool path marker to the model.

As shown in FIG. 8, tool path 151 is initially set within solid model building application 135A as cutting path data at a position spaced from digital working tooth 150 along a path to be followed by the cutting tool. Path 151 is preferably one that removes the minimal amount of tooth structure from the working tooth to be treated that is needed to be removed to correct for each malady or other undesirable aspect of the working tooth while also providing a sufficient surface area and appropriate form to attach a restoration. Additionally, although path 151 may be in any form within the limitations of solid model building application 135A and the cutting tool, the path is preferably in the form of a plane or a curvate shape that may be convex or concave relative to digital working tooth 150. Tool path 151 is preferably set after the depth is set by depth markers 149A, 149B, although the path may be set before or even simultaneously with the depth setting as well. As further shown by FIG. 8, while setting tool path 151 and depth markers 149A, 149B, digital working tooth 150 may be displayed with digital cuts corresponding to the currently planned cuts to be made to the working tooth.

Figure 9:
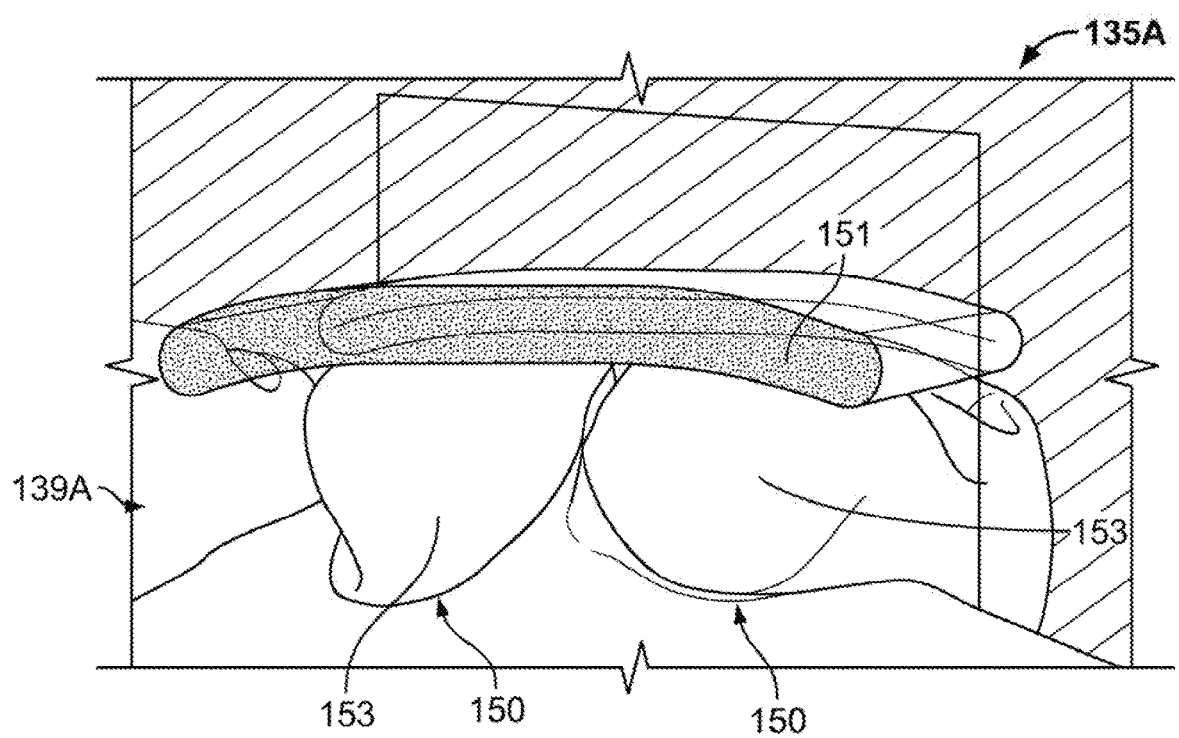
FIG. 9 is a partial perspective view of the CAD model of FIG. 5 in which the tool path marker shown in FIG. 8 has been adjusted.
Figure 10:
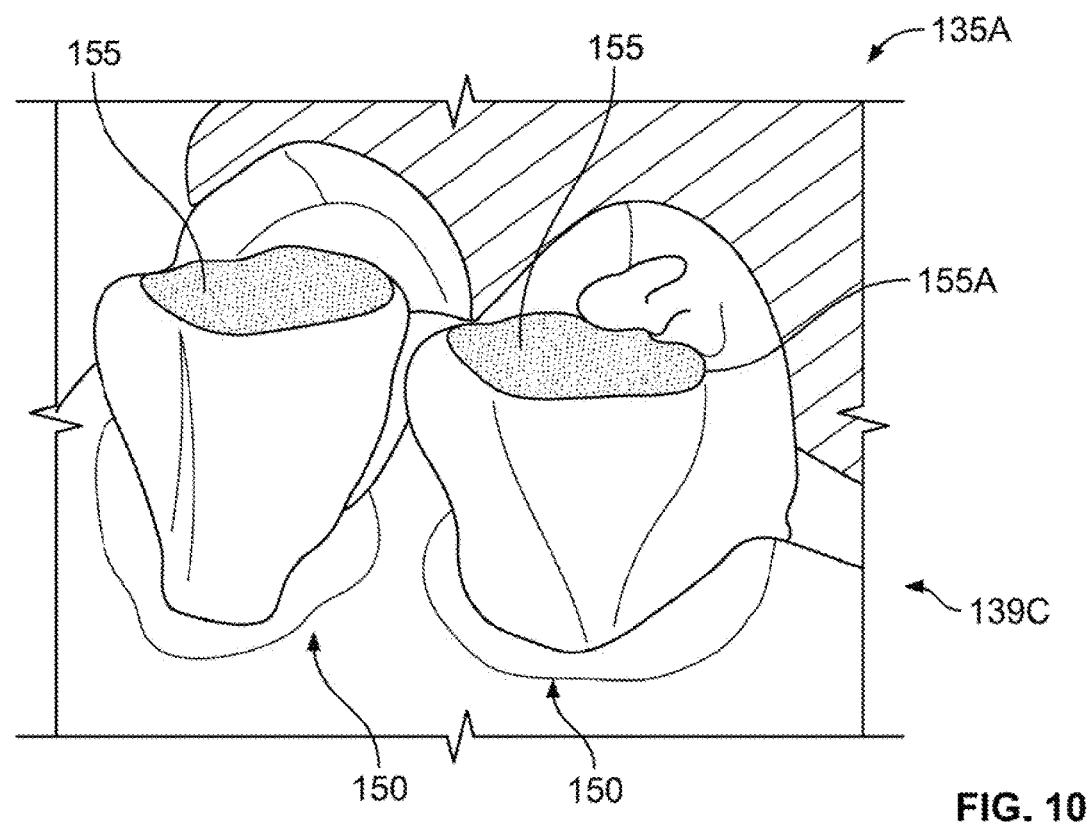
FIG. 10 is a partial perspective view of a modified version of the CAD model of FIG. 5 highlighting cuts to modeled prepare working teeth for validation by a user.

Referring to FIG. 9, with tool path 151 initially set, the tool path may be moved closer or further away from the working tooth to be treated. Tool path 151 may also be moved generally parallel to an outer surface of digital working tooth 150, e.g. in a labial or lingual direction. As shown in FIG. 10, with tool path 151 set at a proposed position and orientation, digital prepared surface 155 of digital working tooth 150 corresponding to tool path 151 may be highlighted along edge 155A to accentuate the curvature of the digitally prepared surface corresponding to a proposed prepared surface of the patient upon removal of tooth structure from the working tooth to be treated. In this manner, the user of solid model building application 135A may validate the location of tool path 151 to confirm it is at the desired location and to generate prepared 3D model 139C including digital working tooth 150 with digital prepared surface 155. Otherwise, tool path 151 may be any one or any combination of repositioned and reoriented relative to digital working tooth 150 until the tool path is positioned to achieve the desired tooth preparation. The user of solid model building application 135A then provides an input, such as by clicking an icon on the GUI of the specialty tool package, to set the tool path upon which cutting tool path data, which corresponds to digital cutting tool surrogate 164 shown in FIG. 12 and discussed further below, is determined by the building application and stored in an object list. As in the example shown in FIG. 12, the cutting tool path data may correspond to slots to be formed in digital guide body 165 discussed further below.

Figure 11:
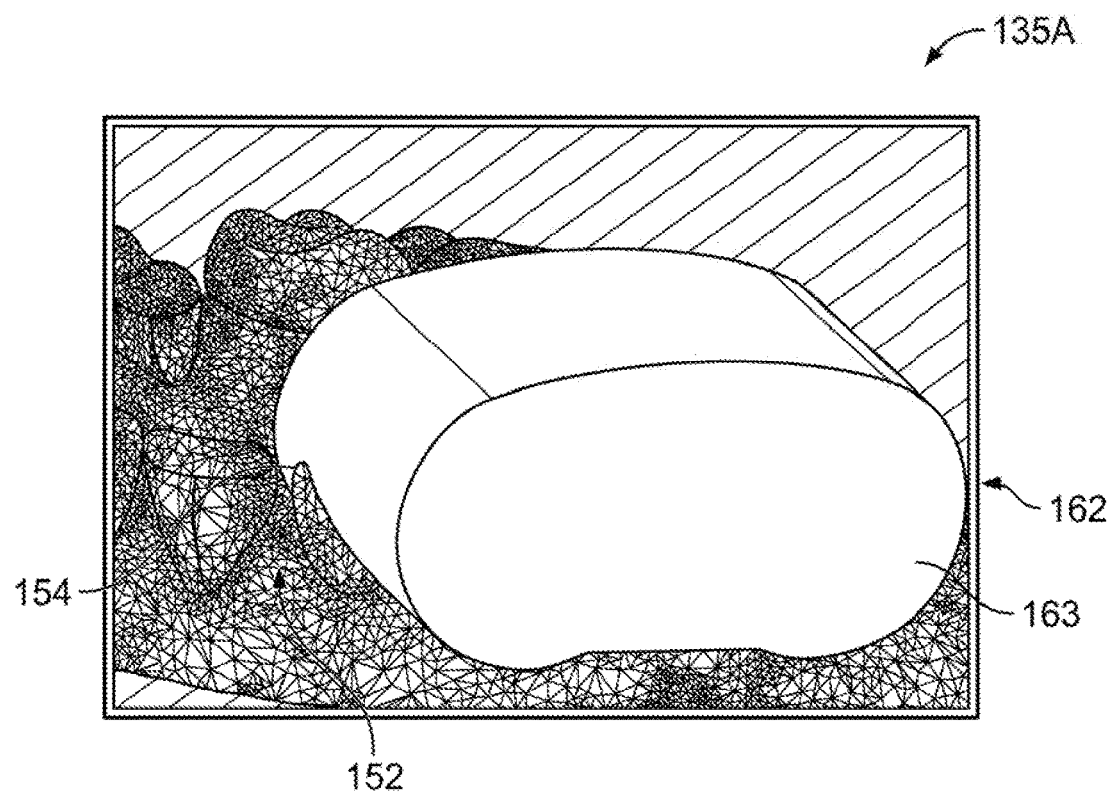
FIG. 11 is a partial perspective view of a modified version of the CAD model of FIG. 5 with the addition of an in-process digital guide body outer shell in accordance with an embodiment.

Referring now to FIG. 11, once tool path 151 is determined and set where desired, the user of solid model building application 135A provides an input, such as by clicking an icon on the GUI of the specialty tool package, to instruct the building application to create initial cutting guide data corresponding to digital guide body outer shell 162 around outer surface 153 of digital working tooth 150 (See FIGS. 7 and 9). As in the example shown, solid model building application 135A is preferably configured with preset outer dimensions defined by digital shell outer surface 163 of digital guide body outer shell 162, which may be based on population sample data of the configuration of patients' mouths, that are applied to the digital guide body outer shell when formed, although such dimensions may be modified within solid model building application 135A, e.g., to address extreme variations of the configuration of the particular patient's mouth from the standard dimensions preset in the building application. As in the example shown, digital guide body outer shell 162 may also extend around digital outer surface 154 of digital neighboring tooth 152 (or digital outer surfaces 154 of digital neighboring teeth 152 as shown) of digital working tooth 150 that corresponds to the neighboring tooth of the working tooth of the patient to be treated. In this manner, a portion of digital guide body outer shell 162 may conform to digital outer surface 154 of digital neighboring tooth 152.

Figure 12:
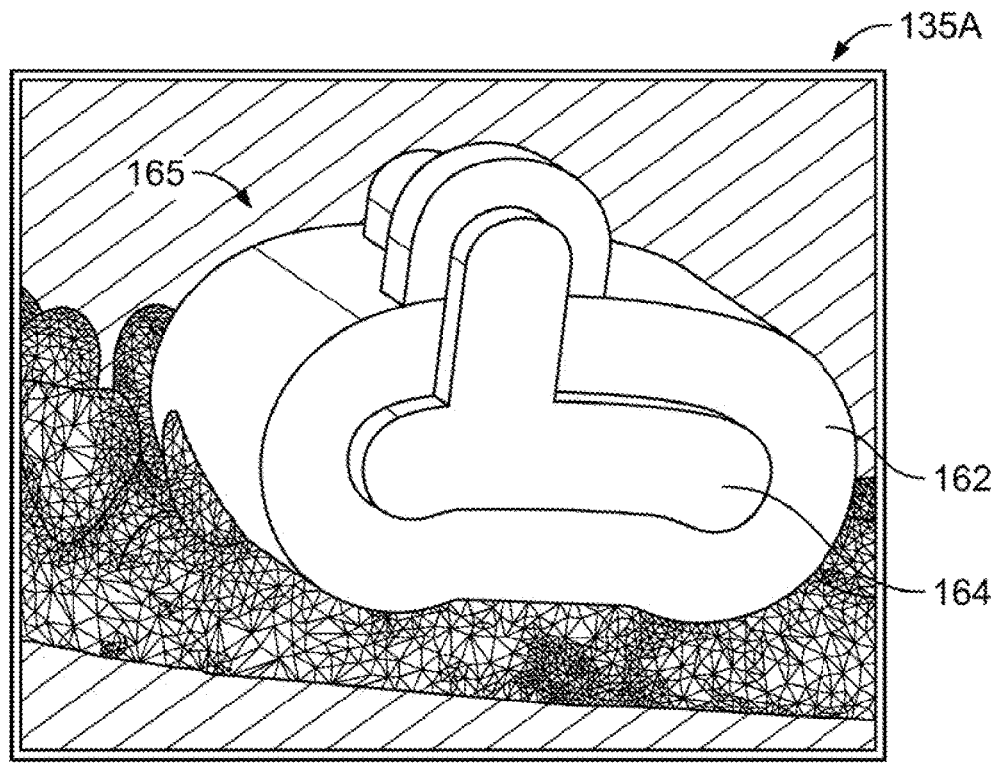
FIG. 12 is a partial perspective view of the CAD model of FIG. 11 with the addition of a digital cutting tool surrogate to the digital guide body outer shell.

As illustrated by FIG. 12, the user of solid model building application 135A provides an input, such as by clicking an icon on the GUI of the specialty tool package, to instruct the building application to display digital cutting tool surrogate 164 within digital guide body outer shell 162 based on the cutting path data described above. Digital cutting tool surrogate 164 has dimensions at its extremities that correspond to the extremities of possible travel of extremities of a physical cutting tool, such as those described previously herein. The user of solid model building application 135A then provides an input, such as by clicking an icon on the GUI of the specialty tool package, to instruct the building application to apply a Boolean operation to merge digital guide body outer shell 162 and digital cutting tool surrogate 164 at their intersections. The model created by this merger corresponds to final cutting guide data. This Boolean operation is a subtractive operation such that the volume and shape of digital cutting tool surrogate 164 is subtracted from digital guide body outer shell 162 to form digital guide body 165.

Figure 13:
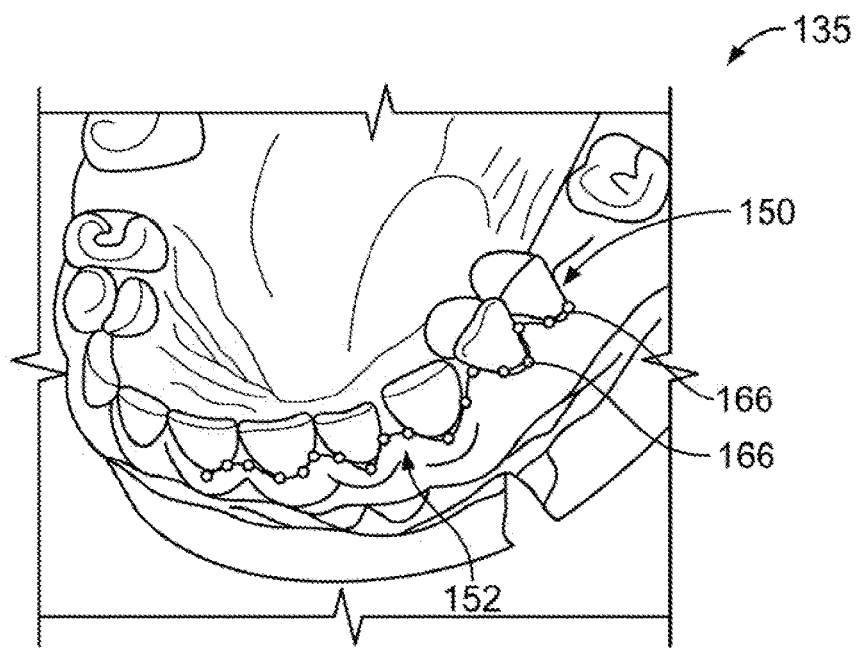
FIG. 13 is a perspective view of the CAD model of FIG. 5 with the addition of boundary markers in accordance with an embodiment.
Figure 14:
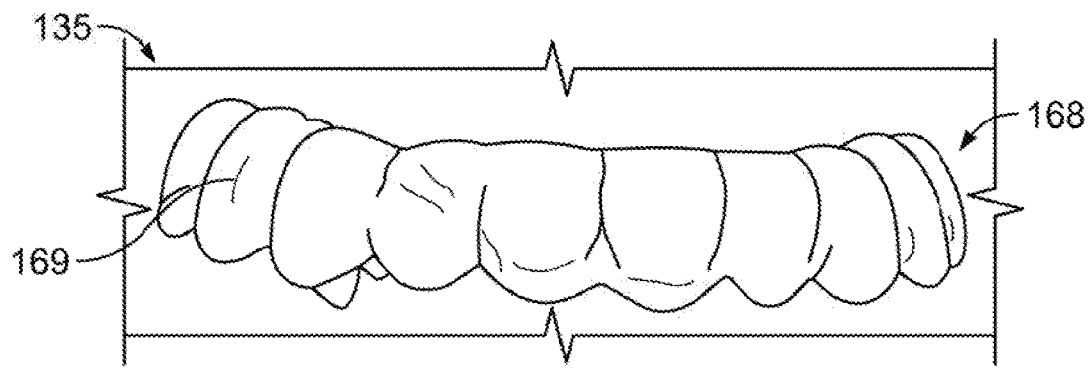
FIG. 14 is a perspective view of a CAD model of a digital tooth wrap in accordance with an embodiment.

Referring now to FIG. 13, a user of a building application, which may be building application 135, provides an input, such as by clicking an icon on a GUI of the specialty tool package used in preparing new digital 3D model 139A, of another specialty tool package, or otherwise in the building application, to place boundary markers 166 at the base of the digital crown of digital neighboring tooth 152 (or, as in the example shown, a plurality of neighboring teeth 152) of digital working tooth 150 and of digital working tooth 150. Boundary markers 166 establish a desired depth along a tooth wrap to be generated based on digital tooth wrap 168 shown in FIG. 14. Still referring to FIG. 14, the user of building application 135 provides an input, such as by clicking an icon on the GUI of the specialty tool package or otherwise in the building application, to instruct the building application to create initial instrument configuration data corresponding to digital tooth wrap 168 having digital inner surfaces (not shown) identical to or substantially identical to, i.e., having dimensions slightly offset from, digital outer surfaces 154 of respective digital neighboring teeth 152 as well as with bottom surfaces intersecting boundary markers 166. In this manner, the digital inner surfaces of digital tooth wrap 168 may conform to digital outer surfaces 154 of digital neighboring teeth 152. As in the example shown, building application 135 is preferably configured to form digital wrap outer surfaces 169 of digital tooth wrap 168 by providing one or more preset offsets to the digital inner surfaces, in which such offsets may be but are not limited to being based on population sample data of the configuration of patients' mouths, that are applied to digital tooth wrap 168 when formed, although such dimensions may be modified within building application 135, e.g., to address extreme variations of the configuration of the particular patient's mouth from the standard offsets in the building application.

Figure 15:
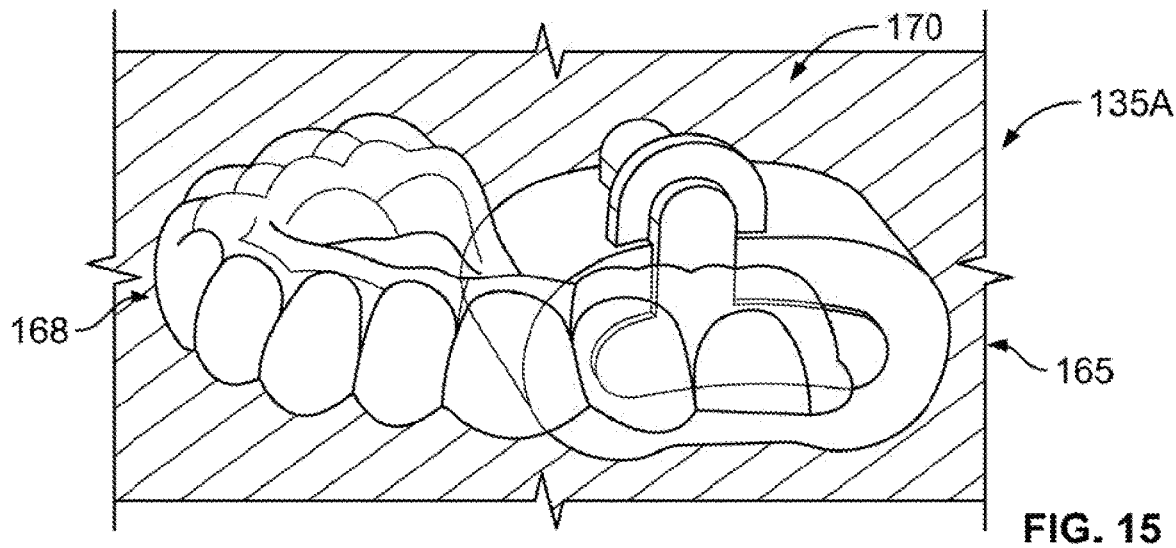
FIG. 15 is a perspective view of a CAD model of an in-process digital guide device in accordance with an embodiment.

As shown in FIG. 15, digital tooth wrap 168 is imported from building application 135 into solid model building application 135A, and the user of building application 135 then provides an input, such as by clicking an icon on the GUI of a specialty tool package within solid model building application 135A, to instruct solid model building application 135A to apply a Boolean operation to merge digital tooth wrap 168 with merged digital guide body 165 to form digital guide device 170.

Figure 16:
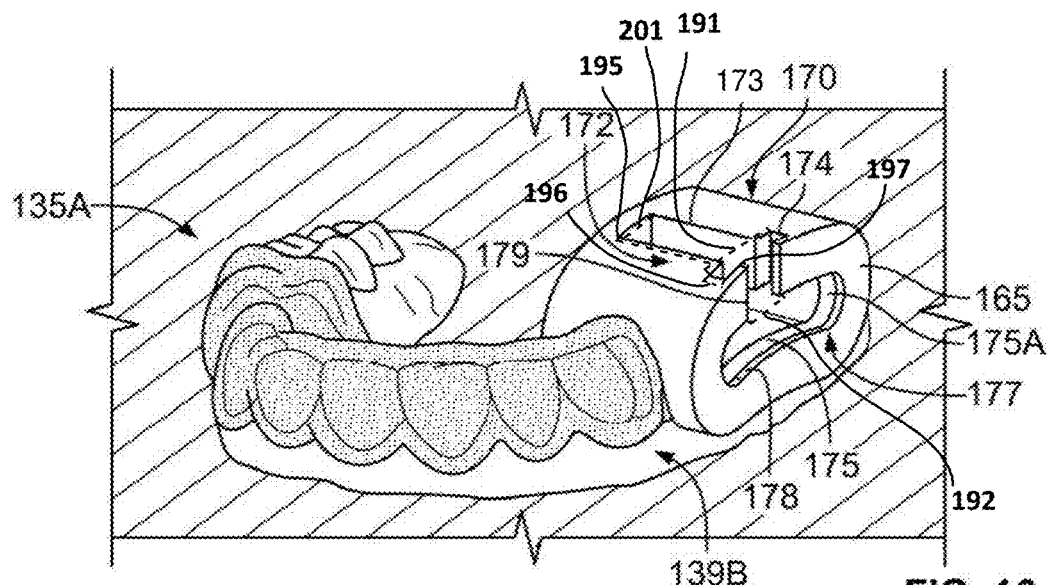
FIG. 16 is a perspective view of a CAD model of a digital guide device prepared with the in-process digital guide device of FIG. 15 being compared with the teeth of the CAD model of FIG. 5 in accordance with an embodiment.

Referring now to FIG. 16, the user of building application 135A may provide an input, such as by clicking an icon on the GUI of the specialty tool package, to place digital guide device 170 onto new digital 3D model 139B to confirm the fit of the digital guide device. The finalized configuration of the digital guide device 170 corresponds to and may be stored in second client computer 130 as final instrument configuration data. Once the user is satisfied with the configuration of digital guide device 170, the user of building application 135 may provide an input, such as by clicking an icon on the GUI of the specialty tool package, to export digital guide device 170, which may be exported as a new file such as but not limited to an .STL file, to an appropriate computer-aided manufacturing (CAM) device, which may be any known appropriate subtractive manufacturing device that removes material from a block of material or any known appropriate additive (layer) manufacturing (AM) device, such as a stereolithography machine, that would build a guide device having the dimensions corresponding to the dimensions set for digital guide device 170. Physical guide devices preferably may be made of plastics such as but not limited to VisiJet M2R-TN (Dental), VisiJet M3 Crystal (MJP), VisiJet M3 Dentcast (MJP), VisiJet M3 Pearlstone (MJP), VisiJet M3 Stoneplast (MJP), VisiJet SL e-Stone (SLA), NextDent Ortho IBT, NextDent Ortho Clear, and NextDent Model Ortho, all by 3D Systems, Inc.

As further shown in FIG. 16, digital guide body 165 of digital guide device 170 generally includes digital entry portion 172 and digital slide portion 177. Digital entry portion 172 includes digital cutting tool passage 173, shown in FIG. 16, (having a first height 195 and a first width 201, represented in dashed lines) corresponding to physical cutting tool passage 183, shown in FIG. 18, (having a first height 198 and a first width 202, represented in dashed lines) of physical guide body 181 configured to receive a shaft of a cutting tool, e.g., the cutting edges of shaft 211 of dental bur 210, and digital guide entry slot 174, shown in FIG. 16, (having a second height 196 and a second width 191, represented in dashed lines) corresponding to physical guide entry slot 184, shown in FIG. 18, (having a second height 199 and a second width 193, represented in dashed lines) of physical guide body 181 configured to receive a corresponding mechanical guide of the cutting tool, e.g., guide plate 212 on dental bur 210 (see FIG. 18). Digital slide portion 177 includes digital connector opening 178 corresponding to a physical connector opening of physical guide body 181 configured to receive a connector of the cutting tool, e.g., connector 214 of dental bur 210, and allow the connector to slide within the opening as well as digital guide slide slot 175 corresponding to a physical guide slide slot of physical guide body 181 configured to receive the corresponding mechanical guide of the cutting tool. Connecting digital entry portion 172 and digital slide portion 177 is digital bridge opening 179, shown in FIG. 16, (having a third height 197 and a third width 192, represented in dashed lines) corresponding to physical bridge opening 189, shown in FIG. 18 (having a third height 200 and a third dimension width 194, represented in dashed lines) of physical guide body 181 which, like the connector opening, is configured to receive connector 214 of the cutting tool (see FIG. 18).

Figure 17:
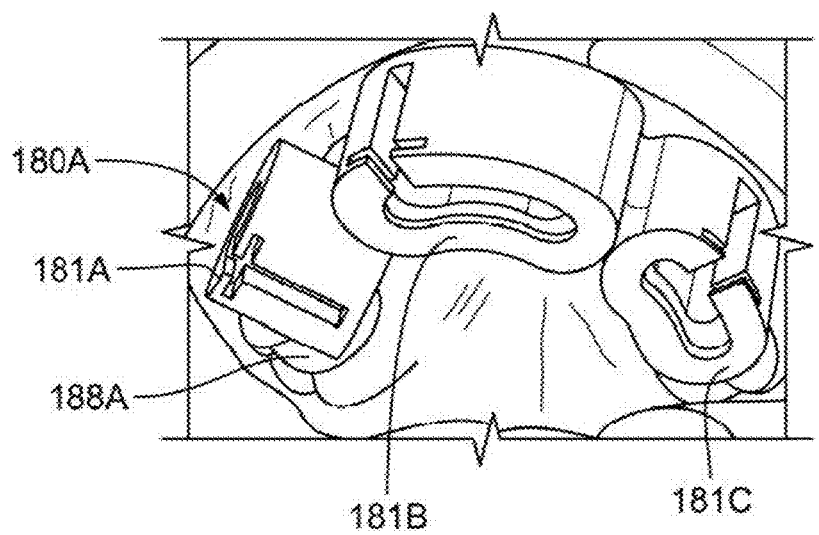
FIG. 17 is a perspective view of a physical guide device in accordance with an embodiment.
Figure 18:
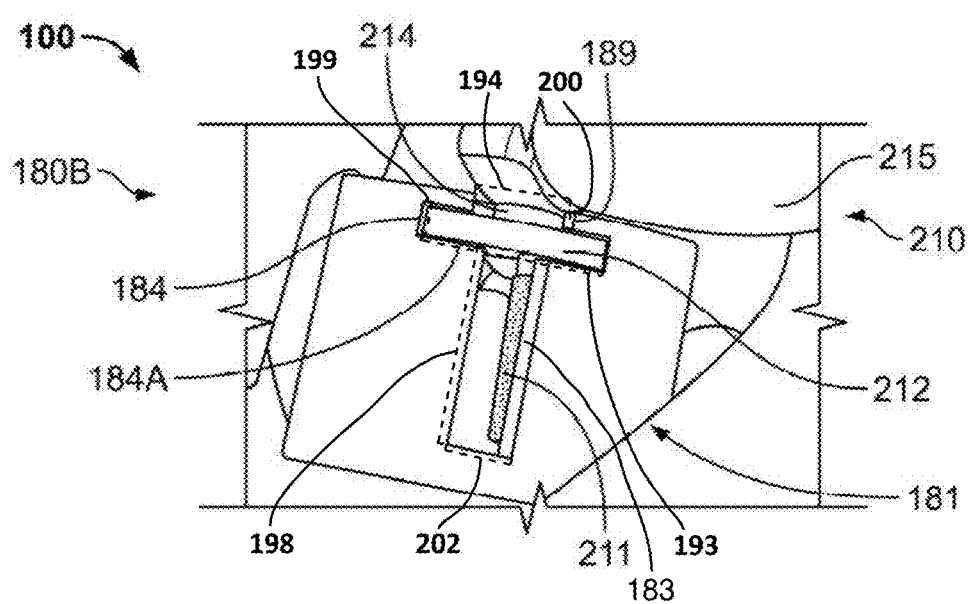
FIG. 18 is a perspective view of a physical guide device in accordance with an embodiment.

Examples of physical guide devices having entry and slide portions fabricated from corresponding digital guide devices having corresponding digital entry and digital slide portions are shown in FIGS. 17 and 18 in their appropriate positions on working teeth within the mouth of a patient. In the example of FIG. 17, physical guide device 180A, which has been fabricated in the manner set forth above, includes a series of three physical guide bodies 181A, 181B, 181C attached together end-to-end and physical tooth wrap 188A attached to an end of one of the guide bodies. In the example of FIG. 18, dental preparation system 100 includes physical guide device 180B and dental instrument 210, which may be a cutting tool in the form of a dental bur in this example, inserted into the physical guide device. As shown, physical connector 214 connects handpiece 215, which includes a motor for rotation of shaft 211, of dental instrument 210 to guide plate 212 of the dental instrument. In this manner, a sufficient force exerted on handpiece 215 in a direction parallel to a longitudinal axis of physical guide entry slot 184 of physical guide body 181 and in a direction perpendicular to entry opening 184A, which force may be caused by a dentist holding the handpiece, moves dental instrument 210 until guide plate 212 of the dental instrument abuts the physical guide slide slot of physical guide body 181. Once guide plate 212 is so positioned in abutment with the physical guide slide slot, guide plate 212 may be slid between ends of the physical guide slide slot corresponding to opposing digital guide slide slot ends 175A (see FIG. 16; one end of digital guide slide slot now shown).

Preferably, during treatment of the working tooth to be treated, the physical guide device of the present technology, such as physical guide devices 180A, 180B, should remain fixed and not move once it is placed around the working tooth. Moreover, the physical guide device should remain in a stable position even when a dental instrument intended for use with the dental instrument, such as dental instrument 210, makes contact with it. The position of the physical guide device can be secured by contact of surfaces of the physical guide device with surfaces of teeth in a patient's mouth, preferably around the crowns of the patient's teeth, or by the use of a bonding agent, such as one that is light cured or a temporary cement or by projections from the physical guide device that engage portions of one or more teeth in the patient's mouth, including the working tooth, any adjacent teeth of the working tooth such as the neighboring teeth of the working tooth, or dentition on the jaw opposing the jaw with the working tooth.

In some alternative arrangements, in an example of a "reversal of parts," physical guide entry slot 184 and physical guide slide slot, and accordingly digital guide entry slot 174 and digital guide slide slot 175 respectively, may be shaped in the form of guide plate 212 whereas the guide plate may be shaped in the form of the physical guide entry such that the new form of the guide plate slides within the physical guide entry slot.

Figure 19A:
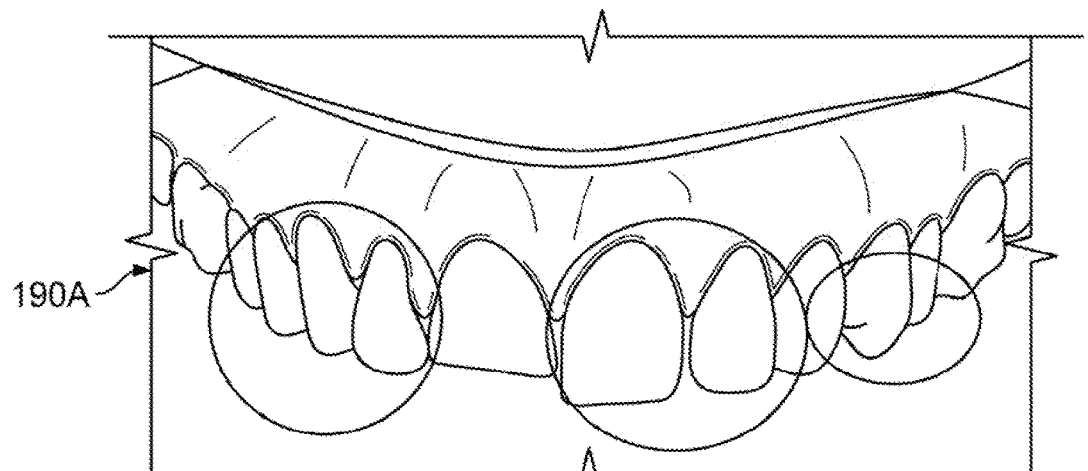
FIGS. 19A and 19B are perspective views of the inside of the mouth of patient prior to and after preparation of the patient's teeth, respectively, in accordance with an embodiment.
Figure 19B:
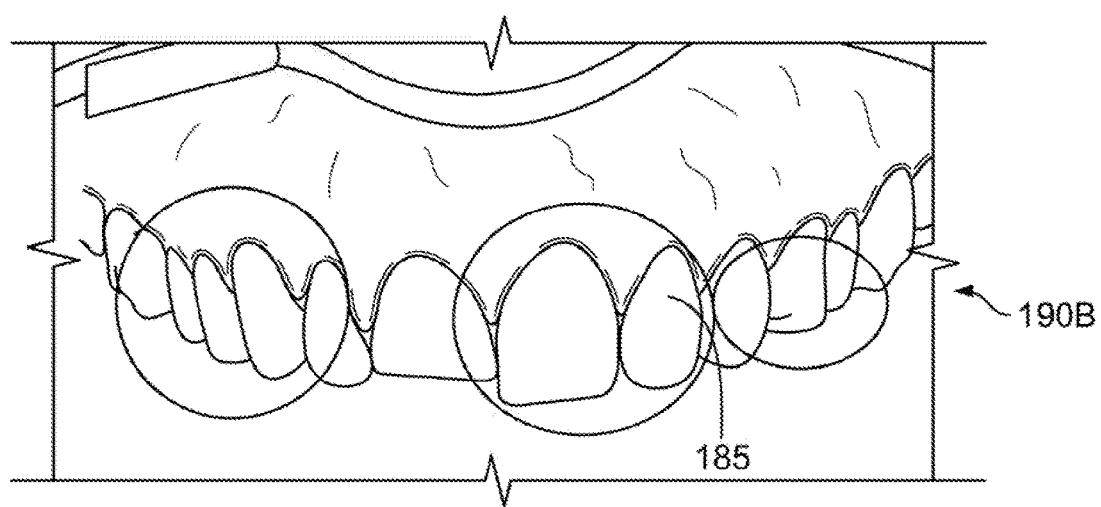

With reference to FIGS. 19A and 19B showing working teeth 190A before and working teeth 190B after preparation using system 100, when guide plate 212 is slid between opposing ends of the physical guide slide slot, the cutting edges of shaft 211 of dental bur 210 remove tooth structure from the working tooth to be treated to form prepared surfaces 185 corresponding to a digital prepared surface, such as prepared surface 155, of a digital working tooth, such as digital working tooth 150. In some arrangements, a restoration (or a plurality of restorations), such as but not limited to a veneer, may be prepared to have an outer surface at least substantially corresponding to an outer surface of original working tooth 190A and to mate with prepared surface 185 of prepared working tooth 190B such that upon attachment of the restoration to the prepared surface, the combination of the prepared working tooth with the restoration is at least substantially similar to original working tooth 190A. In some arrangements, the restoration may have an outer surface that is customized but noticeably different, e.g., more cosmetically desirable to a patient, than the outer surface of original working tooth 190A. In still other arrangements, the restoration may be an "off-the-shelf" configuration in which a prepared surface of a working tooth to be treated may be formed to mate with such a restoration using a physical guide device corresponding to a digital guide device fabricated using building application 135 with the specialty tool package in which the configuration of the surface of the restoration for mating with the prepared surface of the working tooth is included as an input in preparing the digital guide device.

As shown in FIG. 20, process 300 prepares a working tooth or working teeth to receive a restoration. At block 310, a physical model of a plurality of teeth in the mouth of a patient is scanned by a suitable scanner. At block 320 and following the step at block 310, tooth data corresponding to digital topography of the scanned physical model of the plurality of teeth is received by one or more processors of a client computer, such as second client computer 130, which may receive the tooth data from first client computer 120. At block 330 and following the step at block 320, cutting path data corresponding to a cutting path to be followed by a dental cutting tool based on the tooth data is stored by one or more processors of the client computer. At block 335 and following the step at block 320, cutting depth data corresponding to a cutting depth to be reached by the cutting tool based on the tooth data is stored by one or more processors of the client computer. The steps at blocks 330 and 335 may be performed in any order, including simultaneously. At block 340 and following the step at block 320, initial cutting guide data corresponding to a cutting guide shell structure for placement around a portion of a tooth to be treated and based on the tooth data is determined by one or more processors of the client computer. At block 350 and following the steps at blocks 330 and 335, cutting tool path data corresponding to preset limits on tool movements to be made by the cutting tool is determined by one or more processors of the client computer based on the cutting path data and the cutting depth data. At block 360 and following the steps at blocks 340 and 350, a first Boolean operation between the initial cutting guide data and the cutting tool path data is performed by one or more processors of the client computer to define final cutting guide data corresponding to final cutting guide structure for guiding the cutting tool. At block 370 and following the step at block 360, a second Boolean operation is performed between the final cutting guide data and initial instrument configuration data corresponding to a fixation instrument configuration for fixing dental instrumentation, which is for use in guarding the cutting tool to remove tooth structure from the tooth to be treated, to an adjacent tooth to the tooth to be treated. In this manner, final instrument configuration data corresponding to the final instrument configuration for releasably fixing the dental instrumentation to the adjacent tooth and for guiding the cutting tool in the removal of the tooth structure for the tooth to be treated is defined. At block 380 and following the step at block 370, the final instrument configuration data is exported to a data storage file configured for use with an AM or CAM device. At block 390 and following the step at block 380, the final instrument configuration is fabricated using an appropriate CAM or AM device.

Figure 21:
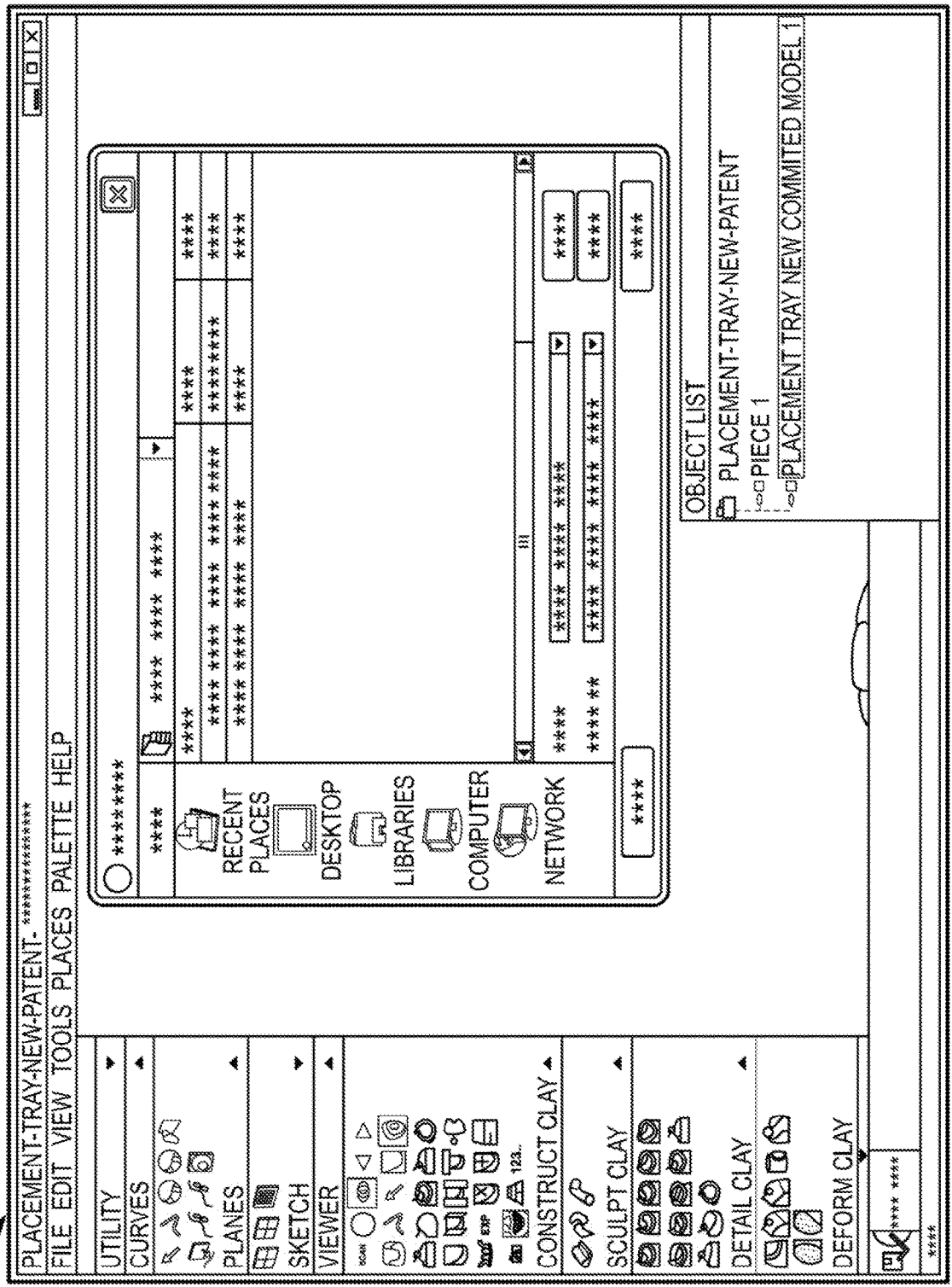
FIG. 21 is a plan view of a graphical user interface (GUI) during the importation of CAD models of the teeth of a patient including prepared working teeth and of a restoration into the specialty tool package to form a digital restored 3D model in accordance with an embodiment.
Figure 22:
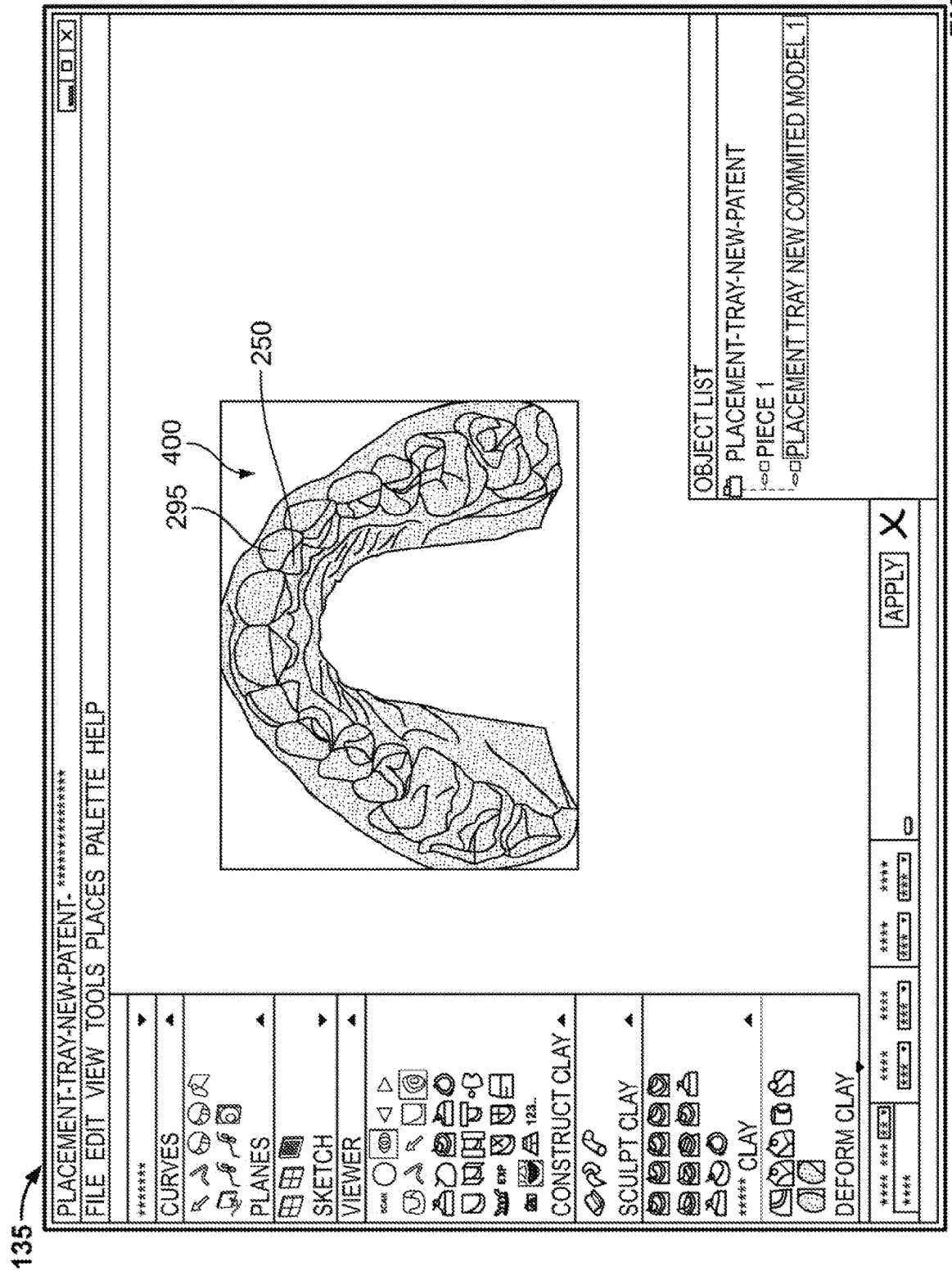
FIG. 22 is a plan view of the CAD models of the teeth of the patient and of the restoration imported using the graphical user interface shown in FIG. 21.

Part 2: Digital Preparation of Placement Guide Devices for Placing a Restoration Advantageously, in conjunction with the preparation of a digital guide device, such as the digital guide device 170 described previously herein, and accordingly a physical guide device corresponding to the digital guide device, a placement guide device for applying a restoration, such as but not limited to a placement tray for applying a veneer, to the working teeth within a patient's mouth may be prepared. As noted above, in some arrangements, a corresponding restoration, such as a set of veneers also may be prepared. Referring now to FIGS. 21 and 22, a prepared 3D model, such as prepared 3D model 139C, including a digital working tooth with a digital prepared surface, such as digital working tooth 150 with digital prepared surface 155 for example or the set of digital working teeth 250 with respective digitally prepared surfaces as shown, and a digital model of the restoration or restorations, such as digital restorations 295 as shown, to be applied to the respective tooth or teeth of the patient may be merged and imported into building application 135 with the specialty tool package as restored tooth data. In this manner, as shown in FIG. 22, restored 3D model 400, which corresponds to the restored tooth data and as shown may be a digital clay model, of the patient's teeth corresponding to the desired form of the patient's teeth, through the use of the restoration or restorations, may be generated in preparation for modeling a placement guide device, i.e., retention splint, to appropriately place the restoration or restorations in a patient's mouth.

Figure 23A:
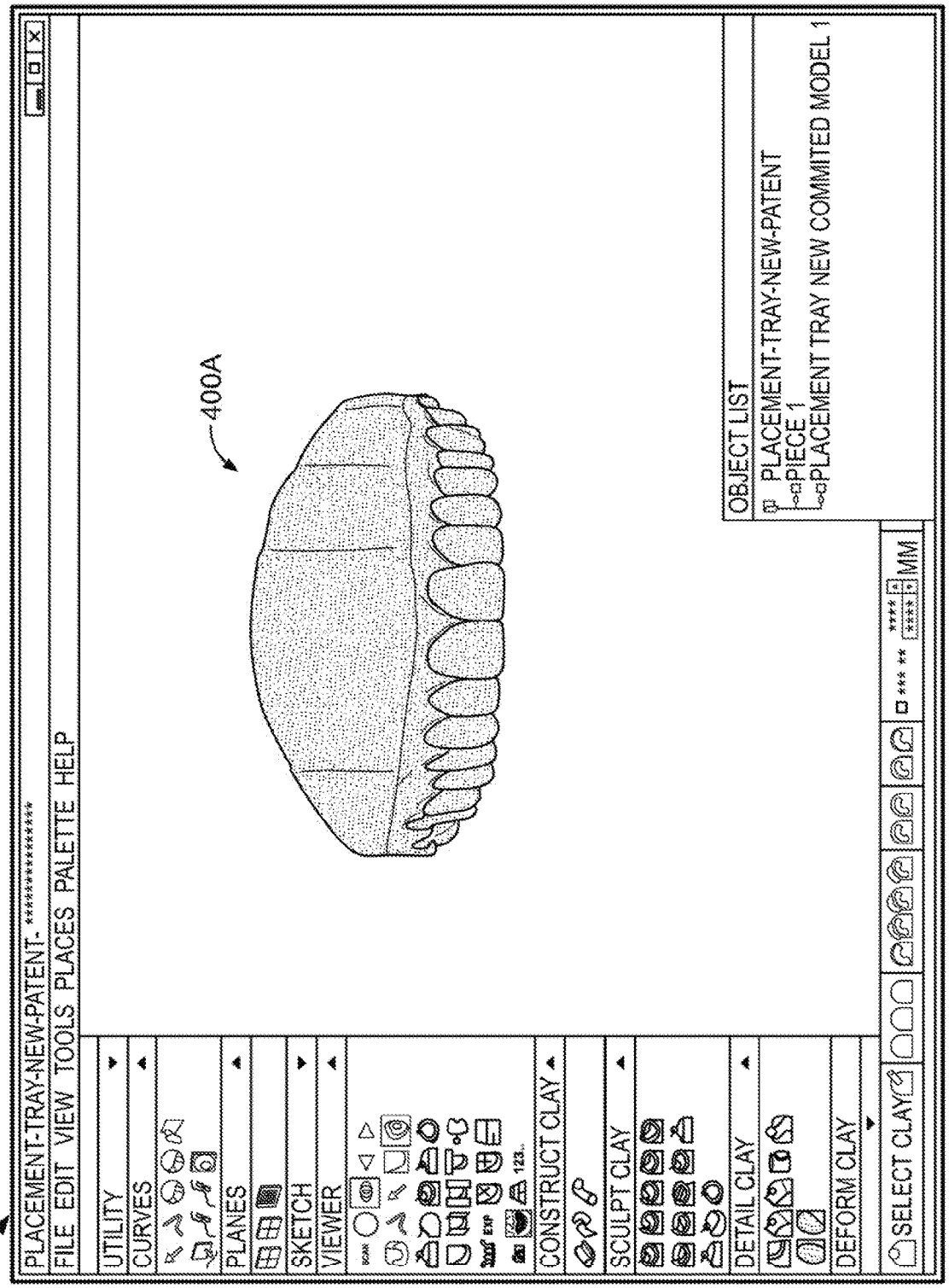
FIGS. 23A and 23B are elevation and plan views, respectively, of modified CAD models of the digital restored 3D model of FIG. 22 in accordance with an embodiment.
Figure 23B:
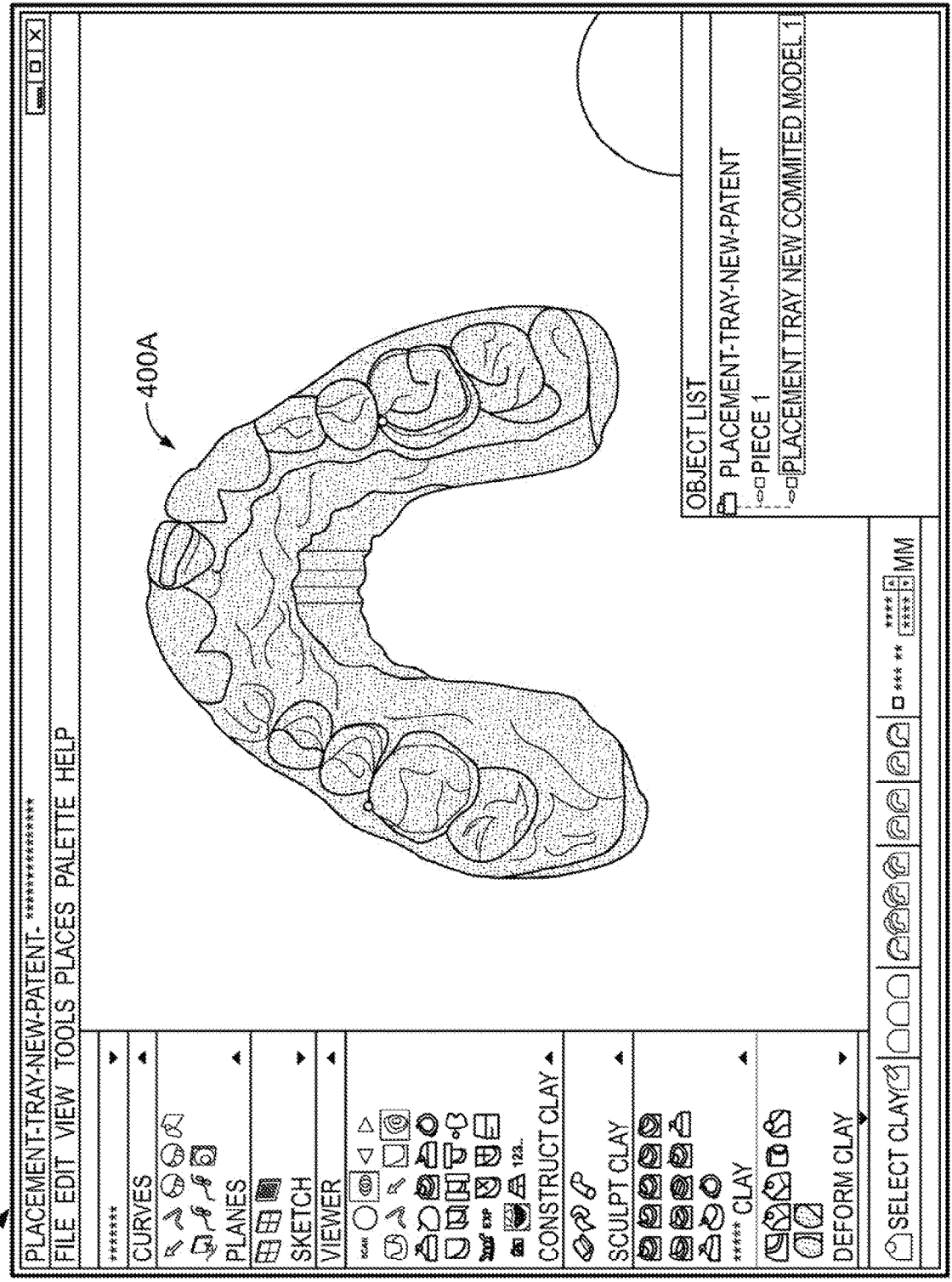
Figure 24A:
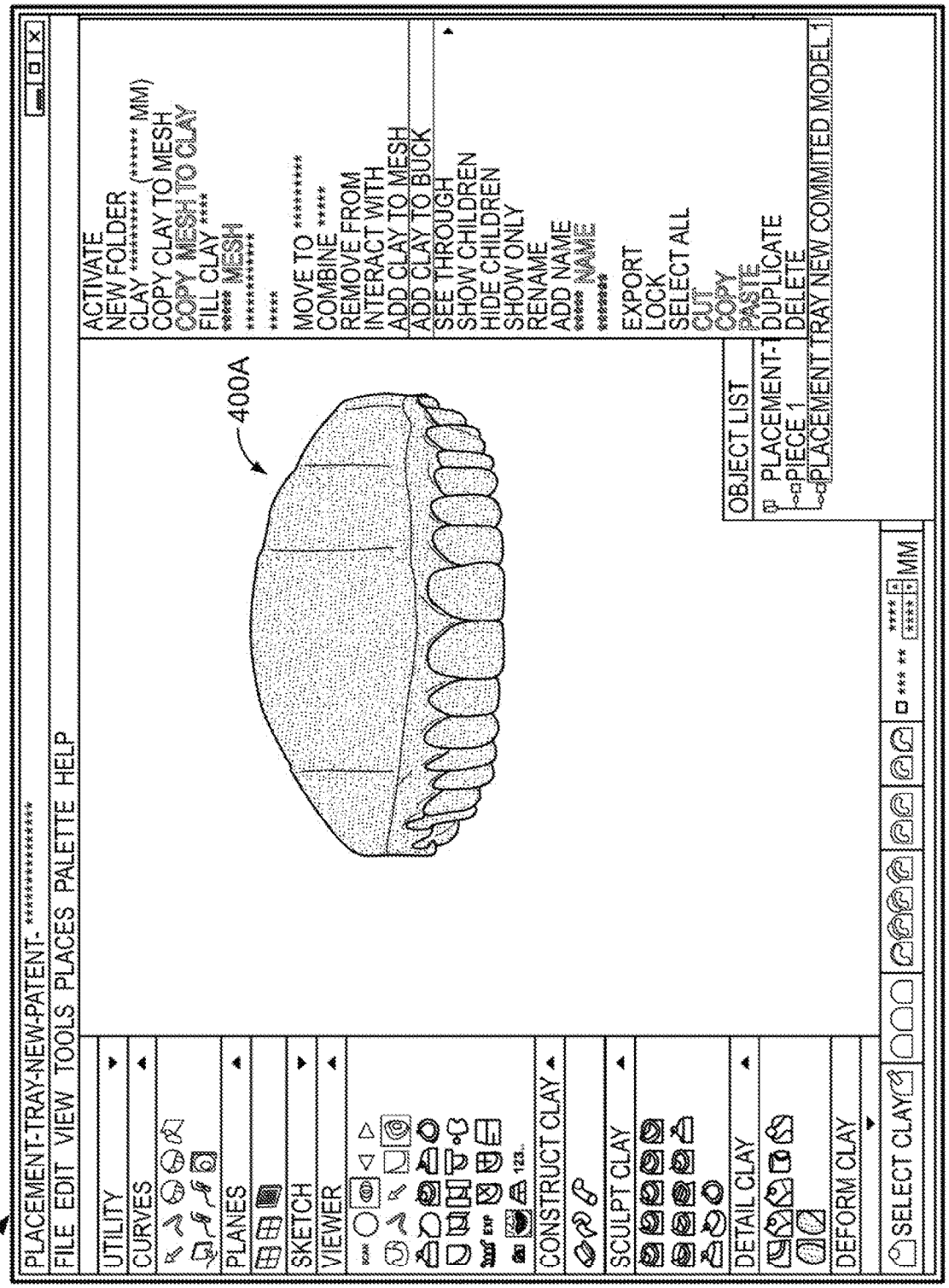
FIGS. 24A-24C show process steps during the transformation of the modified CAD model of FIGS. 23A and 23B from a digital clay model to a restored 3D buck model in accordance with an embodiment.
Figure 24B:
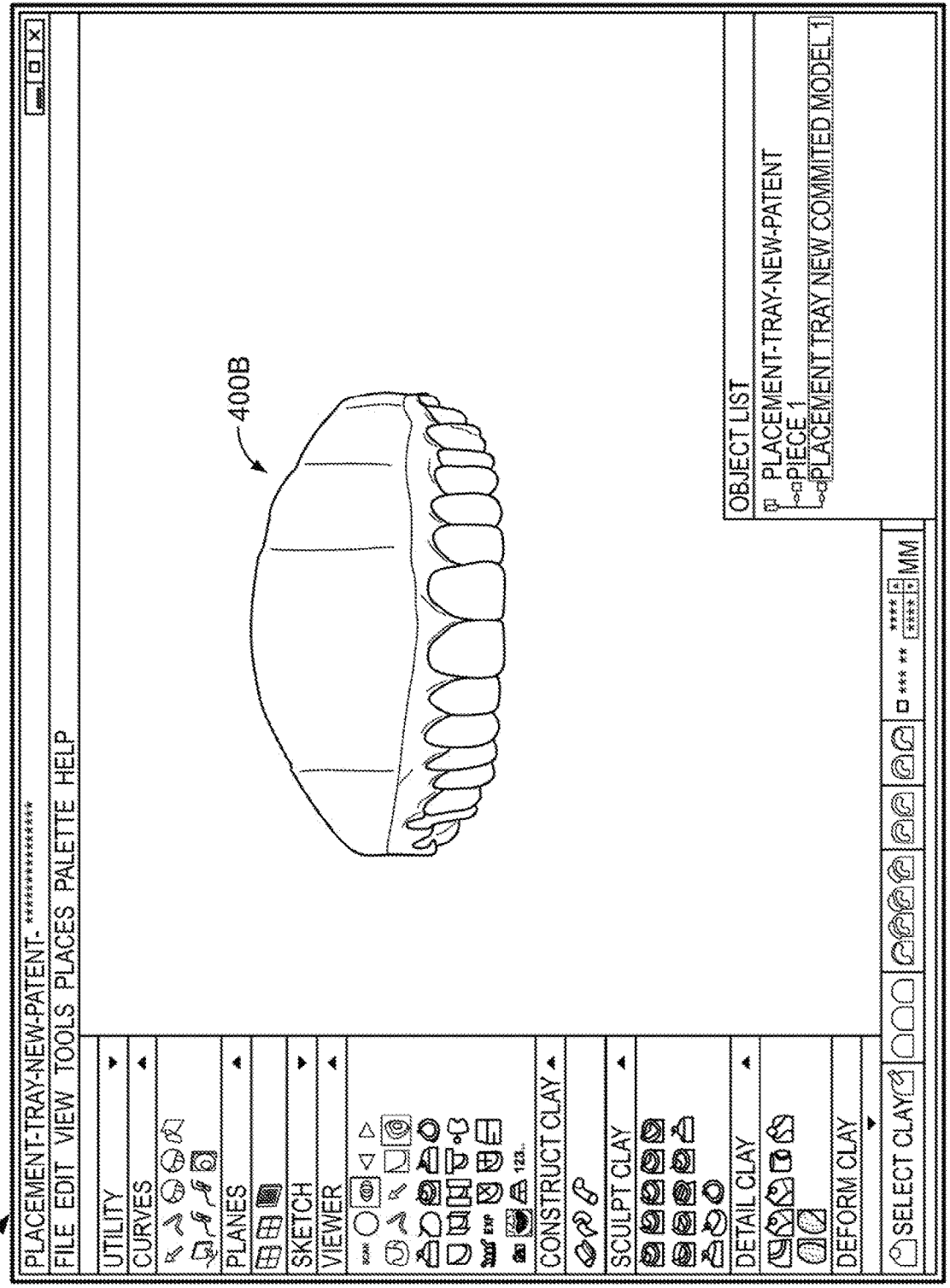
Figure 24C:
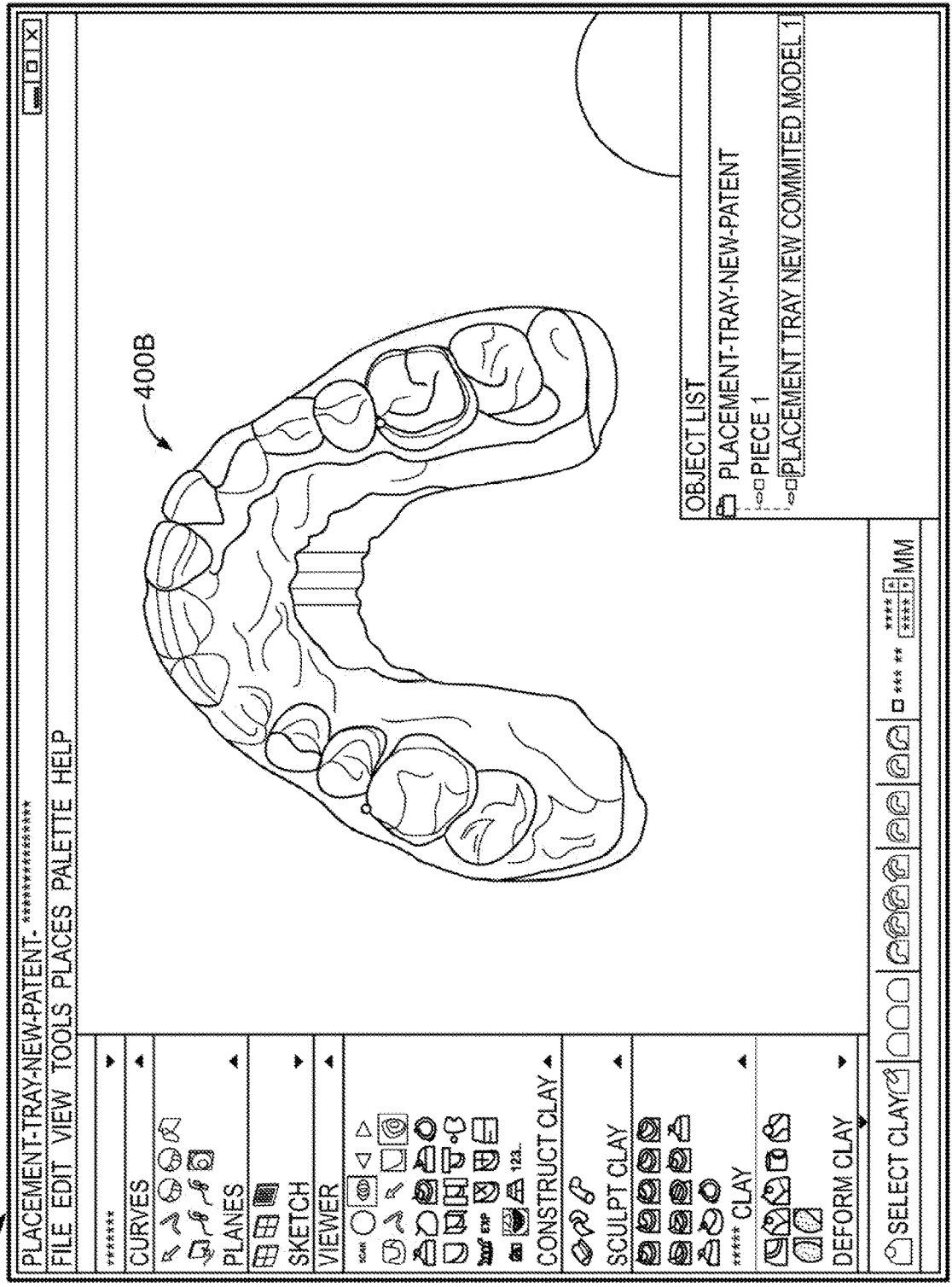

Referring now to FIGS. 23A and 23B, the user of building application 135 may provide an input, such as by clicking an icon on the GUI of the specialty tool package, to perform a block out on the restored 3D model to detect the undercut areas of digital working teeth 250 and to establish an insertion path (and, in some instances, setting within the building application an insertion axis) for a model placement guide device in order to remove undercuts from the restored 3D model and thus form modified restored 3D model 400A. As in this example, building application 135 with the specialty tool package removes such undercuts automatically based on the designation of the insertion axis. In this manner, restored 3D model 400A includes surfaces that may be used to conform a model placement guide device corresponding to a physical placement guide device that may be passively placed over and fitted onto a patient's teeth without exerting any pressure or at least any significant amount of pressure. Once restored 3D model 400A is finalized as desired, as shown in FIGS. 24A-24C, the user of building application 135 may provide an input, such as by clicking an icon on the GUI of the specialty tool package, to covert restored 3D model 400A from a clay model to buck, i.e., blocked out, model 400B.

Figure 25A:
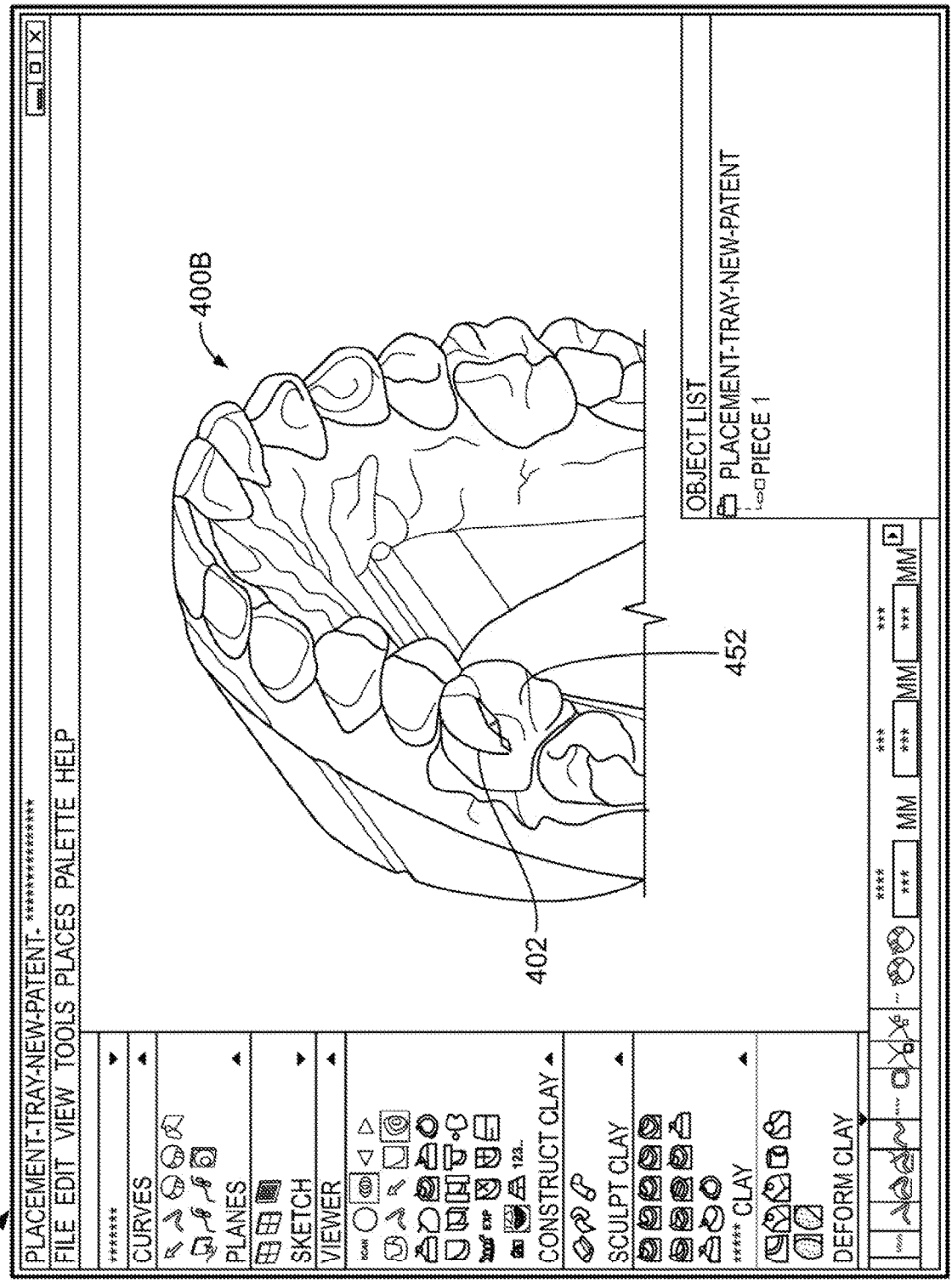
FIGS. 25A and 25B are perspective and plan views, respectively, of the restored 3D model of FIGS. 24B and 24C along with the addition of a boundary line for a digital primary support in accordance with an embodiment.
Figure 25B:
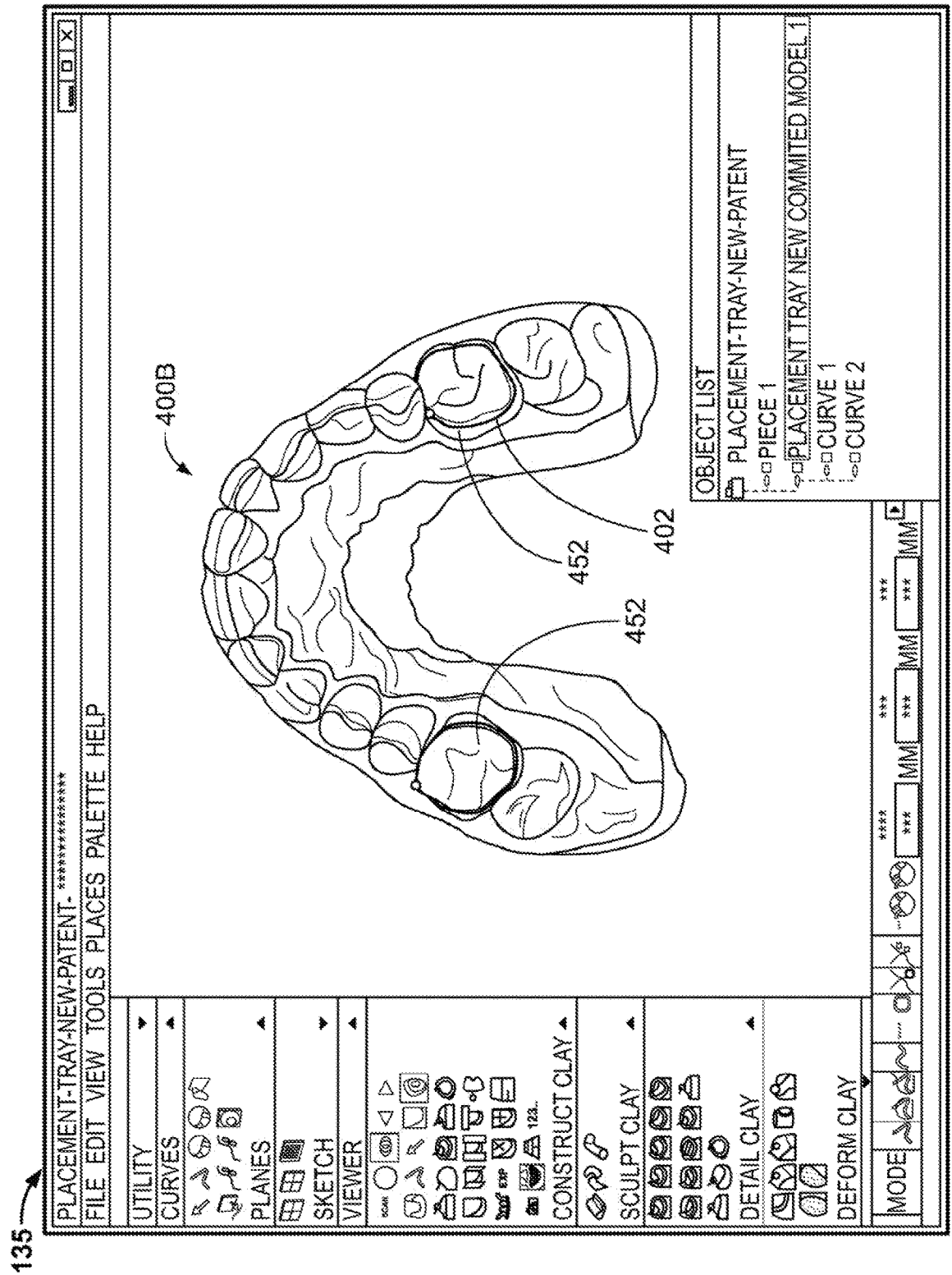

With reference to FIGS. 25A and 25B, the user of building application 135 may provide an input, such as by clicking an icon on the GUI of the specialty tool package, to select a design tool in order to draw boundary 402, i.e., an extreme edge or extreme edges, corresponding to initial primary support configuration data for the digital occlusal surface support, i.e., digital primary support discussed further herein, for the placement tray to be fabricated. As in the example, such boundaries may be but are not limited to being drawn sufficiently around digital support teeth 452, which as shown may be opposing digital molars, such that building application 135 with the specialty tool package understands the boundaries to be intended to be closed boundaries. In this manner, portions of the placement tray to be fabricated that will be placed over teeth not requiring restoration and that may provide the most stabilization and positioning of the fabricated placement tray are digitally defined.

Figure 26:
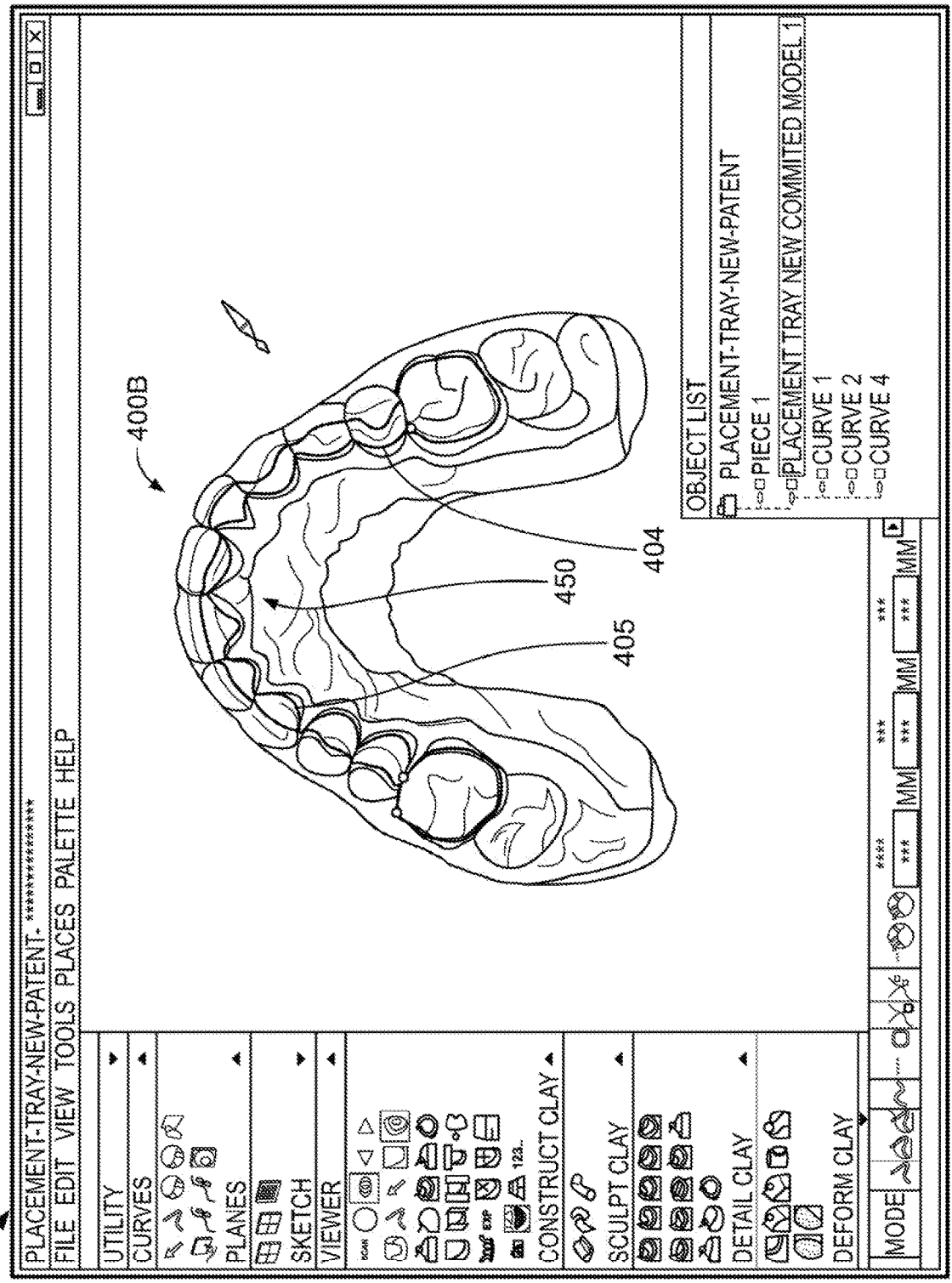
FIG. 26 is a plan view of the restored 3D model of FIG. 25B with the addition of a boundary line for a digital lingual auxiliary support in accordance with an embodiment.

As shown in FIG. 26, the user of building application 135 may provide an input, such as by clicking an icon on the GUI of the specialty tool package, to select a design tool in order to draw a sufficiently closed boundary 404 corresponding to initial lingual support configuration data for the digital lingual or palatal body support, i.e. digital lingual auxiliary support, for the placement guide device to be fabricated. As in this example, such a boundary may be but is not limited to being drawn sufficiently around the digital lingual side of digital working teeth 450 and preferably down to or near the set of digital gumlines 405. In this manner, portions of the fabricated placement guide device intended to contact the working teeth requiring restoration, and in some instances adjacent teeth of those working teeth that may not be in need of a restoration, are digitally defined. As shown, sufficiently closed boundaries 402 and 404 may intersect with each other.

Figure 27A:
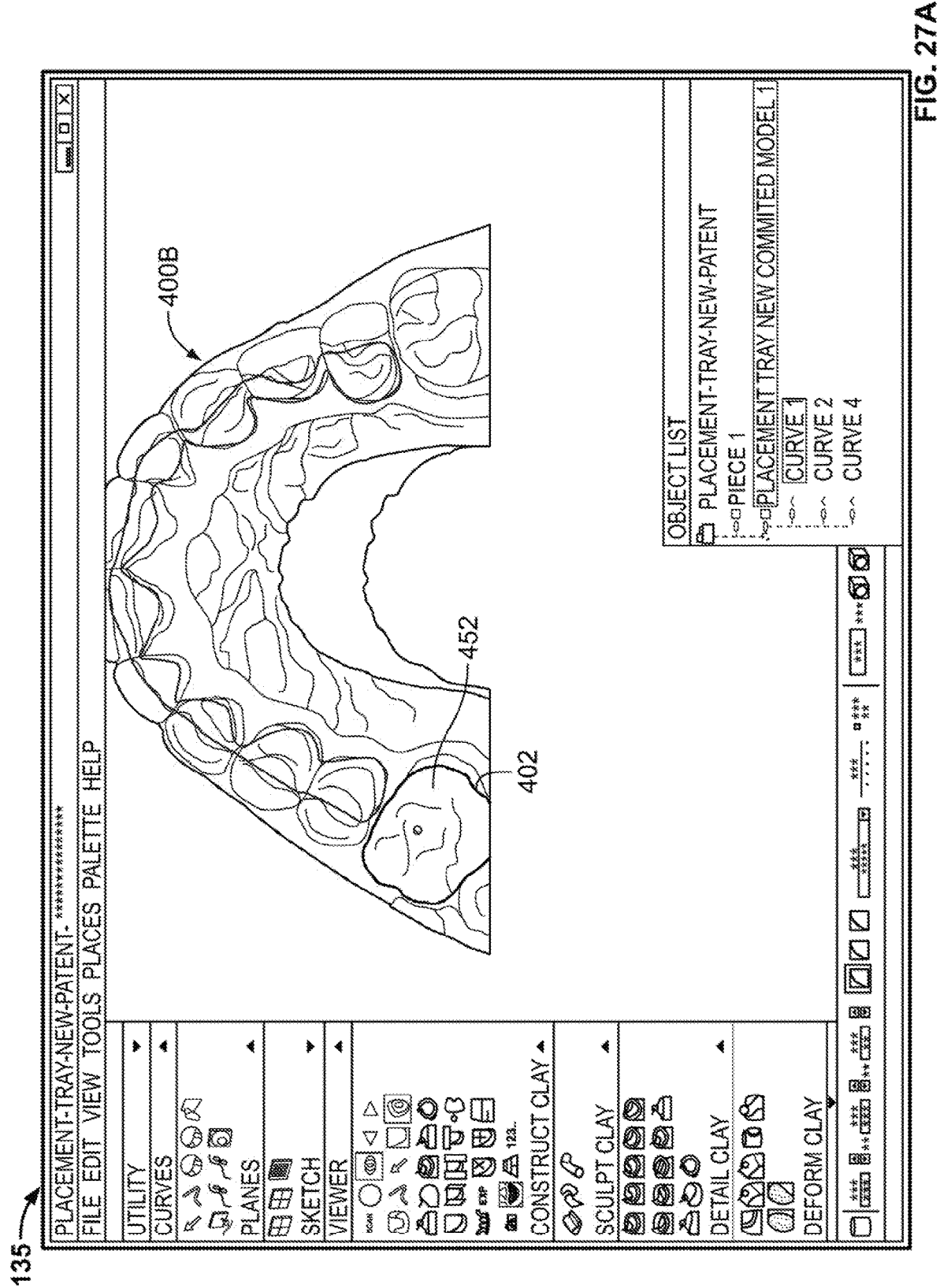
FIGS. 27A and 27B show process steps for embossing digital support teeth to form the digital primary support of an in-process digital placement tray in accordance with an embodiment.
Figure 27B:
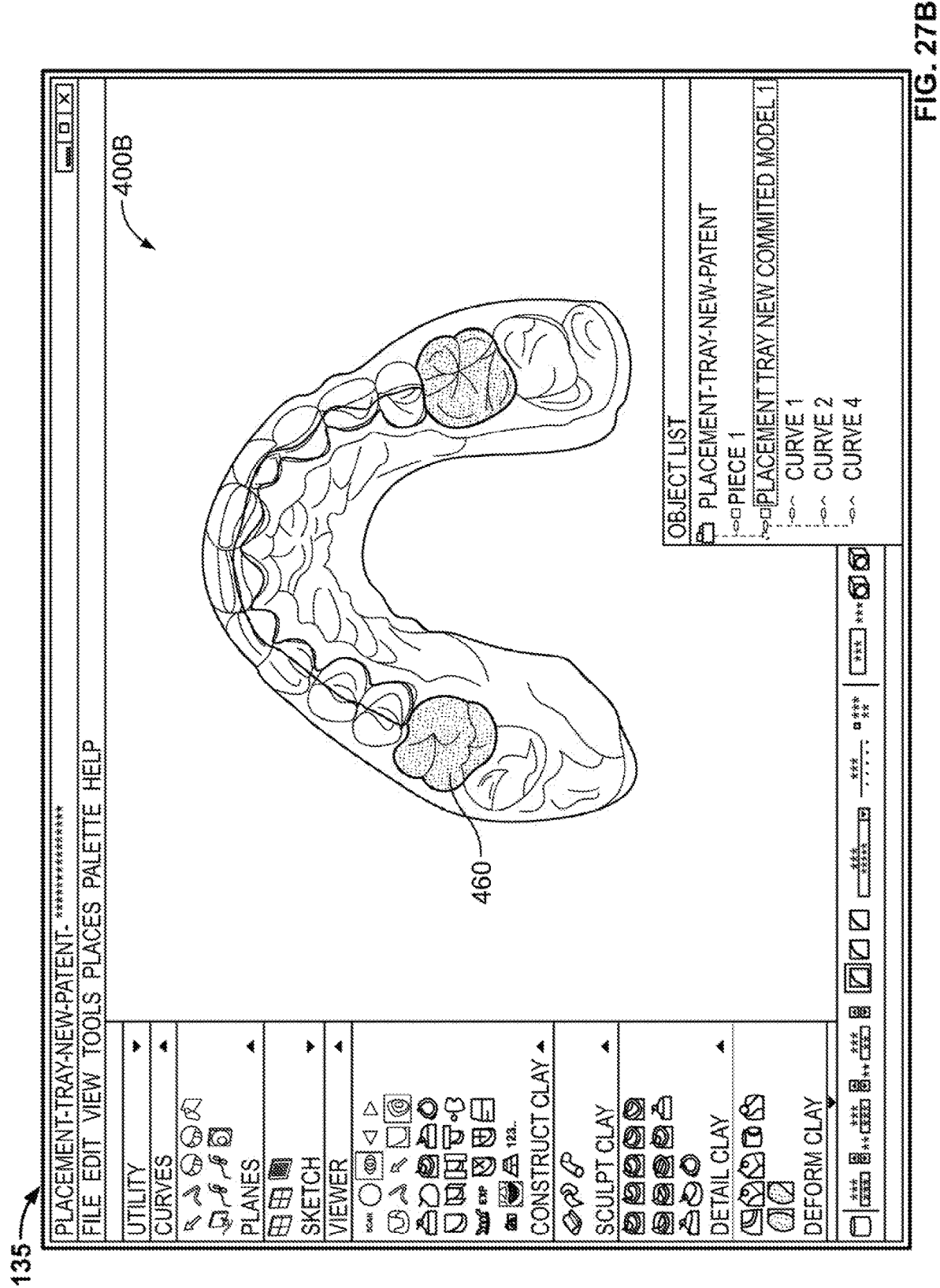

Referring now to FIG. 27A, the user of building application 135 may provide an input, such as by clicking an icon on the GUI of the specialty tool package, to select a design tool in order to identify the region within boundary 402 around digital support teeth 452 to be embossed, i.e. thickened away from the digital support teeth. As shown in FIG. 27B, building application 135 with the specialty tool package, upon receiving an input from the user, then embosses the region within boundary 402 and away from digital support teeth 452 by adding digital clay within the boundary as well as adding digital clay, by a predetermined distance, in a direction away from the boundary to form digital primary support 460 corresponding to final primary support configuration data.

Figure 28:
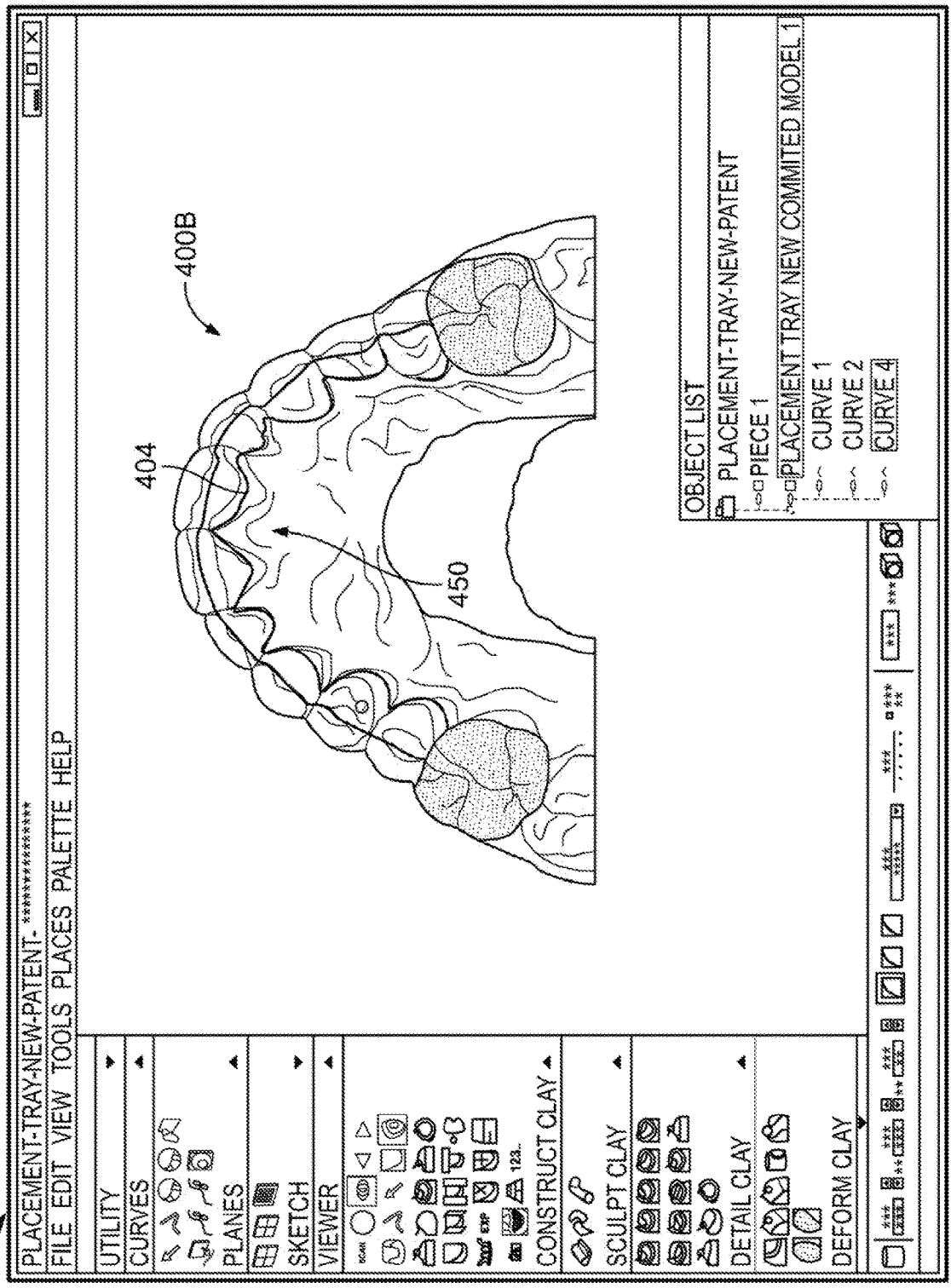
FIG. 28 shows a process step for embossing a digital lingual side of digital working teeth to form the digital lingual auxiliary support onto the in-process digital placement tray of FIG. 27B in accordance with an embodiment.
Figure 29:
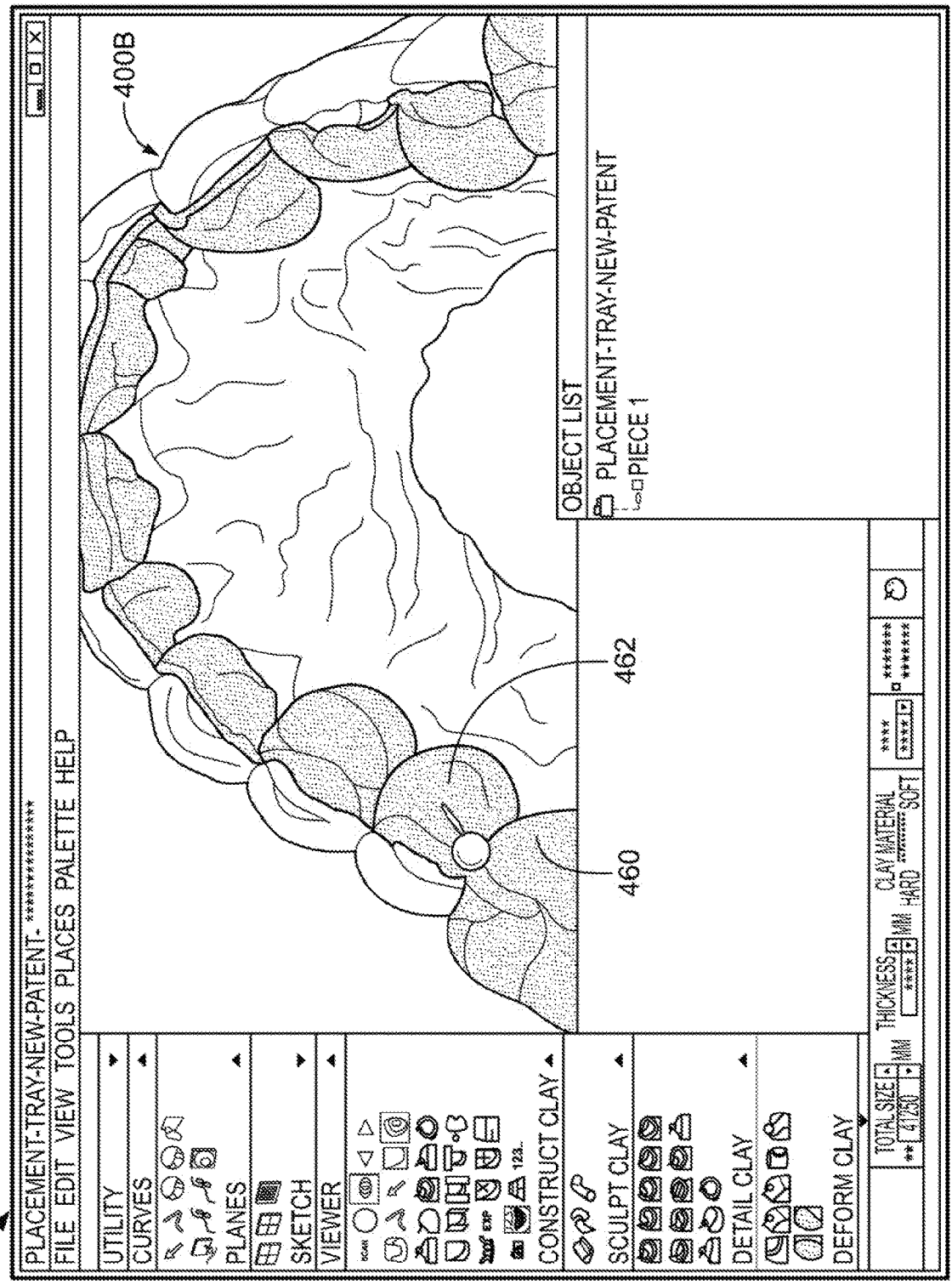
FIG. 29 shows a process step for forming a digital intersection of the in-process digital placement tray of FIG. 28 between the digital primary support and the digital lingual auxiliary support in accordance with an embodiment.

As illustrated in FIG. 28, the user of building application 135 may provide an input, such as by clicking an icon on the GUI of the specialty tool package, to select the embossing design tool in order to identify the region within boundary 404 around the digital lingual side of digital working teeth 450 to be embossed. As shown in FIG. 29, building application 135 with the specialty tool package is then used to emboss the region within boundary 404 and away from digital working teeth 450 by adding digital clay within the boundary as well as, by a predetermined distance, in a direction away from the boundary to form digital lingual auxiliary support 462 corresponding to final lingual support configuration data.

Figure 30:
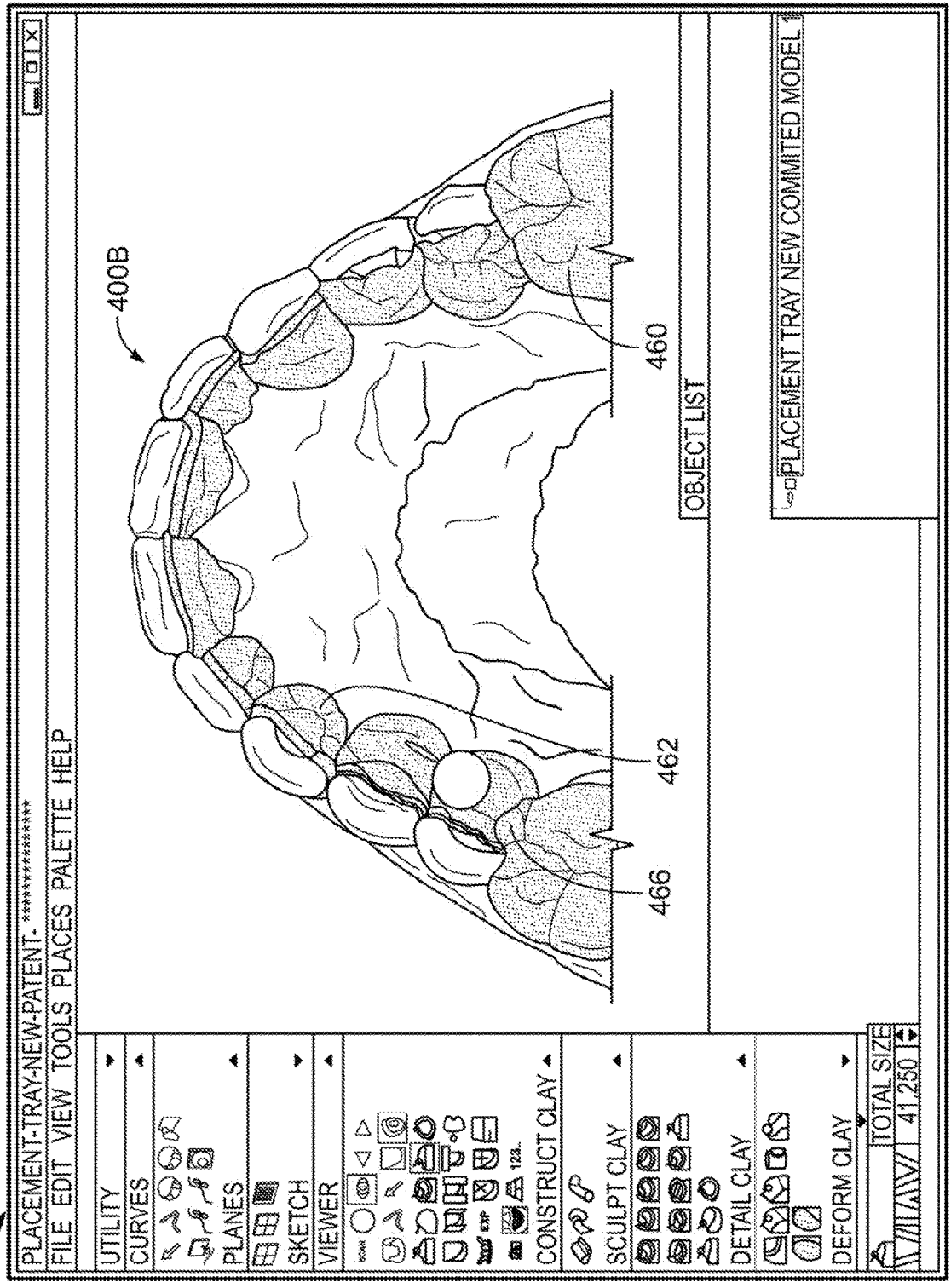
FIG. 30 shows process step for smoothening the digital intersection of the in-process digital placement tray prepared by the process illustrated in FIG. 29 and portions of the digital primary support and the digital lingual auxiliary support around the digital intersection in accordance with an embodiment.

Still referring to FIG. 29, as in this example, the user of building application 135 may provide an input, such as by clicking an icon on the GUI of the specialty tool package, to select a drawing tool to add digital clay between digital primary support 460 and digital lingual auxiliary support 462 to connect and form digital intersection 466 (shown in FIG. 30) corresponding to lingual connecting support configuration data between these supports. With reference to FIG. 30, the digital surfaces of any one or any combination of digital primary support 460, digital lingual auxiliary support 462, and digital intersection 466 are smoothened as needed. In this manner, potential rough edges that may otherwise be formed during eventual fabrication of the physical placement guide device are reduced or eliminated, and potential patient discomfort due to such edges is accordingly reduced or eliminated.

Figure 31A:
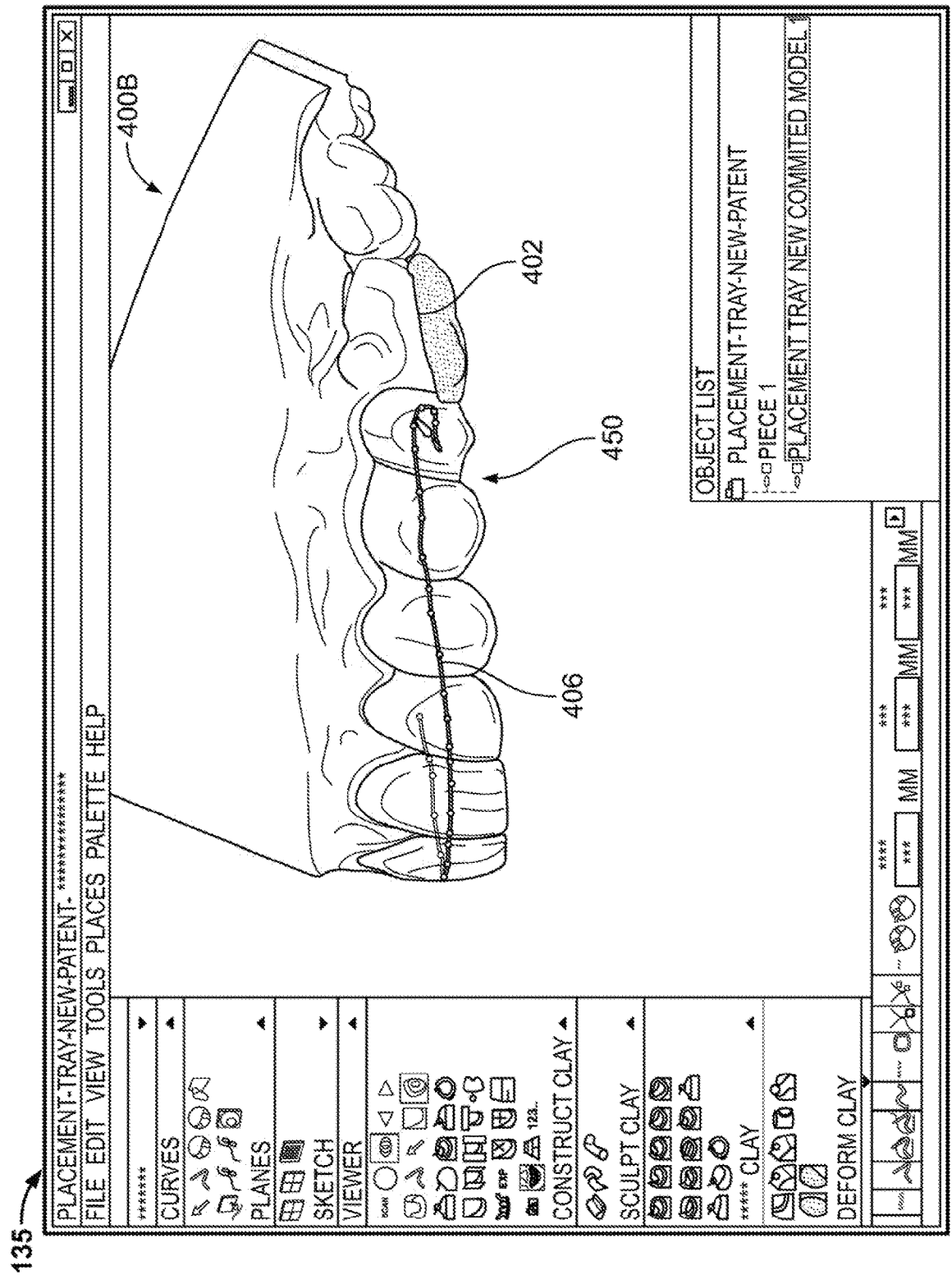
FIGS. 31A and 31B show elevation views of the in-process digital placement tray of FIG. 30 along with the addition of a boundary line for a digital buccal auxiliary support in accordance with an embodiment.
Figure 31B:
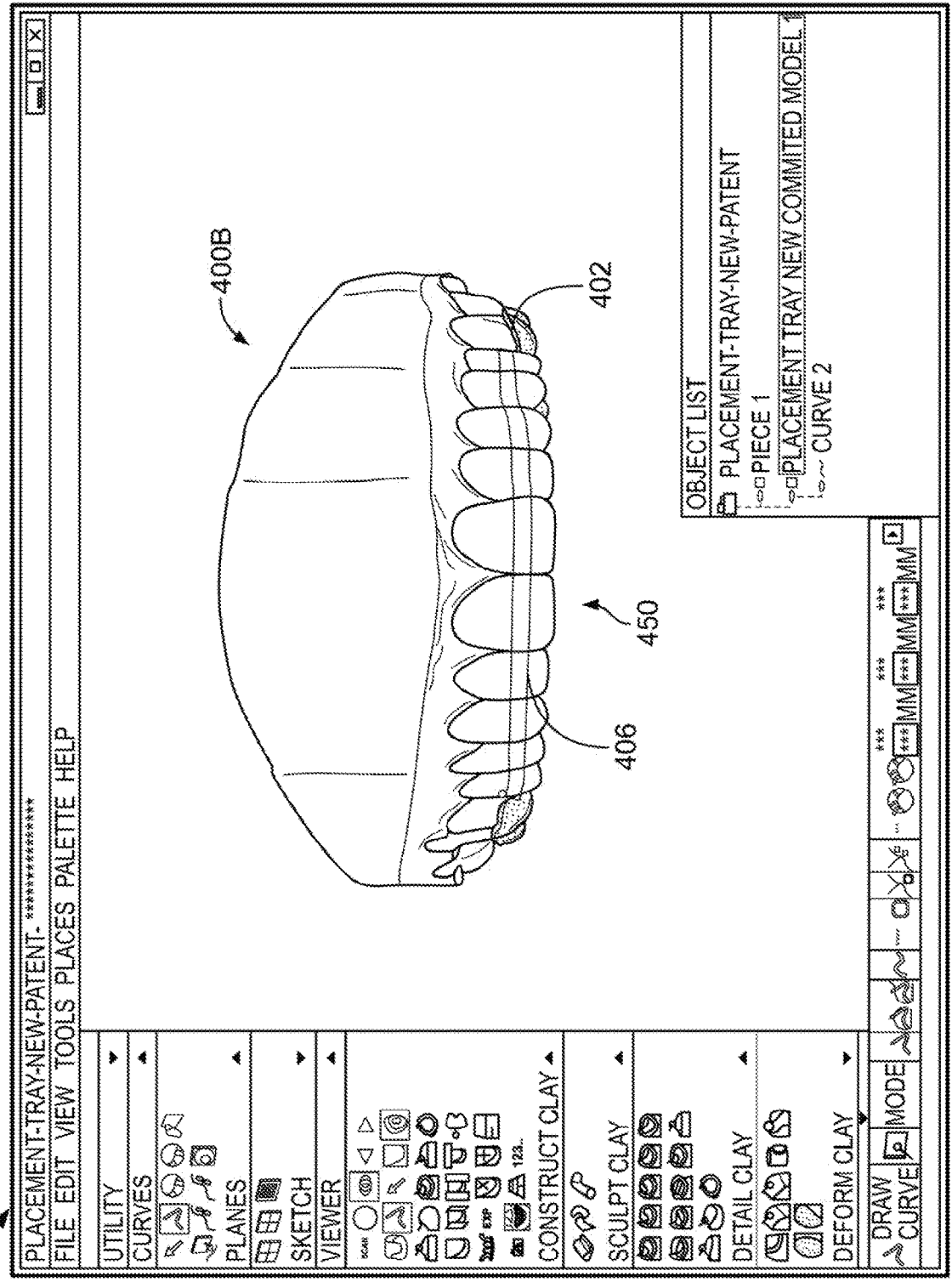

Referring now to FIGS. 31A and 31B, the user of building application 135 may provide an input, such as by clicking an icon on the GUI of the specialty tool package, to select a design tool in order to draw a sufficiently closed boundary 406 corresponding to initial buccal support configuration data for the digital buccal or labial support, i.e., digital buccal auxiliary support, for the placement guide device to be fabricated. As in this example, such a boundary may be but is not limited to being drawn sufficiently around a portion of the digital buccal side of digital working teeth 450 and preferably over an approximately central region of the digital working teeth. In this manner, portions of the fabricated placement guide device that will contact the one or more restorations are digitally defined. As shown, sufficiently closed boundaries 402 and 406 may be near or intersect with each other.

Figure 32:
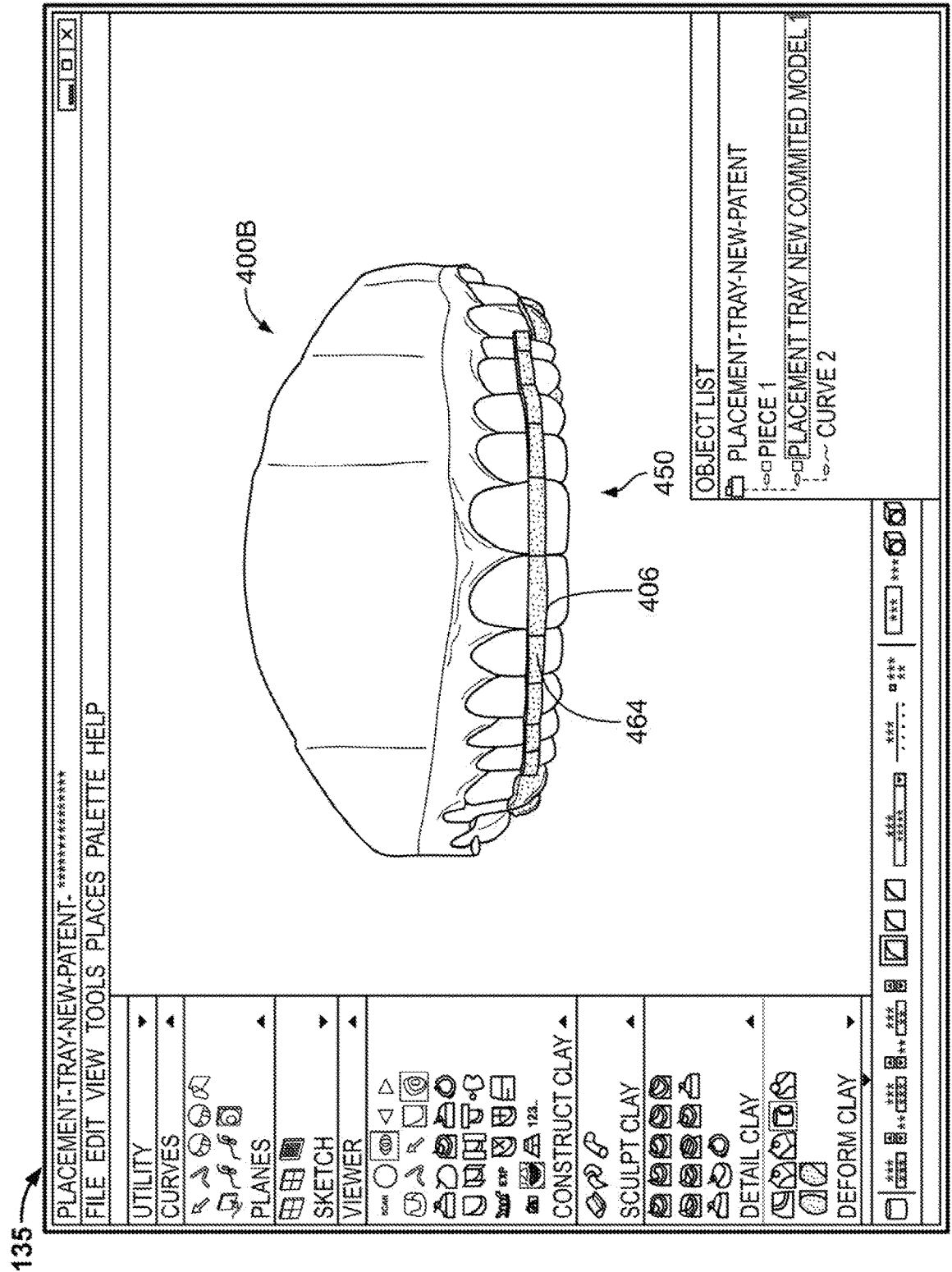
FIG. 32 shows the in-process digital placement tray of FIG. 31B with the addition of embossing to the digital buccal side of digital working teeth to form a digital buccal auxiliary support onto the in-process digital placement tray.

With reference to FIG. 32, the user of building application 135 may provide an input, such as by clicking an icon on the GUI of the specialty tool package, to select the embossing design tool in order to identify the region within boundary 406 around the digital buccal side of digital working teeth 450 to be embossed. As shown, building application 135 with the specialty tool package is used to emboss the region within boundary 406 and away from digital working teeth 450 by adding digital clay within the boundary as well as, by a predetermined distance, in a direction away from the boundary to form digital buccal auxiliary support 464 corresponding to final buccal support configuration data.

Figure 33A:
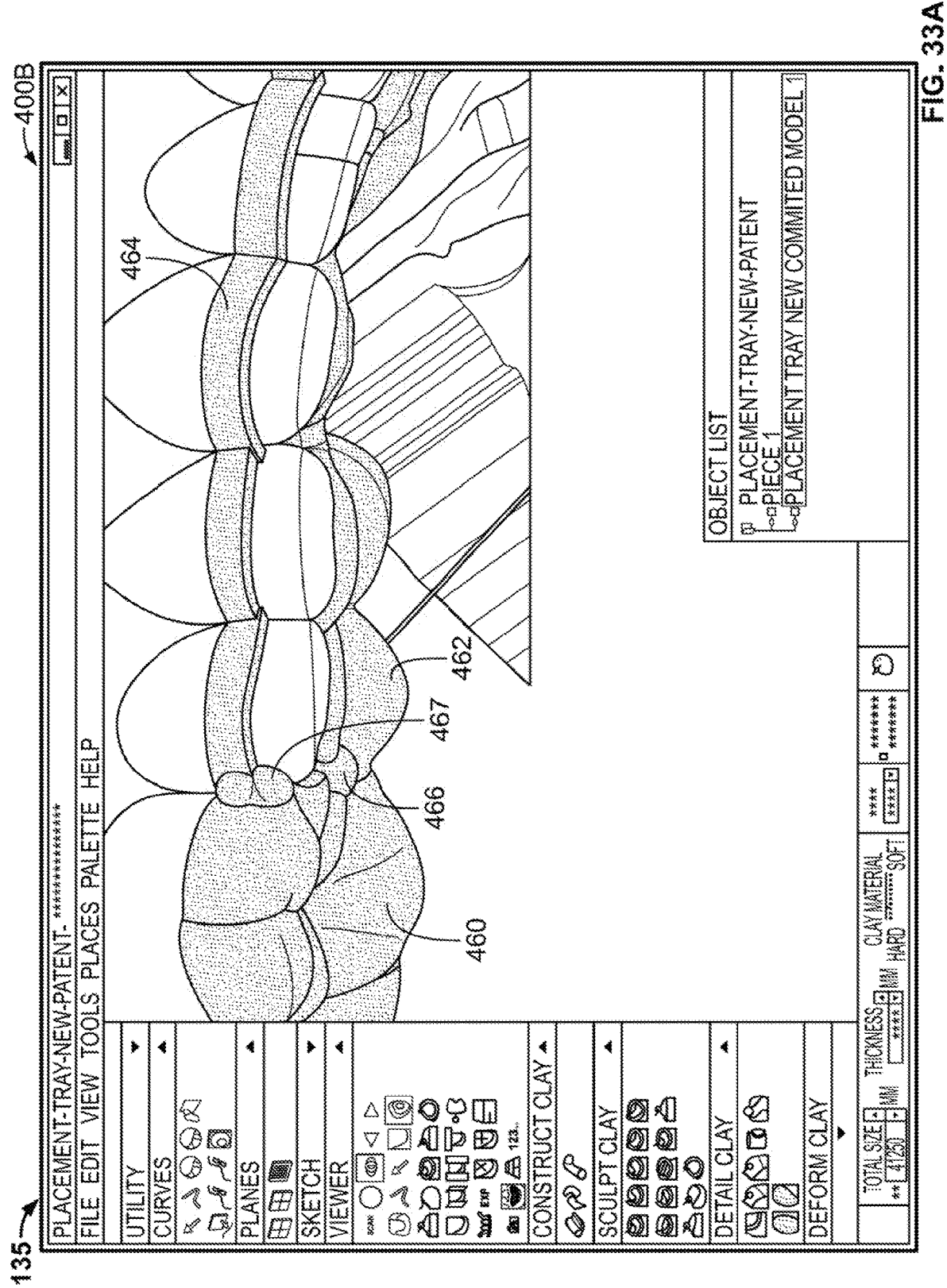
FIG. 33A is a partial elevation view of a digital intersection added onto the in-process digital placement tray of FIG. 32 between the digital primary support and the digital buccal auxiliary support in accordance with an embodiment.
Figure 33B:
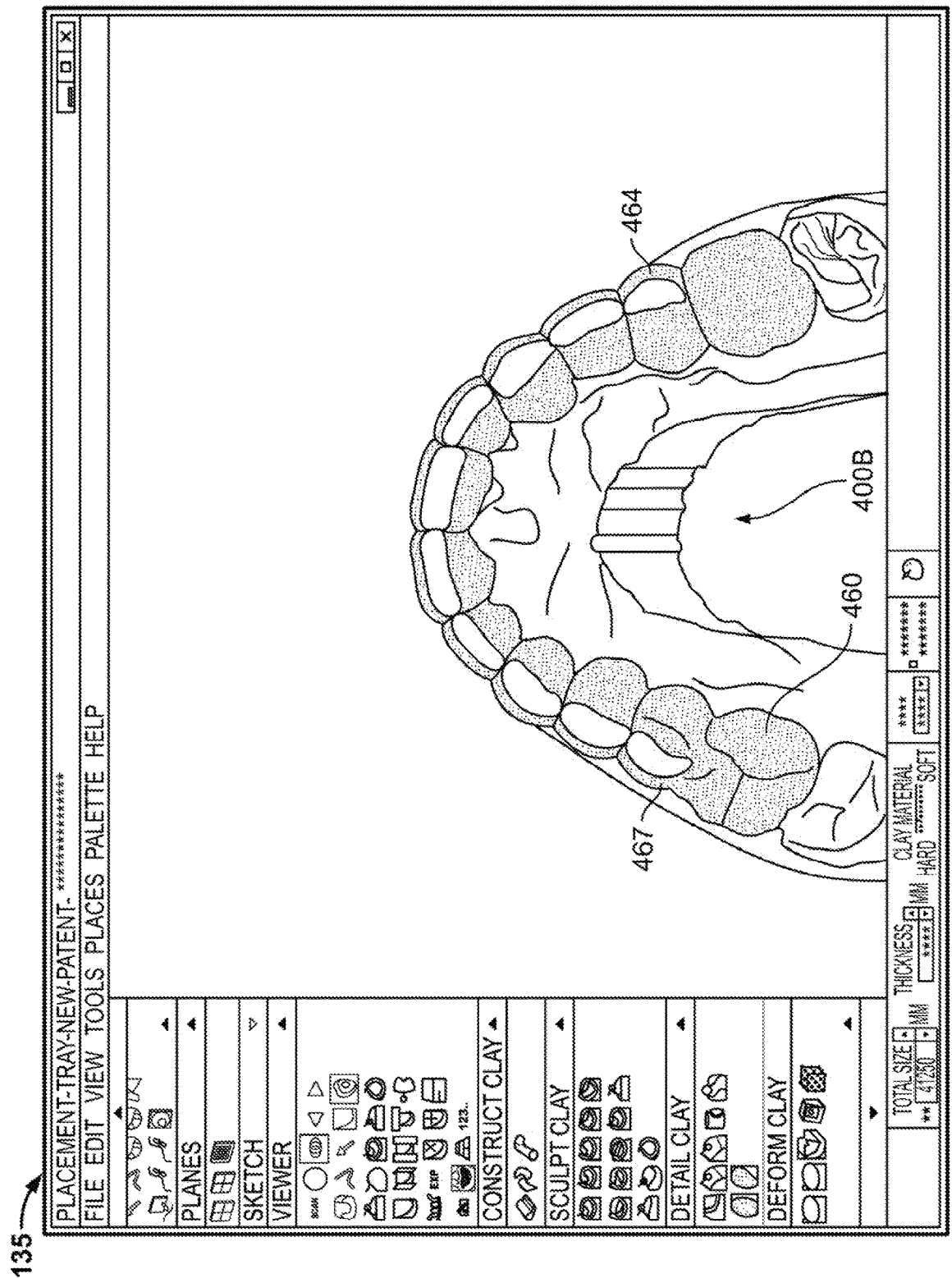
FIG. 33B is a plan view of the digital primary support, digital buccal auxiliary support, and the digital intersection therebetween of the in-process digital placement tray of FIG. 33A after being smoothened in accordance with an embodiment.

Referring now to FIG. 33A, as in this example, the user of building application 135 may provide an input, such as by clicking an icon on the GUI of the specialty tool package, to select a drawing tool to add digital clay between digital primary support 460 and digital buccal auxiliary support 464 to connect and form digital intersection 467 corresponding to buccal connecting support configuration data between these supports. With reference to FIG. 33B, the digital surfaces of any one or any combination of digital primary support 460, digital buccal auxiliary support 464, and digital intersection 467 are smoothened as needed. In this manner, potential rough edges that may otherwise be formed during eventual fabrication of the physical placement guide device are reduced or eliminated, and potential patient discomfort due to such edges is accordingly reduced or eliminated.

Figure 34A:
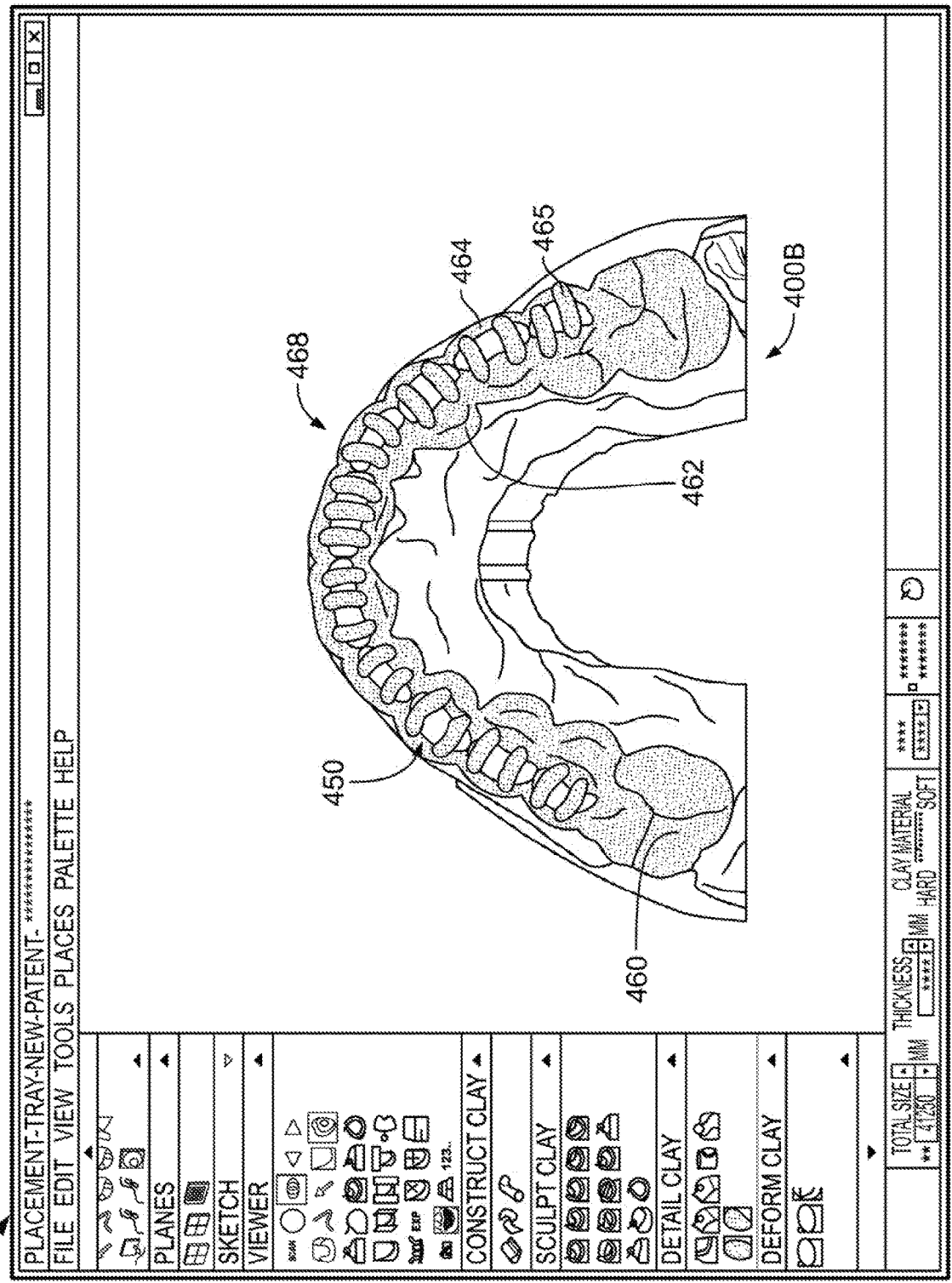
FIGS. 34A and 34B are plan and elevation views, respectively, of the in-process digital placement tray of FIG. 33B with the addition of digital connector supports in accordance with an embodiment.
Figure 34B:
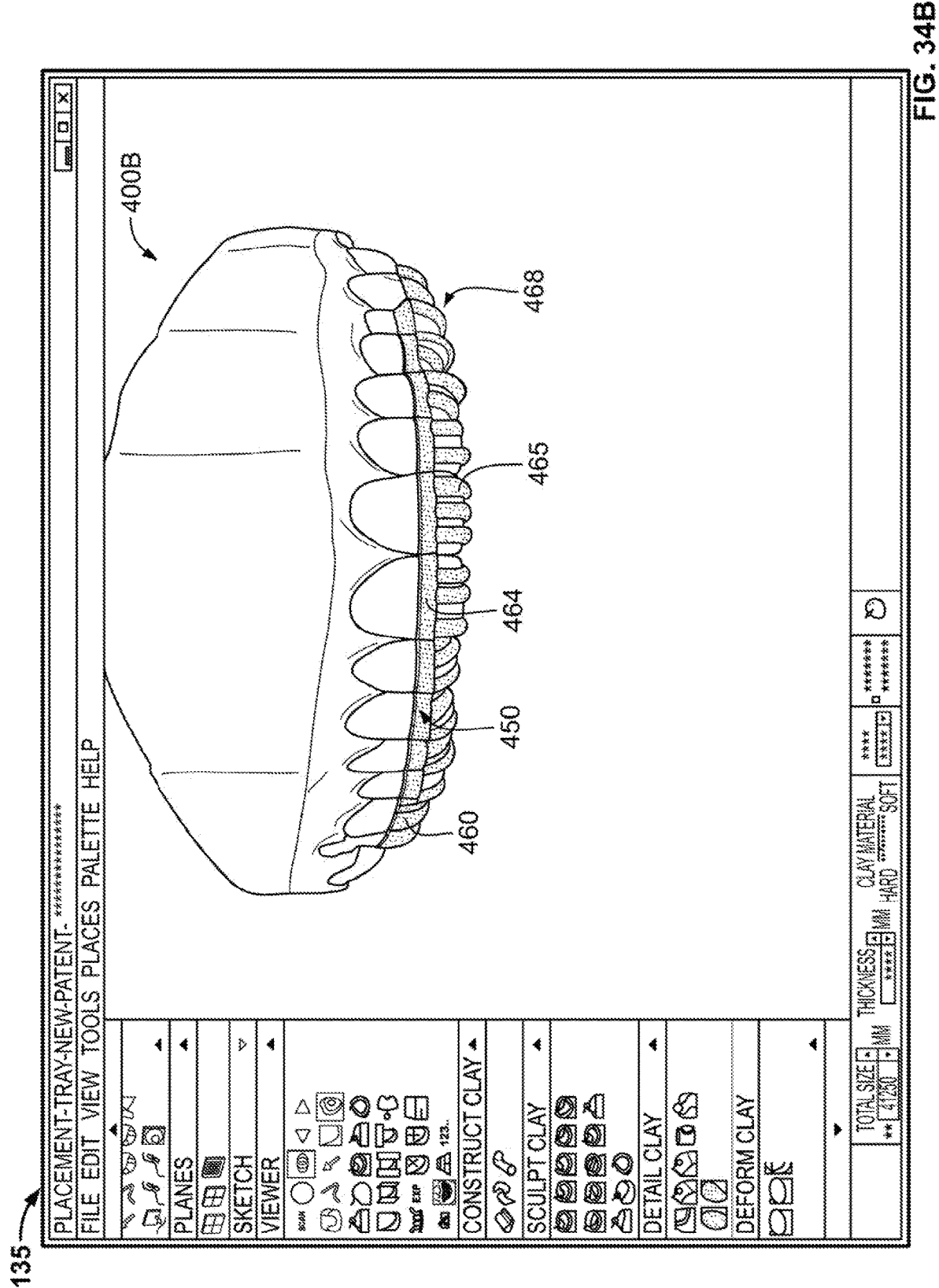

Referring to FIGS. 34A and 34B, the user of building application 135 with the specialty tool package may provide inputs to the building application to prepare, in the same manner digital primary support 460, digital lingual auxiliary support 462, and digital buccal auxiliary support 464 are prepared, occlusal connector configuration data corresponding to one or more digital connector supports 465 configured for contacting the one or more digital restorations, and preferably as in this example configured for wrapping around the digital restorations, to support the digital restorations. Digital connector supports 465 extend between, and initially or with the use of additional digital clay intersect with digital lingual auxiliary support 462 and digital buccal auxiliary support 464. In this manner, when the physical placement guide device is formed, connector supports corresponding to digital connector supports 465 support the restorations corresponding to the digital restorations. As further shown, digital connector supports 465 are spaced apart along digital working teeth 450 of restored 3D model 400B. In this manner, physical connector supports corresponding to digital connector supports 465 may provide support for the restorations corresponding to the digital restorations and may provide visibility of the teeth corresponding to digital working teeth 450. As such, the physical connector supports may allow for flossing of or otherwise cleaning, such as of excess adhesive, in between restorations, e.g., veneers, corresponding to the digital restorations, and in particular after tag curing, i.e., partially curing, such as by light exposure, the restorations to the working teeth. Furthermore, physical connector supports corresponding to digital connector supports 465 allow for excess flowable luting cement, e.g., a photosensitive curable cement, used for placing the physical restorations to flow between the connector supports. In this manner, the excess cement may be removed by a dentist, e.g., using brushes, prior to its curing while the cement is in the liquid stage and thus more easily removable. Digital surfaces of any one or any combination of digital connector supports 465, digital lingual auxiliary support 462, and digital buccal auxiliary support 464 are smoothened as needed to generate initial retention splint data corresponding to rough digital placement guide device 468.

Figure 35:
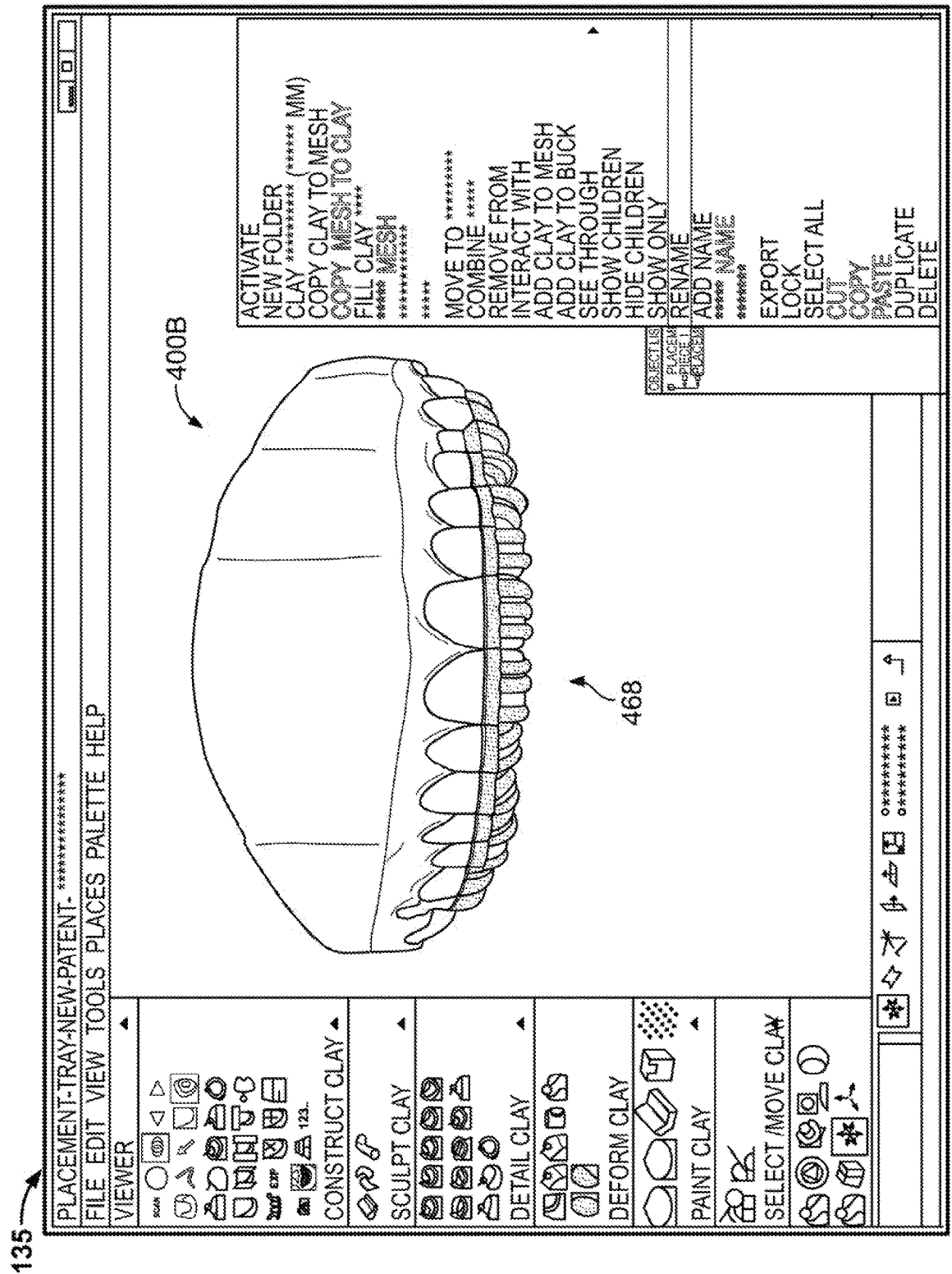
FIG. 35 shows a process step for diving the in-process digital placement tray of FIGS. 34A and 34B from the restored 3D buck model of FIGS. 24B and 24C in accordance with an embodiment.
Figure 36:
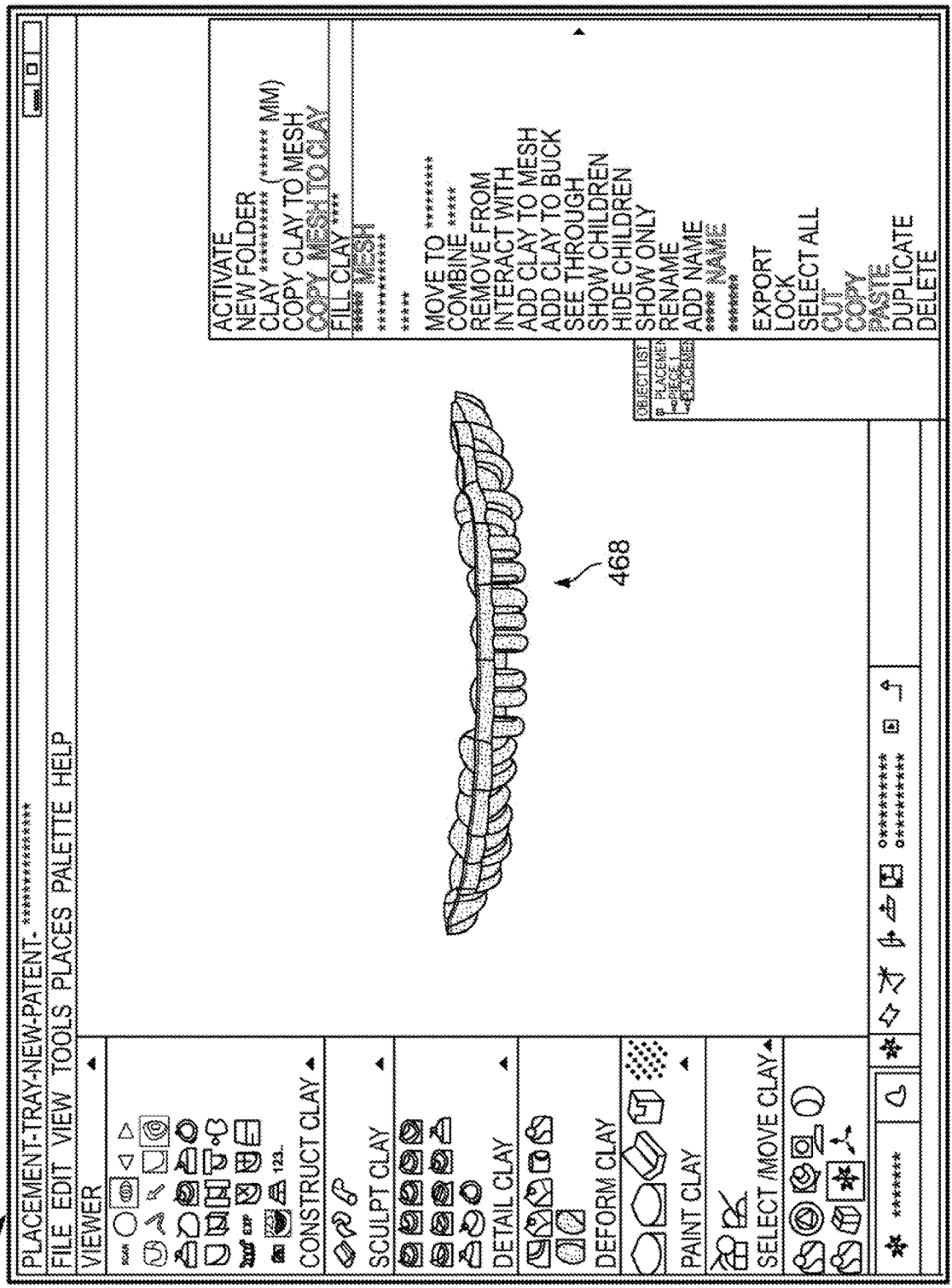
FIG. 36 shows a process step for cleaning the in-process digital placement tray shown in FIG. 35 in accordance with an embodiment.

Referring to FIG. 35, the user of building application 135 may provide an input, such as by clicking an icon on the GUI of the specialty tool package, to select a tool to dive, i.e., separate, rough digital placement guide device 468 from restored 3D model 400B, i.e., in this example, to separate the clay mesh model from the buck model. With reference to FIG. 36, the user of building application 135 may provide an input, such as by clicking an icon on the GUI of the specialty tool package, to select a tool to remove undesired portions, i.e. to "clean," rough digital placement tray 468, thus generating final retention splint data corresponding to final digital placement guide device 470, which may be a final digital placement tray as shown in FIG. 37.

Figure 37:
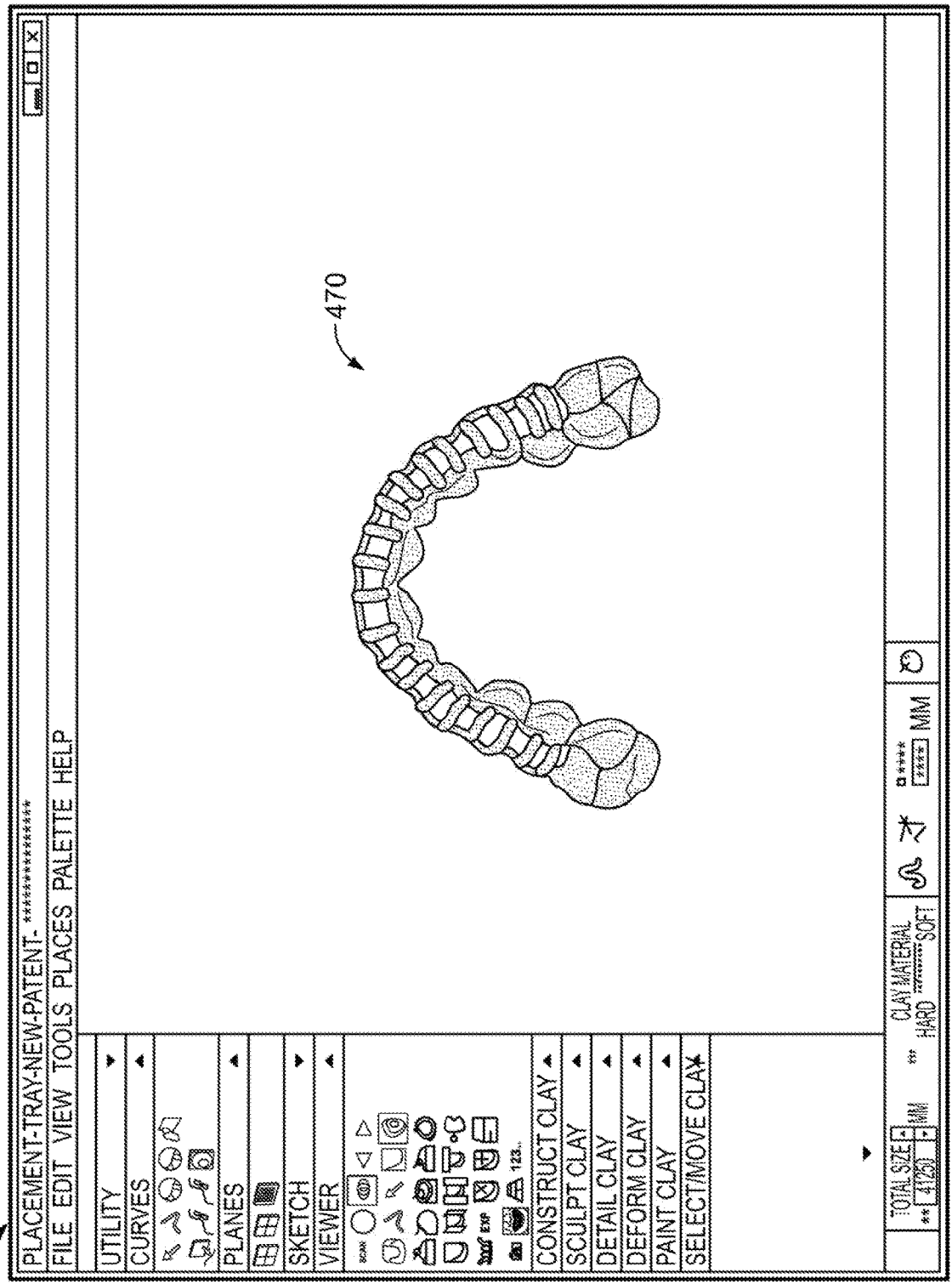
FIG. 37 is a plan view of the final digital placement tray after the cleaning step shown in FIG. 36 in accordance with an embodiment.
Figure 38:
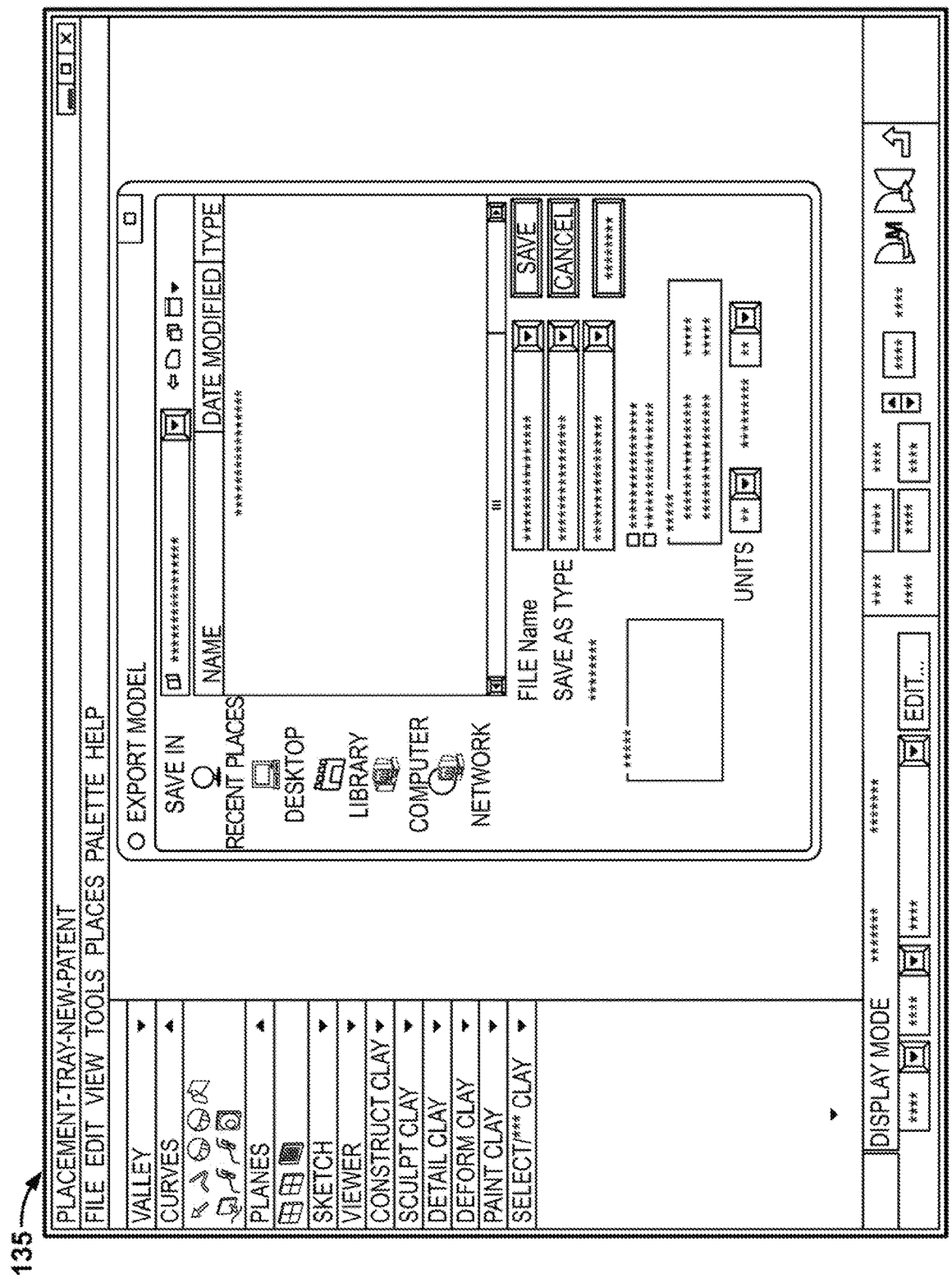
FIG. 38 shows a step of manipulating the data associated with the final digital placement tray of FIG. 37 to form a data file for use with a fabrication device in accordance with an embodiment.
Figure 39:
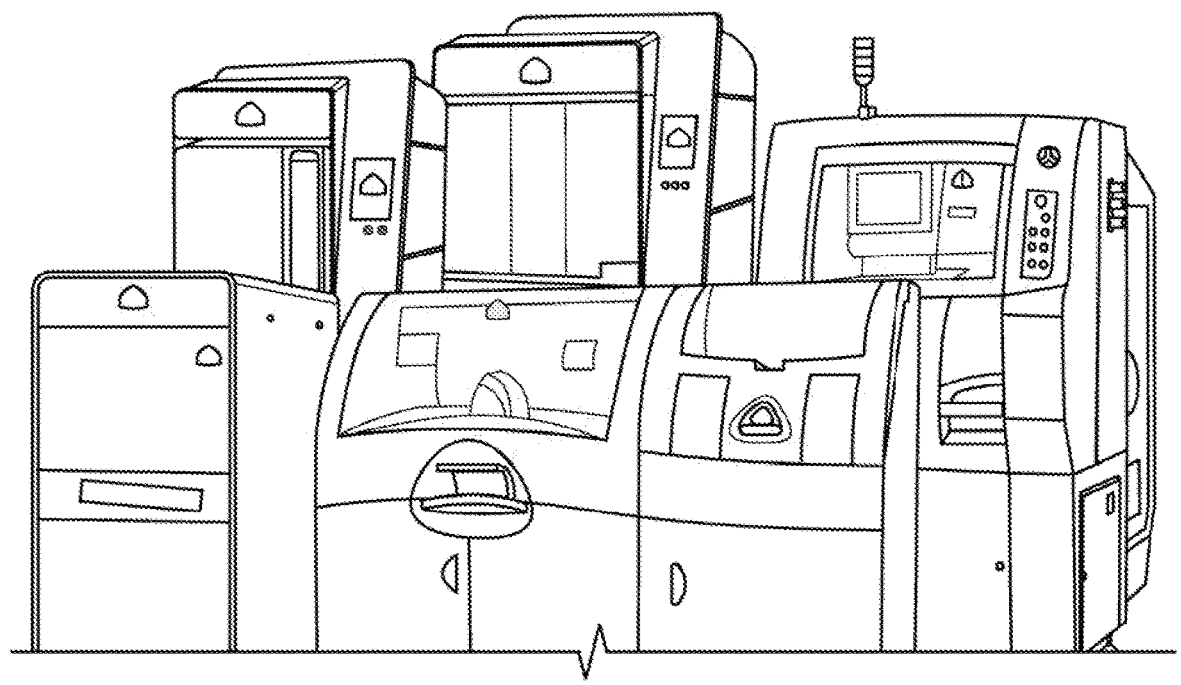
FIG. 39 shows an additive manufacturing machine that may be used to form a physical placement tray corresponding to the final digital placement tray of FIG. 37 in accordance with an embodiment.

With reference to FIGS. 37 and 38, the file size of final digital placement guide device 470 is reduced and the reduced file is converted and electronically stored as an .STL file or other compatible file for use with a CAM or AM device, such as on second client computer 130 or network 140 of system 105. With reference to FIG. 39, in some arrangements, the stored .STL file corresponding to final digital placement guide device 470 is processed in an AM device, which may be a 3D printer in the MP series by 3D Systems, Inc., to form a corresponding physical placement guide device.

Figure 40A:
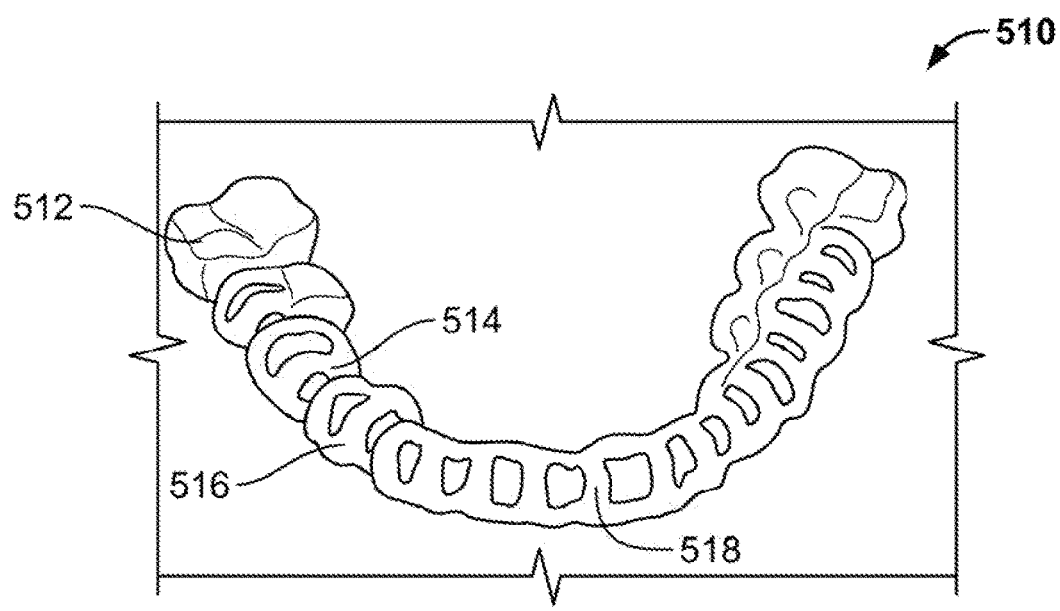
FIGS. 40A-40C are perspective views of physical placement trays in accordance with various embodiments.
Figure 40B:
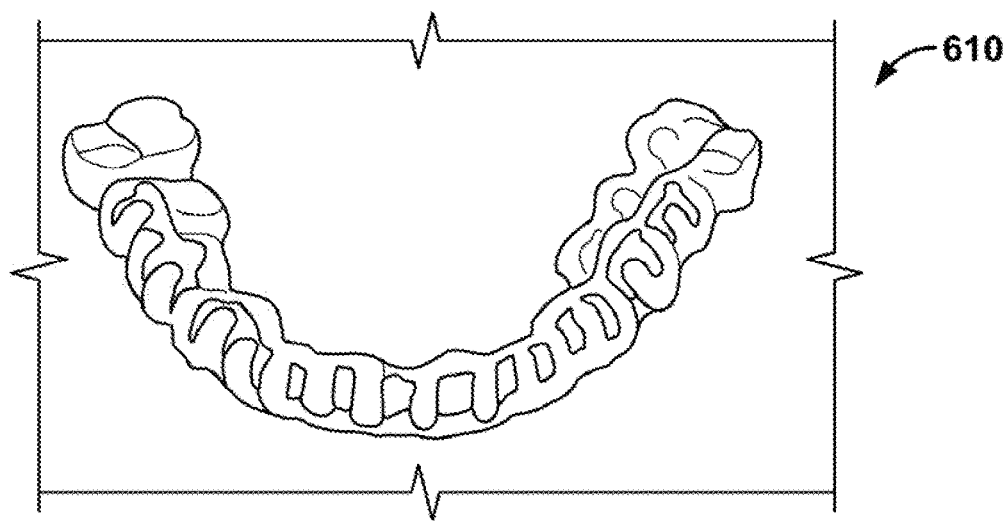
Figure 40C:
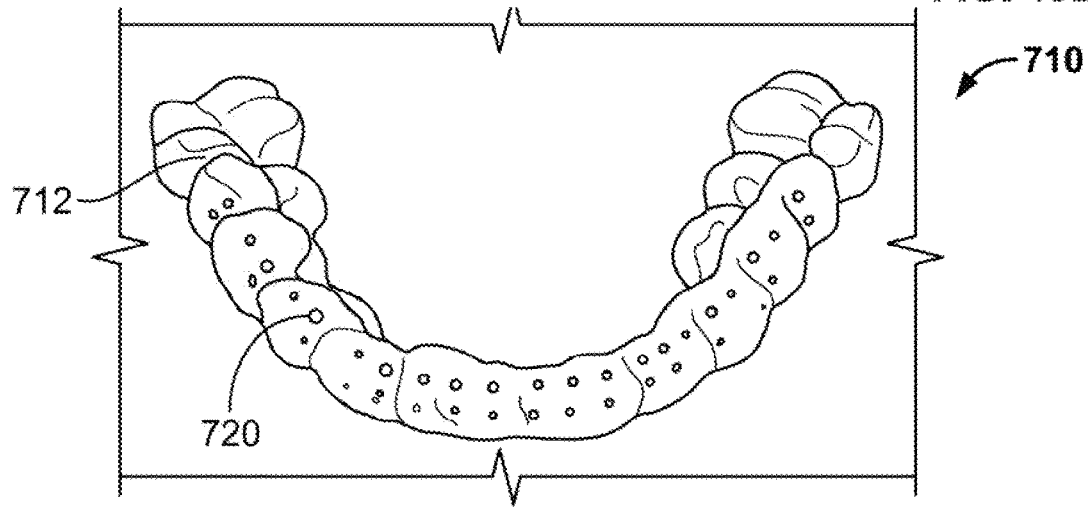

Physical placement guide devices, such as placement trays, formed by way of the process described previously herein may take but are not limited to taking the form of any of the physical placement trays shown in FIGS. 40A-40C. Physical placement tray 510 includes primary supports 512 corresponding to digital primary supports, lingual auxiliary support 514 attached to and extending between the primary supports as well as corresponding to a digital lingual auxiliary support, buccal auxiliary support 516 attached to and extending between the primary supports as well as corresponding to a digital buccal auxiliary support, and spaced apart connector supports 518 attached to and extending between the lingual and buccal auxiliary supports corresponding to digital connector supports. Physical placement tray 610 is substantially similar to physical placement tray 510 with the notable exception that some of the connector supports, in this example connector supports closer to digital primary supports, of physical placement tray 610 are only attached to a buccal auxiliary support of physical placement tray 610. In this manner, physical placement tray 610 has some obstructed openings in contrast to physical placement tray 510. The connector supports of physical placement trays 510, 610, such as connector supports 518, provide support for restorations, e.g., veneers, and provide visibility of the teeth to which they are fitted. In this manner, such physical connector supports allow for the possibility to floss in between the restorations after tag curing the restorations to the working teeth. Furthermore, such physical connector supports allow for excess flowable luting cement to flow between the connector supports such that the cement may be removed by a dentist as discussed above.

As shown in FIG. 40C, physical placement tray 710 includes primary supports 712 corresponding to digital primary supports as well as a combination of a lingual auxiliary support corresponding to a digital lingual auxiliary support, a buccal auxiliary support corresponding to a digital buccal auxiliary support, and connector supports corresponding to digital connector supports that together define holes 720 through the physical placement tray. The connector supports of physical placement tray 710 allow for adhesive for placing restorations in placement tray 710 and for partially cured cement adhering the restorations to the working teeth to pass through the holes during fixation of such restorations. As further shown, holes 720 may be prepared such that sets of between two and six holes of physical placement tray 710 correspond to each working teeth of a patient to be treated.

Figure 41:
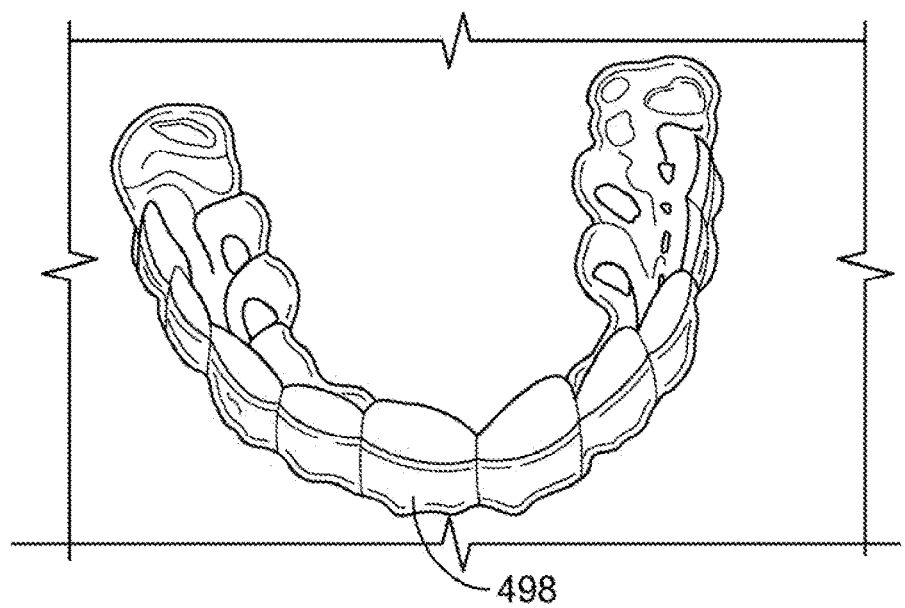
FIG. 41 is a perspective view of a physical placement tray system in preparation for the application of veneers to the teeth of a patient in accordance with an embodiment.

With reference to FIG. 41, in some arrangements, a dentist or preferably a technician in a dental laboratory sets restorations, e.g., veneers, on a physical model of a plurality of teeth of a patient to be treated and then applies temporary photosensitive adhesive 498 to an inner region of a physical placement tray intended for receipt of restorations. The physical placement tray is then properly placed onto the restorations and the physical model such that the restorations are seated into fitted grooves of the placement tray corresponding to the restorations. In some instances, the restorations may be depressed against adhesive 498 to more firmly attach the restorations to the placement tray. The combination of the placement tray and the restorations seated in and fixed to the tray are then removed from the physical model.

Figure 42A:
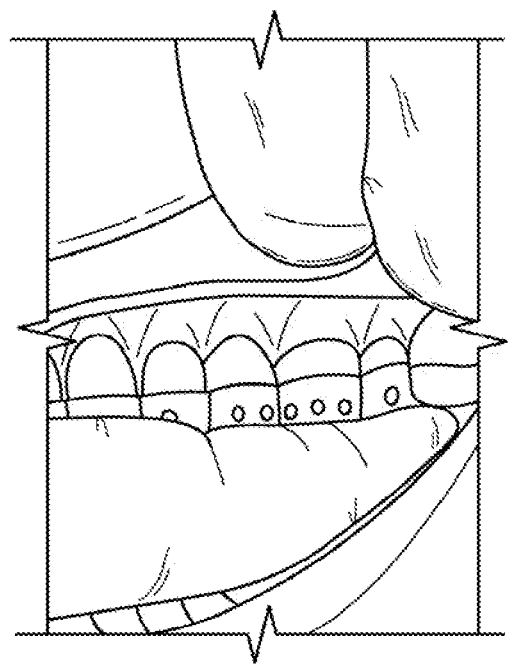
FIGS. 42A and 42B are perspective views of physical placement tray system of FIG. 41 being applied to the teeth of a patient and following application to the teeth of the patient, respectively, in accordance with an embodiment.
Figure 42B:
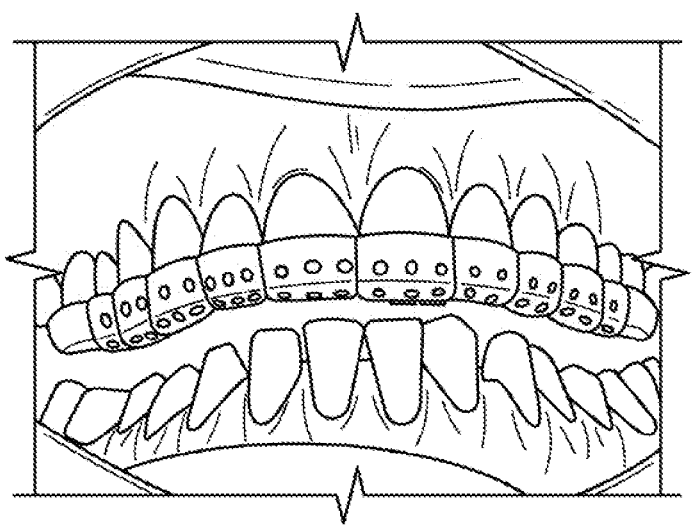
Figure 43A:
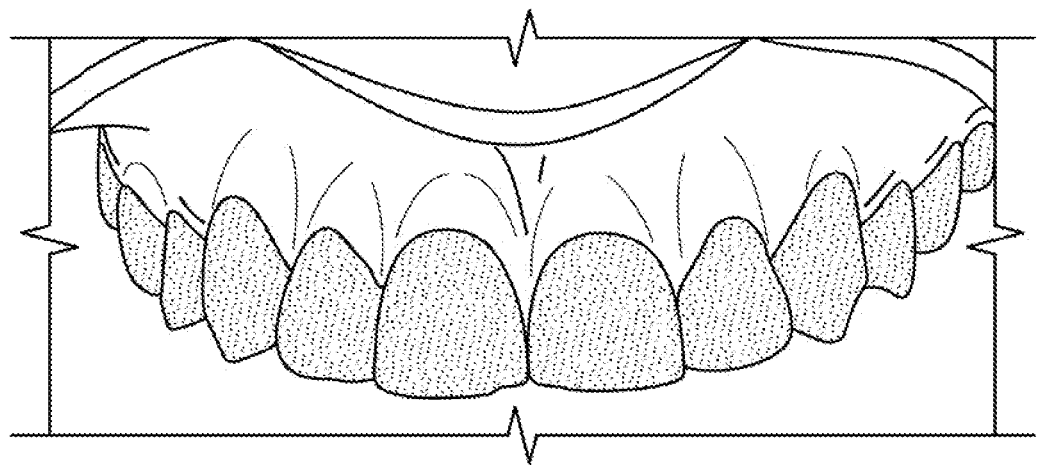
FIGS. 43A and 43B are perspective views of the teeth of a patient before and after placement of the veneers of the physical placement tray system of FIG. 41.
Figure 43B:
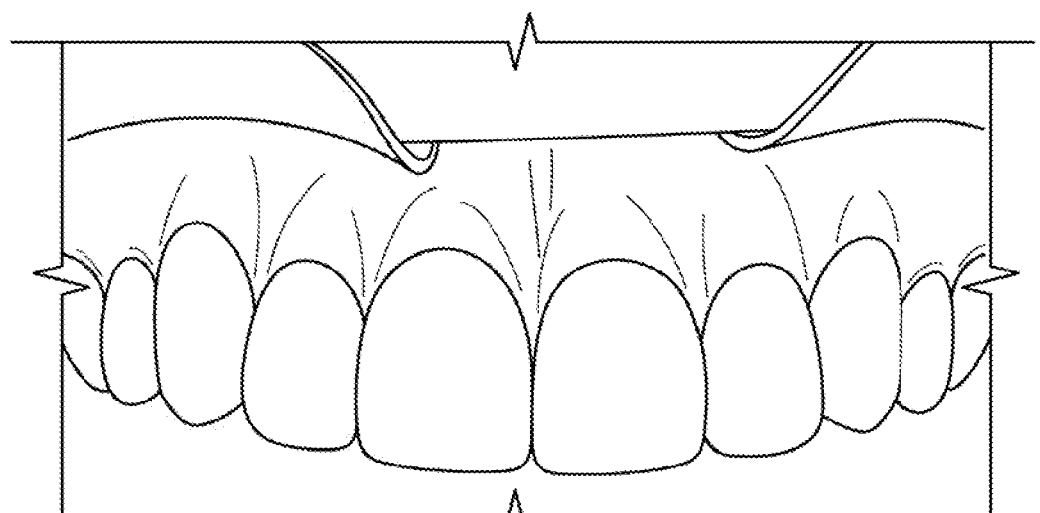

With reference to FIGS. 42A and 42B, a dentist applies dental cement or a permanent (strong) adhesive to a prepared surface of working teeth of a patient, or to a lingual side of restorations to be placed in the mouth of the patient, and subsequently applies the physical placement tray with the adhered restorations over the working teeth such that the appropriate grooves of the physical placement tray align with the corresponding working teeth and such that the restorations adhered to the corresponding teeth of the patient. The adhesive between the restorations and the teeth is then tag cured, generally in the cervical region of the teeth, and the excess adhesive is removed as much as possible through and around the placement tray while the adhesive is more easily movable. The adhesive is then fully cured, and then the placement tray is separated from the mounted restorations and removed from the mouth of the patient. An example of the difference in the cosmetic look of a patient before placement of a restoration and after such placement is provided in FIGS. 43A and 43B.

As shown in FIG. 44, process 800 prepares a physical placement tray to receive a restoration and sets the physical placement tray over working teeth of a patient using the placement tray. In some arrangements, process 800 may follow process 300. At block 810 of process 800, a 3D CAD model of unrestored and restored teeth combining a tooth to be treated and a restoration applied to the tooth to be treated is merged via one or more processors of a client computer, such as second client computer 130, to create restored tooth data. At block 820 and following the step at block 810, initial primary support configuration data corresponding to a digital model outline of instrument fixation support structure based on restored tooth data is stored by one or more processors of the client computer. At block 830 and following the step at block 810, initial lingual support configuration data corresponding to a digital model outline of instrument lingual support structure based on the restored tooth data is stored by one or more processors of the client computer. At block 840 and following the step at block 810, initial buccal support configuration data corresponding to a digital model outline of instrument buccal support structure is stored by one or more processors of the client computer. The steps at blocks 820, 830, and 840 may be performed in any order including simultaneously. At block 825 and following the step at block 820, final primary support configuration data corresponding to the instrument fixation support structure is stored by one or more processors of the client computer. At block 835 and following the step at block 830, final lingual support configuration data corresponding to the instrument lingual support structure is stored by one or more processors of the client computer. At block 845 and following the step at block 840, final buccal support configuration data corresponding to the instrument buccal support structure is stored by one or more processors of the client computer. At block 850 and following the steps at blocks 835 and 845, occlusal connector configuration data corresponding to occlusal surface connectors attached to both the instrument lingual support structure and the instrument buccal support structure is stored by one or more processors of the client computer. At block 860 and following the step at block 850, the final primary support configuration data, the final lingual support configuration data, the final buccal support configuration data, and the occlusal connector configuration data is combined by one or more processors of the client computer to define initial retention splint data corresponding to a rough retention splint configuration. In some arrangements, at block 870A and following the steps at blocks 825 and 835, lingual connecting support configuration data corresponding to lingual connecting support structure connecting the instrument fixation support structure to the instrument lingual support structure is stored by one or more processors of the client computer. In some arrangements, at block 880A and following the steps at blocks 825 and 845, buccal connecting support configuration data corresponding to buccal connecting support structure connecting the instrument fixation support structure to the instrument buccal support structure is stored by one or more processors of the client computer. At block 860A and following the steps at block 850 and the steps at either or both of blocks 870A and 880A, the final primary support configuration data, the final lingual support configuration data, the final buccal support configuration data, the occlusal connector configuration data, and either or both of the lingual connecting support configuration data and the buccal connecting support configuration data, as appropriate, is combined by one or more processors of the client computer to define initial retention splint data corresponding to a rough retention splint configuration. At block 890 and following the steps at either of blocks 860 and 860A as appropriate, the initial retention splint data may be separated from the restored tooth data to form final retention splint data corresponding to a final retention splint configuration. At block 895 and following the step at block 890, the final retention splint data may be exported by one or more processors of the client computer to a data storage file configured for use with a CAM or AM device. At block 899 and following the step at block 895, a retention splint, for example any one of physical placement trays 510, 610, 710, may be fabricated on a CAM or AM device based on the data storage file.

Based on aforementioned information, this technology provides for producing a restoration part, in advance of the physical revision of the tooth so that the restoration part is available to the dentist even before he or she starts physically preparing the tooth. The tooth can then be prepared with precision by using the configured overlay to revise the tooth in a manner to correspond to or mate with the interior of the restoration. The availability of the restoration makes it possible to mount it directly onto the tooth in the same visit that the tooth is prepared. This substantially reduces the inconvenience of the patient and reduces the number of visits made to the dentist. This also reduces the possibility of a prepared tooth becoming contaminated during the extended time period between tooth preparation and installation of the final restoration.

It is to be understood that the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:
1. A dental overlay device configured for limiting the operation of a dental instrument to a removal of a predetermined portion of the structure of a tooth to be treated in the mouth of a patient and comprising a body, the body having a length, a width, and a thickness, the body comprising:
   a first surface complementary to and configured for contacting portions of one or more teeth in the mouth of the patient to secure the body in a suitable position with respect to the tooth to be treated;
   a second surface directly opposite to the first surface;

a first opening extending through the first surface for exposing portions of the tooth structure to be removed from the tooth to be treated;

a second opening different from the first opening and extending through the second surface, the second opening being configured for receiving a connector of a dental instrument therethrough; and a slot in communication with the second opening and being configured for receiving a flange extending from the connector of the dental instrument in a direction perpendicular or otherwise transverse to a longitudinal axis of the connector, the entire slot having a first dimension along a first direction and within a first plane generally parallel to the second surface, wherein the first dimension is greater than a corresponding second dimension defined by an entirety of the second opening along the first direction and within a second plane parallel to the first plane such that when the connector of the dental instrument is received through the second opening and the flange is received in the slot, movement of the flange in directions within the first plane and in a direction perpendicular to the first plane is limited by the slot, wherein the second opening defines a first side opening on an end of the second opening, the first side opening being configured for receiving the connector of the dental instrument within and in a direction along the second plane, and wherein the slot defines a second side opening on an end of the slot for receiving the flange within and in a direction along the first plane.

2. The dental overlay device of claim 1, wherein the body defines a third side opening extending from the second side opening and configured for receiving a shaft of the dental instrument.

3. The dental overlay device of claim 2, wherein the second side opening lies between the first side opening and third side opening.

4. The dental overlay device of claim 2, wherein the third side opening defines a third dimension, wherein the first dimension is greater than the third dimension.

5. The dental overlay device of claim 2, wherein the first side opening defines a first height, the second side opening defines a second height, and the third side opening defines a third height, wherein the third height is greater than both of the first height and the second height.

6. The dental overlay device of claim 1, wherein the second surface is opposite the first surface.

7. The dental overlay device of claim 1, wherein the second surface is spaced from the first surface.

8. The dental overlay device of claim 1, wherein the overlay device has a profile of a curved oblong shape.

9. The dental overlay device of claim 1, wherein the body defines a side wall, wherein the slot includes an entry portion that includes the second side opening and a guide portion in communication with the entry portion, and wherein the entry portion of the slot extends from the side wall to the guide portion of the slot.

10. The dental overlay device of claim 9, wherein the entry portion extends along a linear axis.

11. The dental overlay device of claim 9, wherein a portion of the second opening includes an oblong portion defining a curved oblong shape and the guide portion extends along the oblong portion.

12. A dental system configured for removing a predetermined portion of the structure of a tooth to be treated, comprising:

the dental overlay device of claim 1; and
a dental instrument comprising:
a hand grip;
a drive head attached to the hand grip;
a drive shaft extending from the drive head;
a cutting tool attached to the drive shaft and extending along a drive shaft longitudinal axis defined by the drive shaft; and
a flange extending around the drive shaft and spaced from the drive head, the flange having length and width dimensions along axes perpendicular to the drive shaft longitudinal axis and a thickness dimension along an axis parallel to the drive shaft longitudinal axis, wherein either one or both of the length and the width dimensions of the flange are greater than the thickness dimension of the flange,
wherein the drive shaft is receivable through the first side opening and the flange is receivable through the second side opening, and
wherein when the flange of the dental instrument is received within the slot, movement of the flange in directions within the first plane and in a direction perpendicular to the first plane is limited by the slot.

13. The dental system of claim 12, wherein the drive head includes a cutting tool of the dental instrument receivable within a third side opening defined by the body, the third side opening extending from the second side opening.

14. The dental system of claim 12, wherein the drive head includes a connector and the drive shaft extends through the connector.

15. A dental overlay device configured for limiting the operation of a dental instrument to a removal of a predetermined portion of the structure of a tooth to be treated in the mouth of a patient and comprising a body, the body having a length, a width, and a thickness, the body comprising:

a first surface complementary to and configured for contacting portions of one or more teeth in the mouth of the patient to secure the body in a suitable position with respect to the tooth to be treated;

a second surface opposite or adjacent to the first surface;

a first opening extending through the first surface for exposing portions of the tooth structure to be removed from the tooth to be treated;

a second opening different from the first opening and extending through the second surface, the second opening being configured for receiving a connector of a dental instrument therethrough;

a first slot in communication with the second opening and being configured for receiving a flange extending from the connector of the dental instrument in an entry direction perpendicular or otherwise transverse to a longitudinal axis of the connector, the entire first slot having a first dimension along a first direction and within a first plane generally parallel to the second surface, wherein the first dimension is greater than a corresponding second dimension defined by an entirety of the second opening along the first direction and within a second plane parallel to the first plane such that when the connector of the dental instrument is received through the second opening and the flange is received in the first slot, movement of the flange in directions within the first plane and in a direction perpendicular to the first plane is limited by the first slot;

a slide slot defined by the body in communication with the first slot, the side slot configured to allow movement of the flange in a working direction transverse to the entry direction and configured to contact the flange to limit the movement of the flange to the working direction, wherein the second opening defines a first side opening on an end of the second opening, the first side opening being configured for receiving the connector of the dental instrument within and in a direction along the second plane, and wherein the first slot defines a second side opening on an end of the first slot for receiving the flange within and in a direction along the first plane.

16. The dental overlay device of claim 15, wherein the slide slot extends from the first slot, and wherein the slide slot is in communication with the first opening to allow the dental instrument to be received within the slide slot and the first opening such that the dental instrument is slideable in the working direction and removes the predetermined portion of the structure of the tooth to be treated when sliding in the working direction.

17. The dental overlay device of claim 15, wherein the second surface is opposite the first surface.

18. A dental kit, the dental kit comprising:
the dental overlay device of claim 1; and
a dental overlay system for the placement of one or more veneers into the mouth of a patient, the dental overlay system comprising:
one or more veneers; and
a second dental overlay device comprising a curved body, the curved body comprising:
a body surface complementary to and configured for contacting portions of one or more teeth in the mouth of a patient, including distal teeth on opposite sides of the patient's mouth, to secure the body in a suitable position on the patient's teeth, the one or more veneers being temporarily attached to the body surface; and
a plurality of holes extending through the curved body and corresponding to locations on a plurality of teeth.

* * * * *